Jan. 2, 1951 H. P. LUHN 2,536,951
RECORD CONTROLLED MULTIPLYING MACHINE
Filed Dec. 21, 1945 48 Sheets-Sheet 1

INVENTOR
HANS P. LUHN.
BY
ATTORNEY

Jan. 2, 1951 H. P. LUHN 2,536,951
RECORD CONTROLLED MULTIPLYING MACHINE
Filed Dec. 21, 1945 48 Sheets-Sheet 2

INVENTOR
HANS P. LUHN
BY
ATTORNEY

Jan. 2, 1951  H. P. LUHN  2,536,951
RECORD CONTROLLED MULTIPLYING MACHINE
Filed Dec. 21, 1945  48 Sheets-Sheet 3
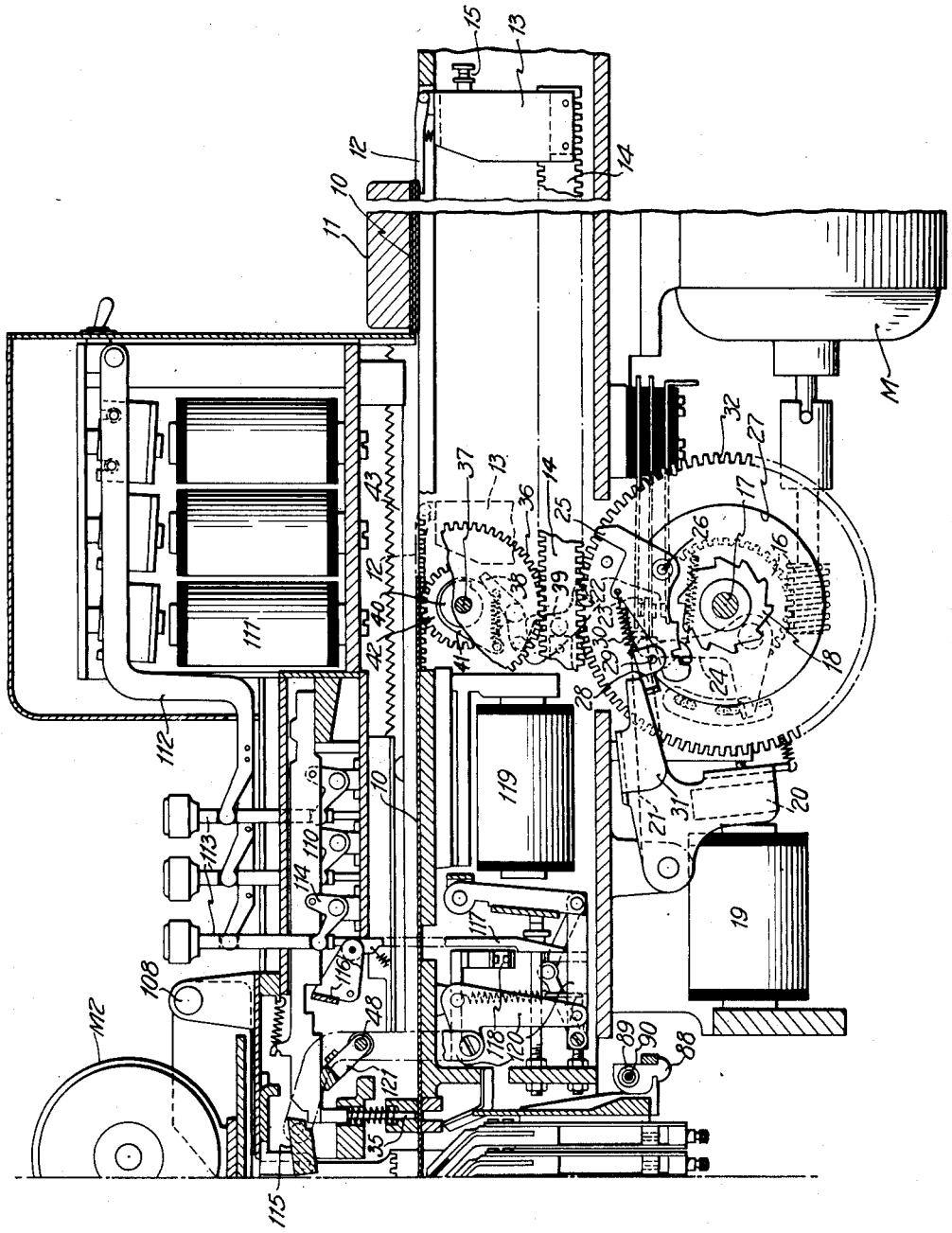
FIG. 3a.
INVENTOR
HANS P. LUHN
BY
ATTORNEY

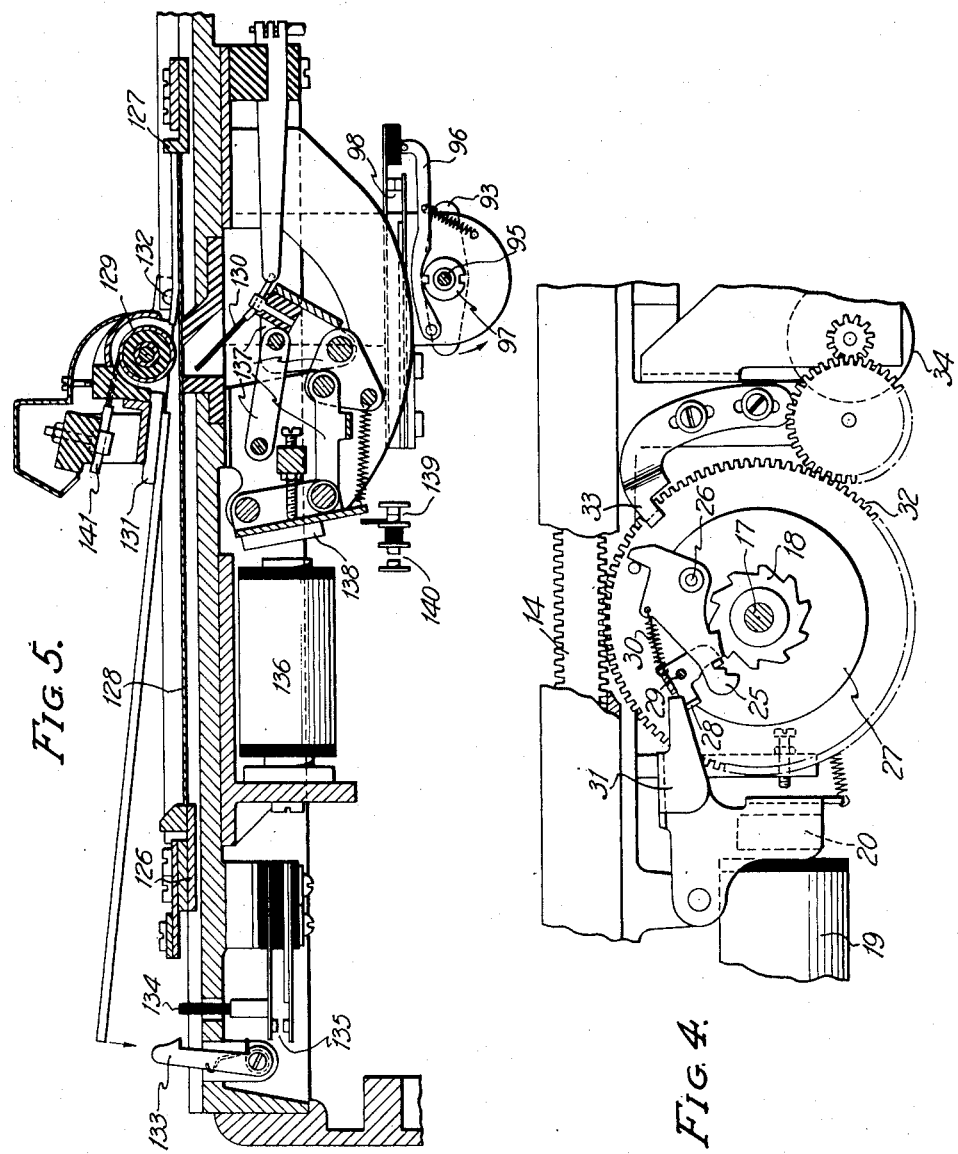

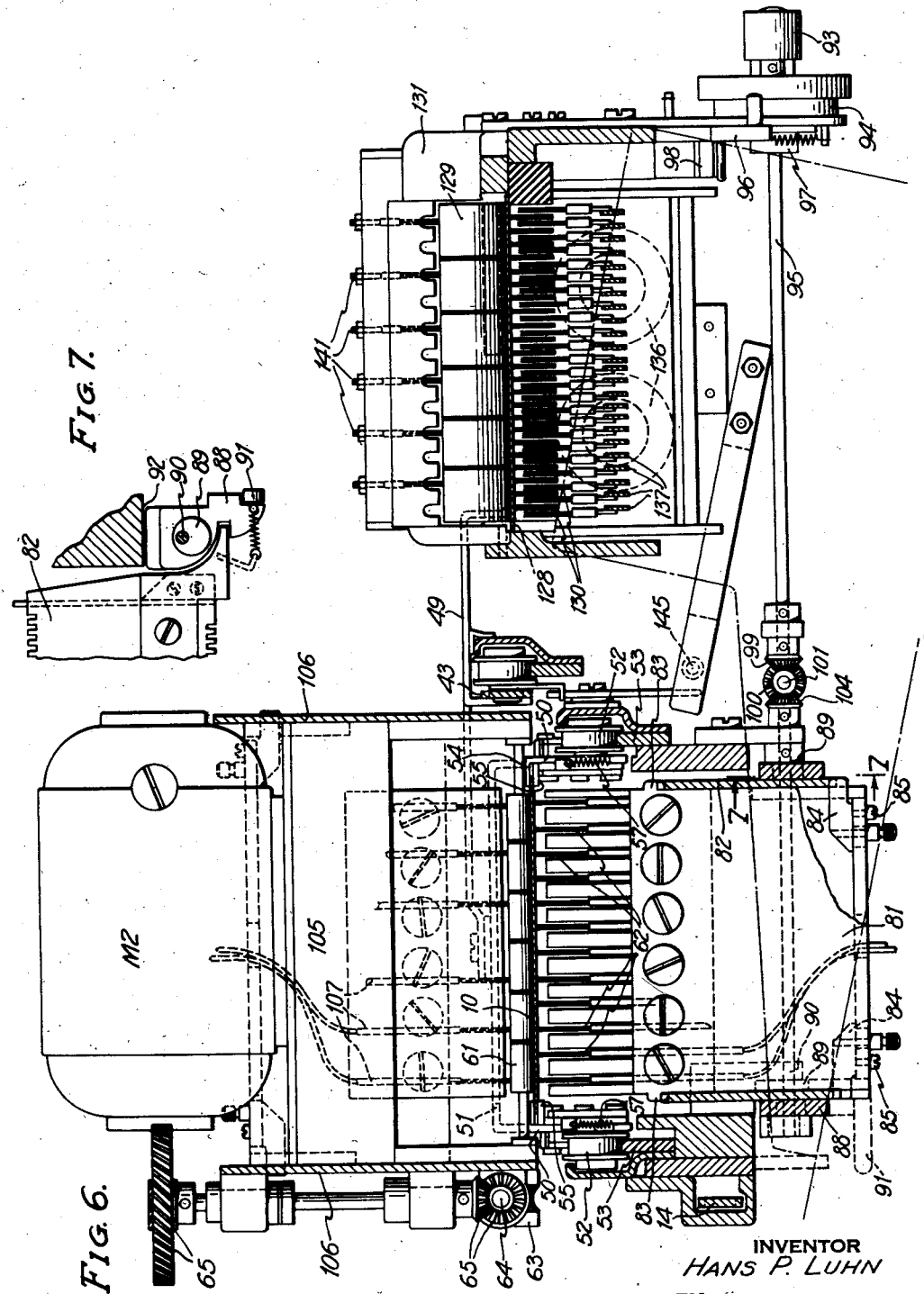

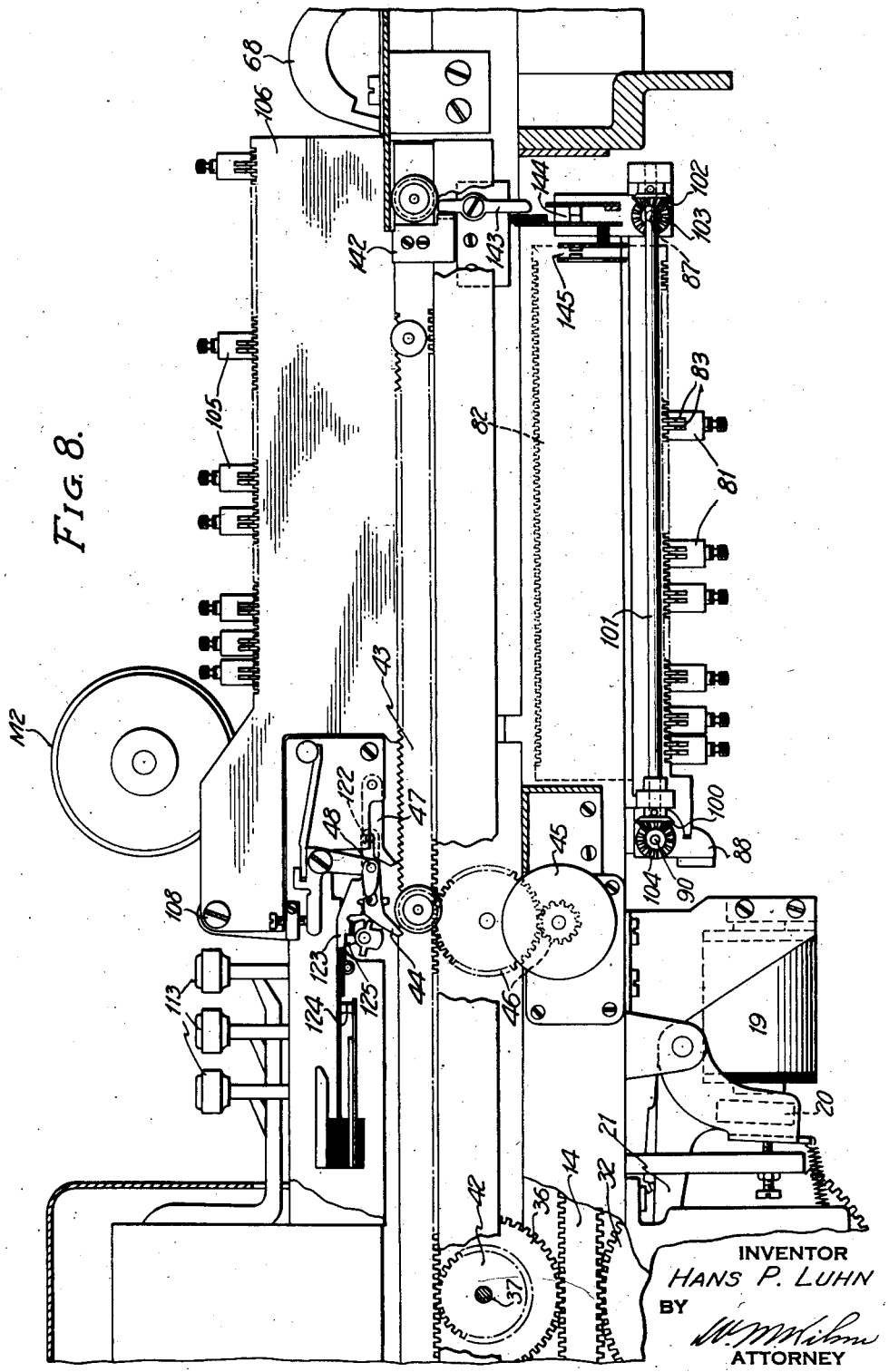

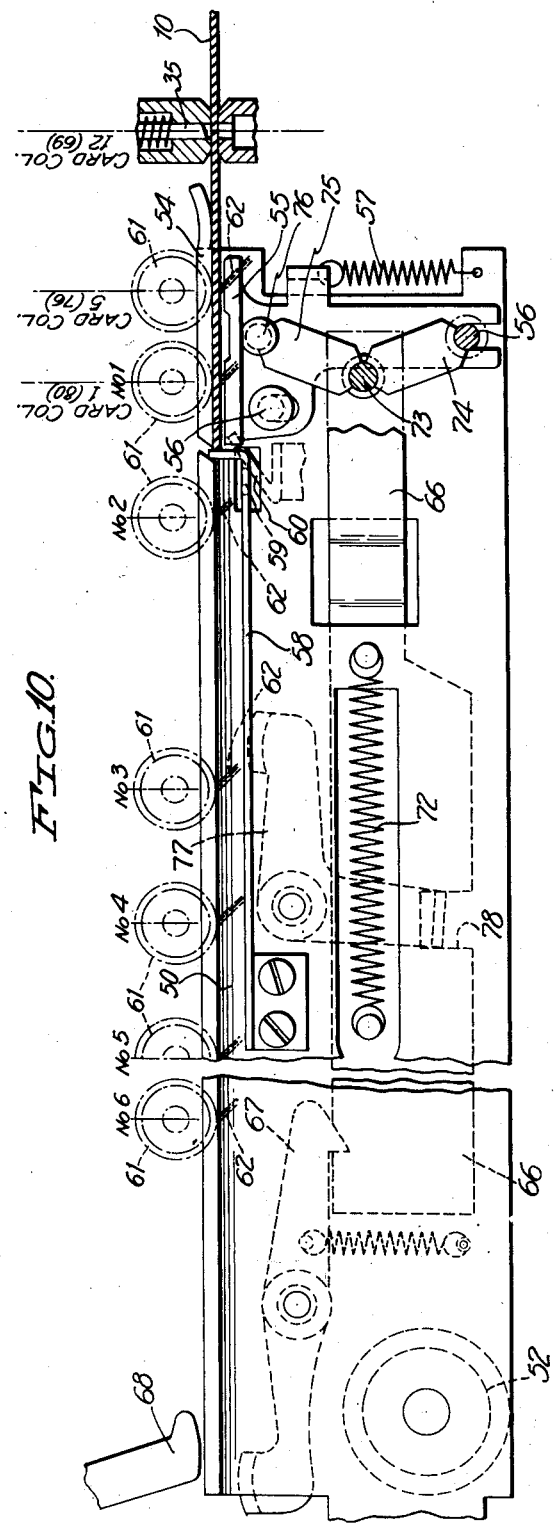
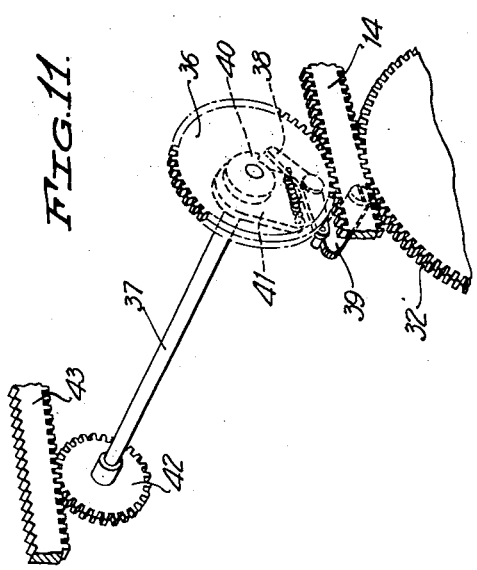

Jan. 2, 1951 H. P. LUHN 2,536,951
RECORD CONTROLLED MULTIPLYING MACHINE
Filed Dec. 21, 1945 48 Sheets-Sheet 9

INVENTOR
HANS P. LUHN
BY
ATTORNEY

Jan. 2, 1951 H. P. LUHN 2,536,951
RECORD CONTROLLED MULTIPLYING MACHINE
Filed Dec. 21, 1945 48 Sheets-Sheet 10

INVENTOR
HANS P. LUHN
BY
*W. M. Wilson*
ATTORNEY

Jan. 2, 1951  H. P. LUHN  2,536,951
RECORD CONTROLLED MULTIPLYING MACHINE
Filed Dec. 21, 1945  48 Sheets-Sheet 17

INVENTOR
HANS P. LUHN
BY
ATTORNEY

Jan. 2, 1951          H. P. LUHN          2,536,951

RECORD CONTROLLED MULTIPLYING MACHINE

Filed Dec. 21, 1945          48 Sheets-Sheet 20

INVENTOR
HANS P. LUHN
BY
ATTORNEY

Jan. 2, 1951  H. P. LUHN  2,536,951
RECORD CONTROLLED MULTIPLYING MACHINE
Filed Dec. 21, 1945  48 Sheets-Sheet 22

INVENTOR
HANS P. LUHN
BY
ATTORNEY

Jan. 2, 1951          H. P. LUHN          2,536,951

RECORD CONTROLLED MULTIPLYING MACHINE

Filed Dec. 21, 1945          48 Sheets-Sheet 23

INVENTOR
HANS P. LUHN
BY
ATTORNEY

Jan. 2, 1951  H. P. LUHN  2,536,951
RECORD CONTROLLED MULTIPLYING MACHINE
Filed Dec. 21, 1945  48 Sheets-Sheet 27

INVENTOR
HANS P. LUHN
BY
ATTORNEY

Jan. 2, 1951    H. P. LUHN    2,536,951

RECORD CONTROLLED MULTIPLYING MACHINE

Filed Dec. 21, 1945    48 Sheets—Sheet 32

| FIG. 15A. | | | | |
| --- | --- | --- | --- | --- |
| FIG. 15B. (FIG. 20B.) | | | | |
| FIG. 15C. (FIG. 20C.) | FIG. 15D. (FIG. 20D.) | FIG. 15E. (FIG. 20E.) | FIG. 15F. (FIG. 20F.) | FIG. 15G. (FIG. 20G.) |
| FIG. 15H. | FIG. 15I. | FIG. 15J. | FIG. 15K. | FIG. 15L. |
| FIG. 15P. | | FIG. 15M. | FIG. 15N. | FIG. 15X. |
| FIG. 15Q. | | | | |
| FIG. 15R. | | | | |
| FIG. 15S. | | | | |
| FIG. 15T. | | | | |
| FIG. 15U. | | | | |
| FIG. 15V. | | | | |
| FIG. 15W. | | | | |

INVENTOR
HANS P. LUHN
BY
ATTORNEY

Jan. 2, 1951  H. P. LUHN  2,536,951
RECORD CONTROLLED MULTIPLYING MACHINE
Filed Dec. 21, 1945  48 Sheets-Sheet 34

INVENTOR
HANS P. LUHN
BY
ATTORNEY

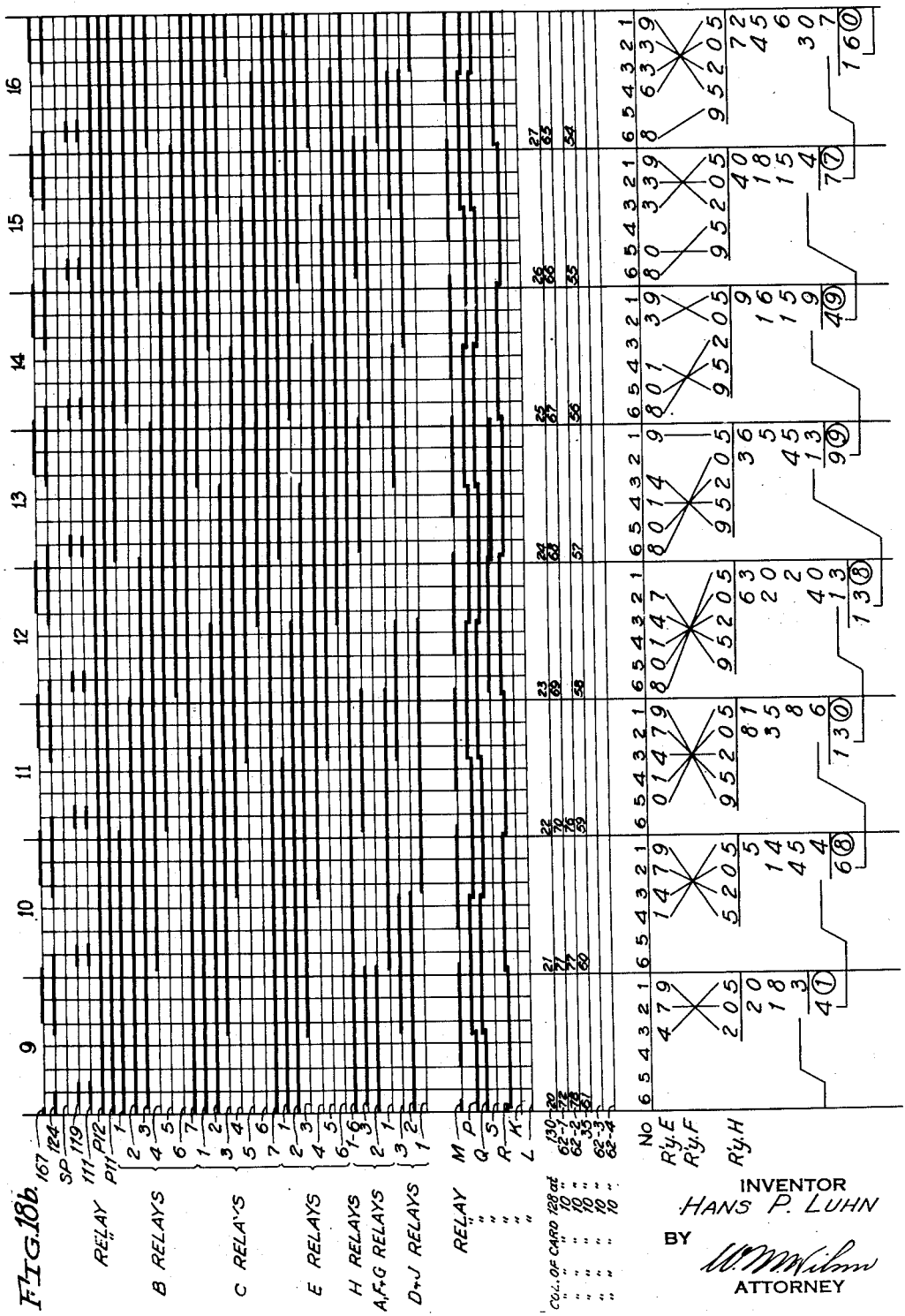

Jan. 2, 1951  H. P. LUHN  2,536,951
RECORD CONTROLLED MULTIPLYING MACHINE
Filed Dec. 21, 1945  48 Sheets-Sheet 36

INVENTOR
HANS P. LUHN
BY
ATTORNEY

Jan. 2, 1951          H. P. LUHN          2,536,951

RECORD CONTROLLED MULTIPLYING MACHINE

Filed Dec. 21, 1945          48 Sheets-Sheet 37

INVENTOR
HANS P. LUHN
BY
ATTORNEY

Jan. 2, 1951   H. P. LUHN   2,536,951
RECORD CONTROLLED MULTIPLYING MACHINE
Filed Dec. 21, 1945   48 Sheets-Sheet 38

INVENTOR
HANS P. LUHN
BY
ATTORNEY

Jan. 2, 1951          H. P. LUHN          2,536,951

RECORD CONTROLLED MULTIPLYING MACHINE

Filed Dec. 21, 1945          48 Sheets-Sheet 39

INVENTOR
HANS P. LUHN
BY
ATTORNEY

Jan. 2, 1951  H. P. LUHN  2,536,951
RECORD CONTROLLED MULTIPLYING MACHINE
Filed Dec. 21, 1945  48 Sheets-Sheet 40

INVENTOR.
HANS P. LUHN
BY
ATTORNEY

Jan. 2, 1951     H. P. LUHN     2,536,951
RECORD CONTROLLED MULTIPLYING MACHINE

Filed Dec. 21, 1945     48 Sheets-Sheet 46

INVENTOR
HANS P. LUHN
BY
ATTORNEY

Jan. 2, 1951  H. P. LUHN  2,536,951
RECORD CONTROLLED MULTIPLYING MACHINE
Filed Dec. 21, 1945  48 Sheets-Sheet 47
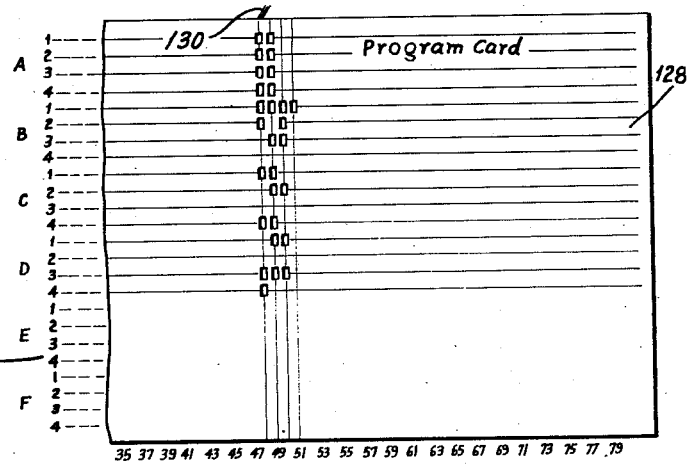
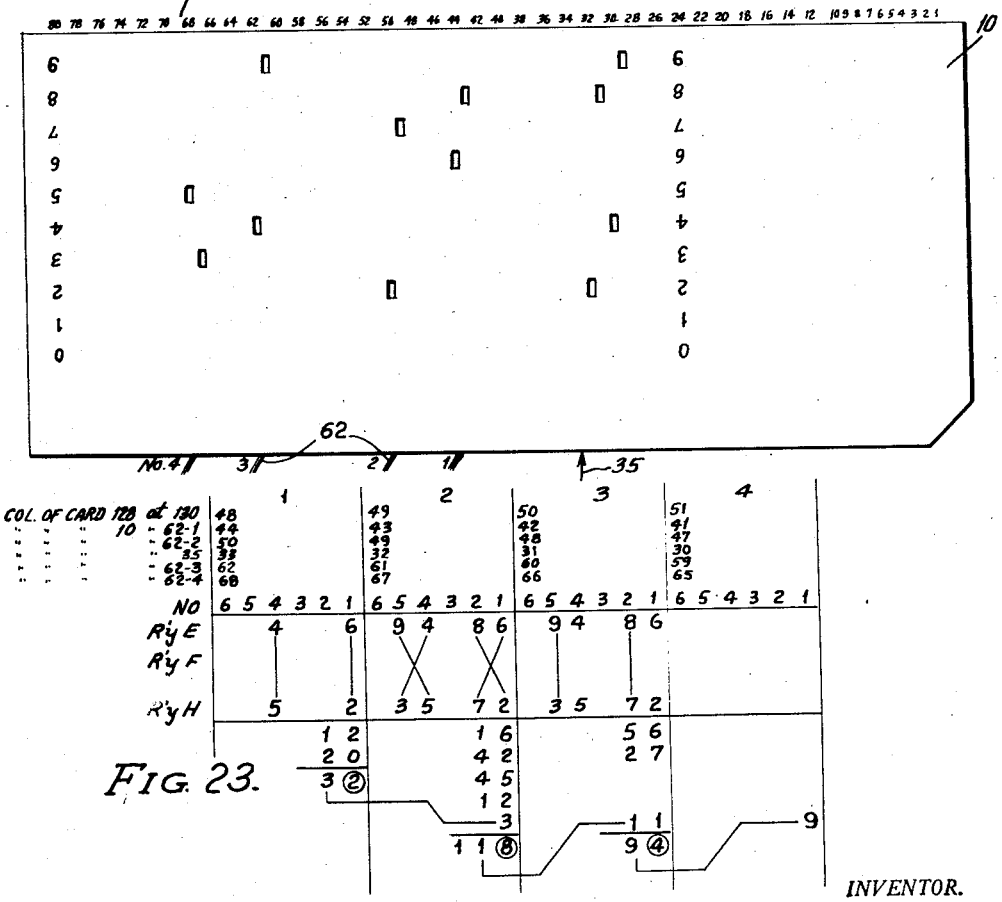
INVENTOR.
HANS P. LUHN
BY
ATTORNEY Patented Jan. 2, 1951

2,536,951

UNITED STATES PATENT OFFICE 2,536,951

RECORD CONTROLLED MULTIPLYING MACHINE

Hans P. Luhn, Armonk, N. Y., assignor to International Business Machines Corporation, New York, N. Y., a corporation of New York Application December 21, 1945, Serial No. 636,530

32 Claims. (Cl. 235—61.6)

The present invention relates to record controlled multiplying machines of the electrical type.

The principal object of the invention is to provide a novel multiplying mechanism employing the method of producing in succession the partial products required to obtain the successive digits of the product. This method may be best understood by representing the multiplication of two such numbers, as 245 and 379. Multiplying these numbers, their several partial products together with their denominational or positional notation will be as follows:

```
          2  4  5
       ×  3  7  9
         ─────────
         18 36 45
      14 28 35
    6 12 15
    ─────────────
    9  2  8  5  5
```

In carrying out the multiplication, the mechanism of the invention first obtains the partial product 45 of the units positional notation by multiplying the two units digits 5 and 9 of the factors. The units digit 5 of this first partial product is the units digit of the final product and is not subject to further change. Accordingly, this digit is immediately recorded.

As a next step, the partial products 36 and 35 having a tens positional notation are obtained and added together with the tens carry of 4 from the units order to obtain 75, whose unit digit 5 is the final tens digit of the product and may accordingly be immediately recorded.

During a third step, the partial products 18, 28 and 15 having a hundreds positional notation are obtained and added together with the tens carry of 7 from the tens order to obtain 68 whose unit digit 8 is the final hundreds digit of the product and may be immediately recorded. In continuing succession thereafter, the partial products of higher positional notation are obtained and added together to produce the higher product digits 2 and 9.

An object of the invention is to provide a machine in which records bearing designations are advanced past sensing devices which concurrently sense the denominational orders of both factors in ascending succession and control multiplying and accumulating mechanism to obtain in succession the product digits. Punching mechanism is provided to punch each product digit as it is obtained so that, while any lower order product digit is being punched, the next higher order product digit is being computed.

A further object of the invention is to provide improved accumulating mechanism having a capacity determined by the maximum total of partial products of any positional notation and devices for causing the same accumulating mechanism to in turn obtain the sum of the partial products of successive positional notation.

A further object is to provide an accumulating mechanism operating in accordance with the binary system of numeration and provided with selectively adjustable contacts to enable the addition of amounts in accordance with any of a plurality of denominators.

This may be illustrated by assuming the addition of 8 hours 31 minutes, 7 hours 42 minutes, and 7 hours 48 minutes.

| Hours | Minutes |
|-------|---------|
| 8     | 31      |
| 7     | 42      |
| 7     | 48      |
| 24    | 01      |

In carrying out the addition, the mechanism of the invention first obtains the sum of the units orders of the minutes, which is 11. The units digit of this sum is the units digit of the final sum and is not subject to further change. Accordingly, this digit is immediately recorded. As a next step the sum of the tens digits of the minutes plus a tens carry of 1 is obtained, namely 12. This column of figures has a base of 6 so that the sum is really 12/6 or 2 with no remainder. The 0 is recorded and the 2 is carried into the hours columns, where it is added in to obtain the hours sum of 24.

The adding mechanism which receives the columns of figures in succession is normally arranged to be added to the base 10 and, when the tens of minutes digits are entered, the mechanism is automatically adjusted to add to the base 6 and when the hours digit are added it shifts back to the base 10.

Where one or more of the amounts is to be subtracted, the complement thereof is added. Thus:

| Hours | Minutes |
|-------|---------|
| 8     | 31      |
| 7     | 42      |
| −2    | ¹12     |
| 18    | 25      |

¹ Complement of 7.48.

As a further example where several different denominators are involved, assume the addition of

| Tenths | Halves | Sixths |
|--------|--------|--------|
| 6      | 4      | 5      |
| 2      | 3      | 1      |
| 5      | 4      | 8      |
| 9      | 7      | 9      |
| 32     | 1      | 5      |

Here the right hand column of digits are sixths of halves totaling 23, which is 3 halves and a 5 remainder. During their addition, the adding mechanism is adjusted to add to a $2^6$ base. When the second column of digits is added, the mechanism is adjusted to add to a 2 base and the sum 21 (including the 3 carry) results in a carry of 10 and remainder of 1. Thereafter, the adding mechanism is adjusted to add to the base 10 to obtain the sum 32.

Another object is to provide a machine in which the method of adding partial products of like positional notation is employed, and in which there is provided mechanism for verifying the multiplication by remultiplying the factors and concurrently subtracting from each product digit, as it is obtained, the corresponding digit of the first computed product.

A still further object is to provide a machine in which two pairs of factors are concurrently multiplied and the sum or difference of their products obtained in accordance with the aforesaid method of computation.

Other objects of the invention will be pointed out in the following description and claims and illustrated in the accompanying drawings, which disclose, by way of example, the principle of the invention and the best mode, which has been contemplated, of applying that principle.

Figure 1:
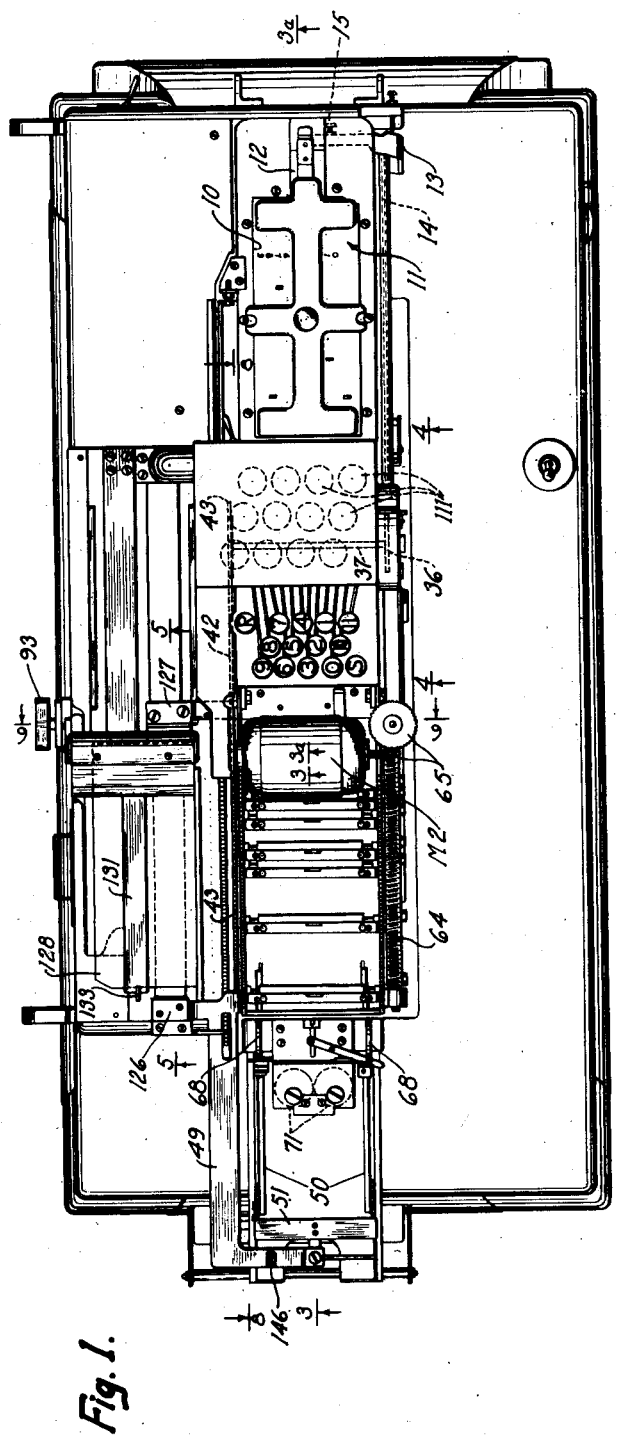
Fig. 1 is a plan view of the card feeding and punching mechanism.
Figure 3:
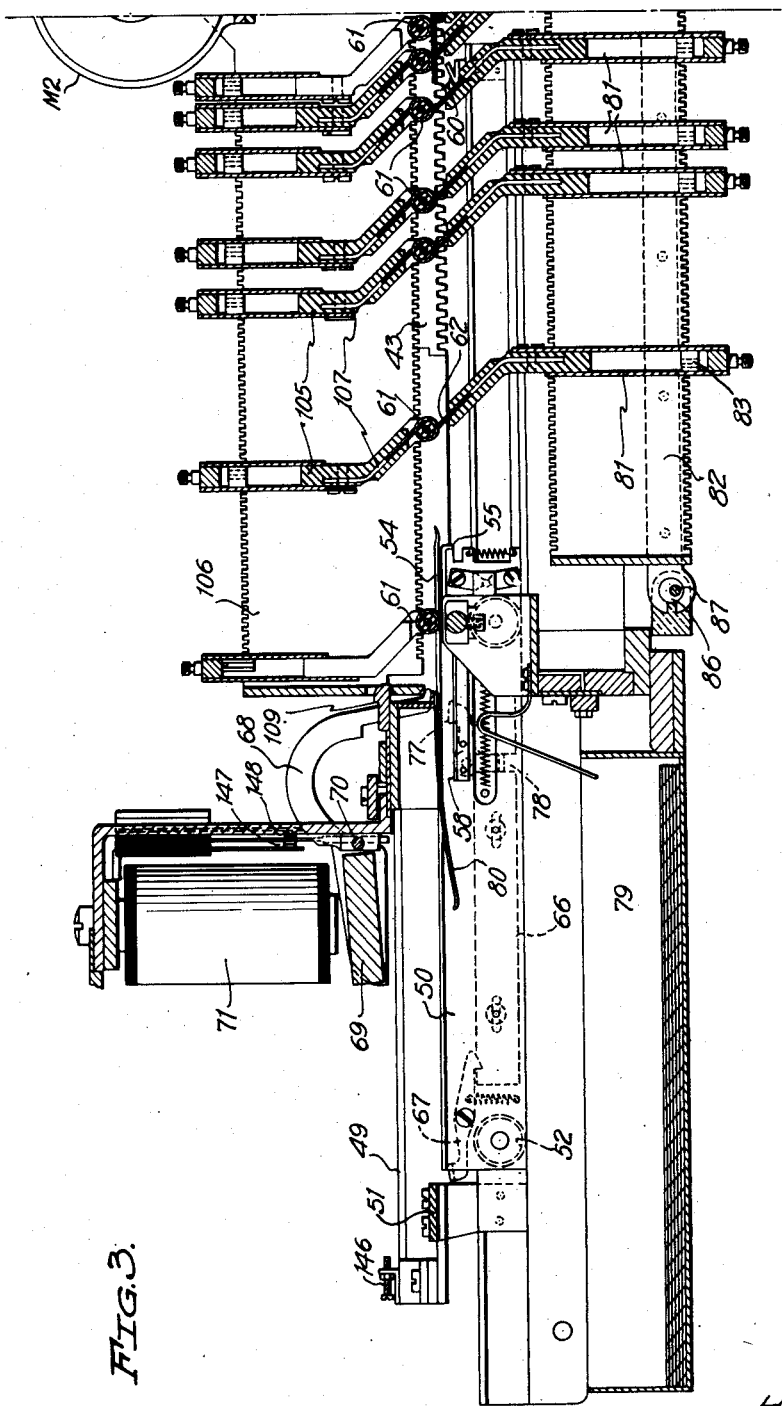

Figs. 3 and 3a together constitute a sectional elevation taken on lines 3—3 and 3a—3a of Fig. 1.

Figure 2:
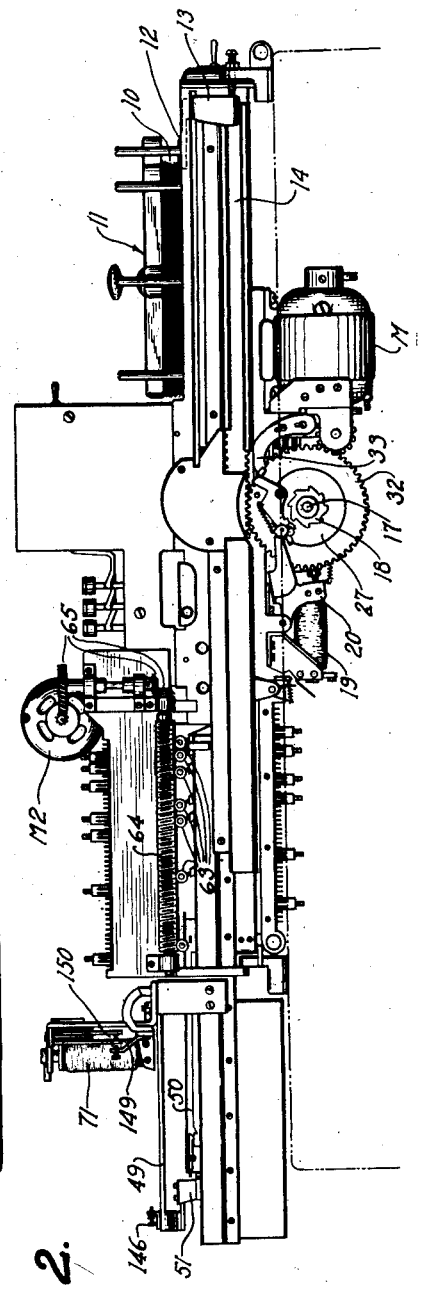
Fig. 2 is a side elevation of the card feeding and punching mechanism.

Fig. 4 is a detail of the drive clutch of Fig. 2 shown at an enlarged scale in operative position.

Fig. 5 is a sectional elevation of the program card sensing mechanism taken on lines 5—5 of Fig. 1.

Fig. 6 is a transverse sectional elevation taken on lines 6—6 of Fig. 1.

Fig. 7 is a detail of the card sensing unit locking device taken on lines 7—7 of Fig. 6.

Fig. 8 is an elevation looking from the rear of the machine along lines 8—8 of Fig. 1 to show the carriage escapement devices.

Figure 9:
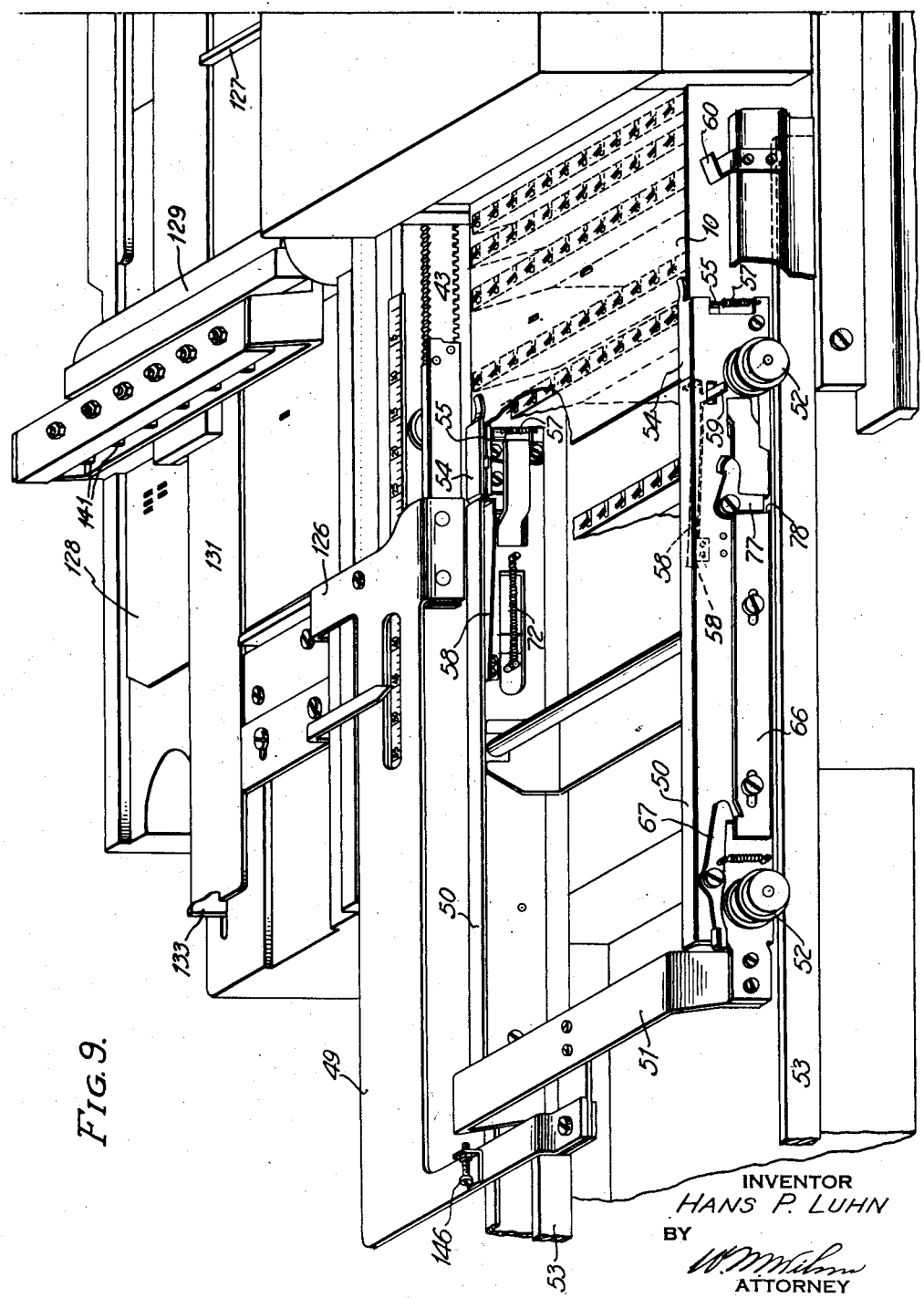

Fig. 9 is an isometric view to show the card carriage and its relation to the sensing brushes.

Fig. 10 is a view of the card carriage and brushes to show their relationship with respect to the punches.

Fig. 11 is a detail of the card feed drive gearing.

Figure 12:
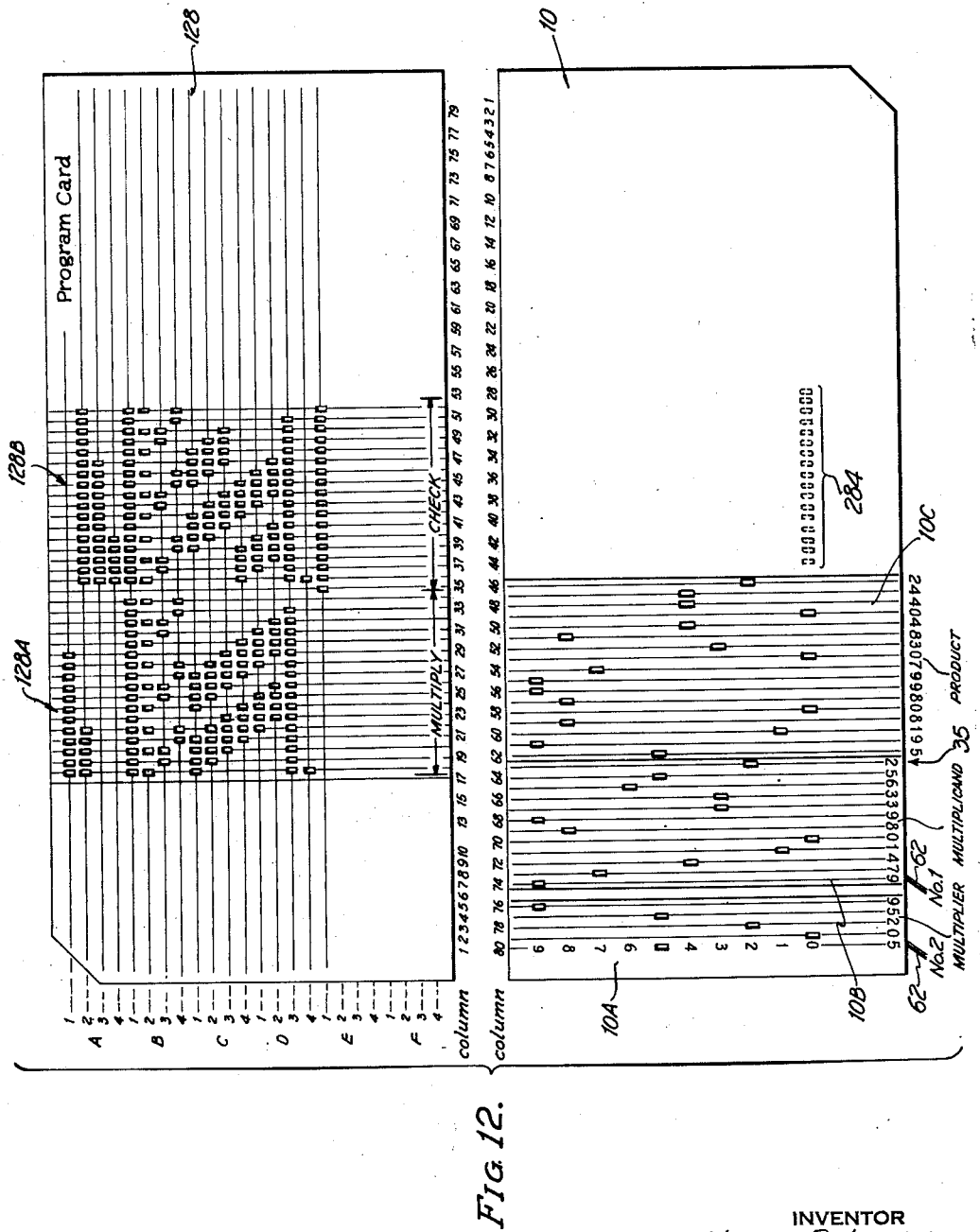

Fig. 12 is a view of a record card and related program card in the relative positions in which they pass through the machine, the cards being perforated for the performance of a multiplying operation with checking of the product.

Figure 13:
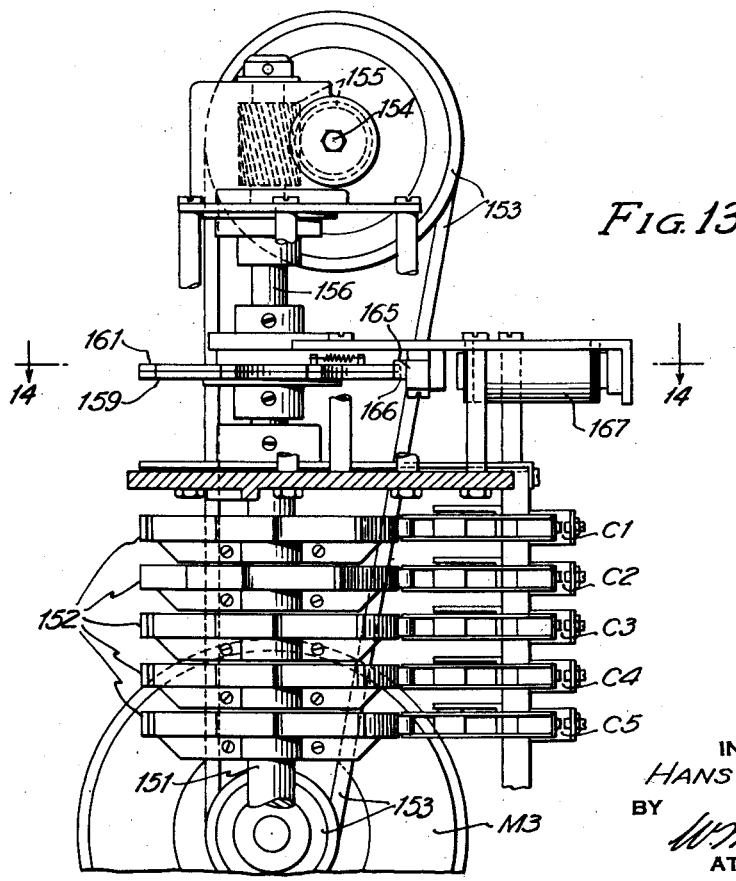

Fig. 13 is a detail of a contact operating unit and the device therefor.

Figure 14:
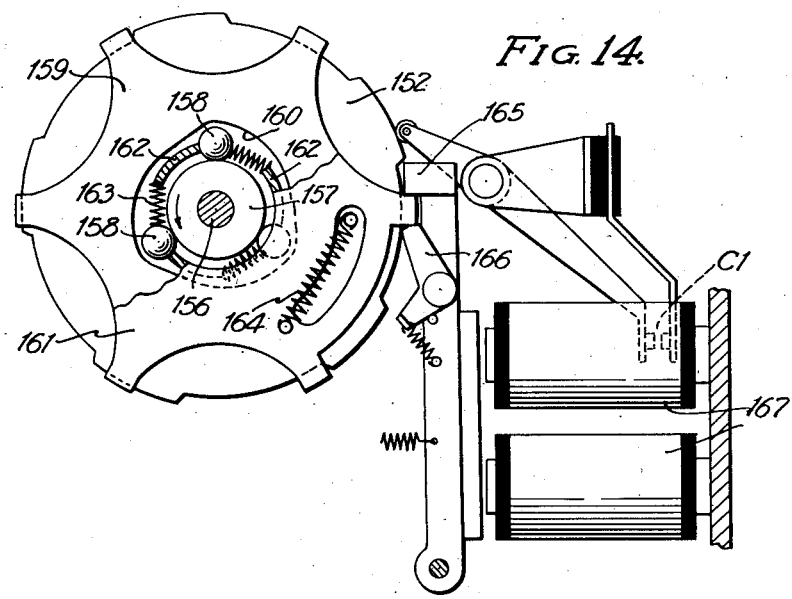

Fig. 14 is a plan section on lines 14—14 of Fig. 13.

Figure 15A:
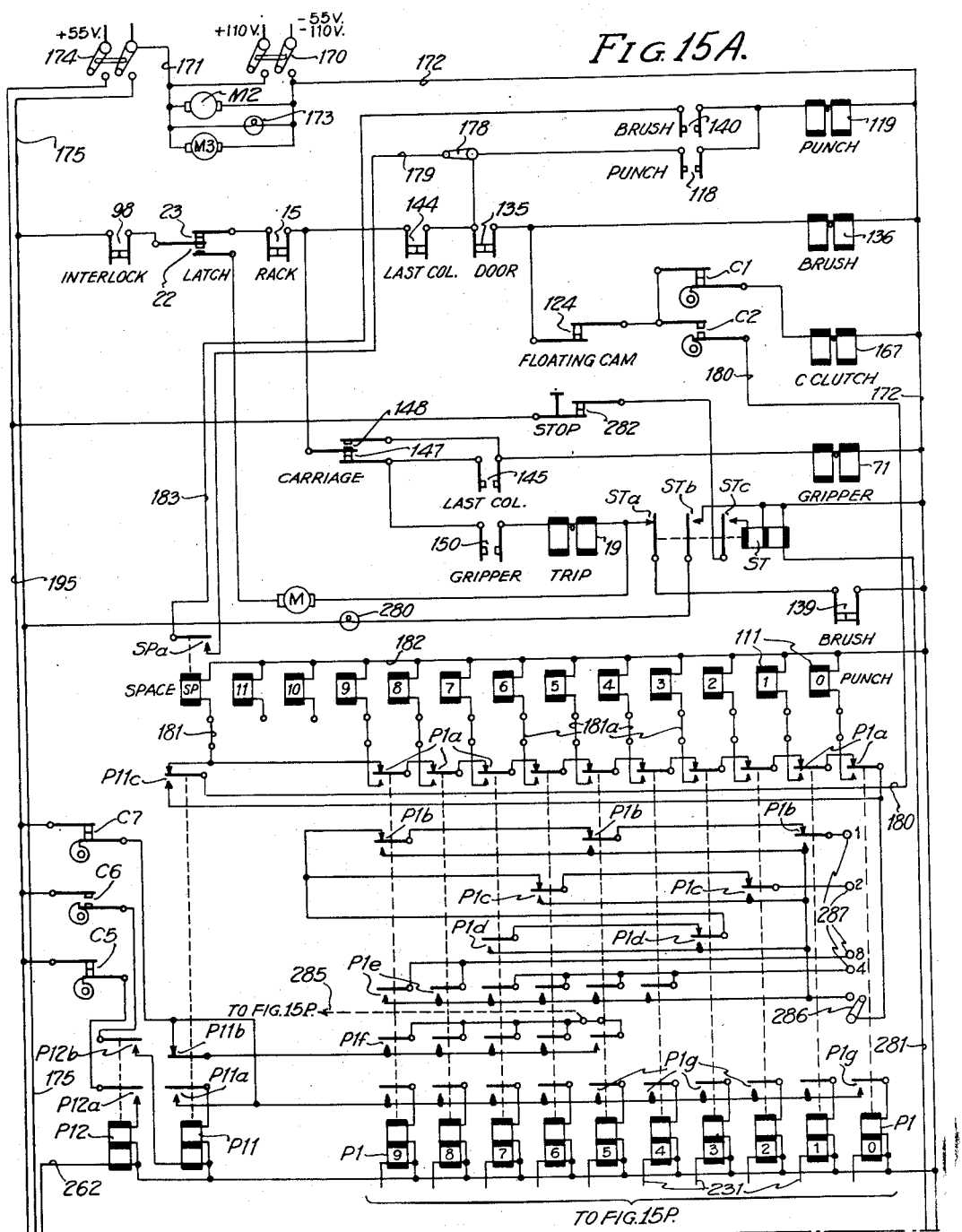
Figure 15B:
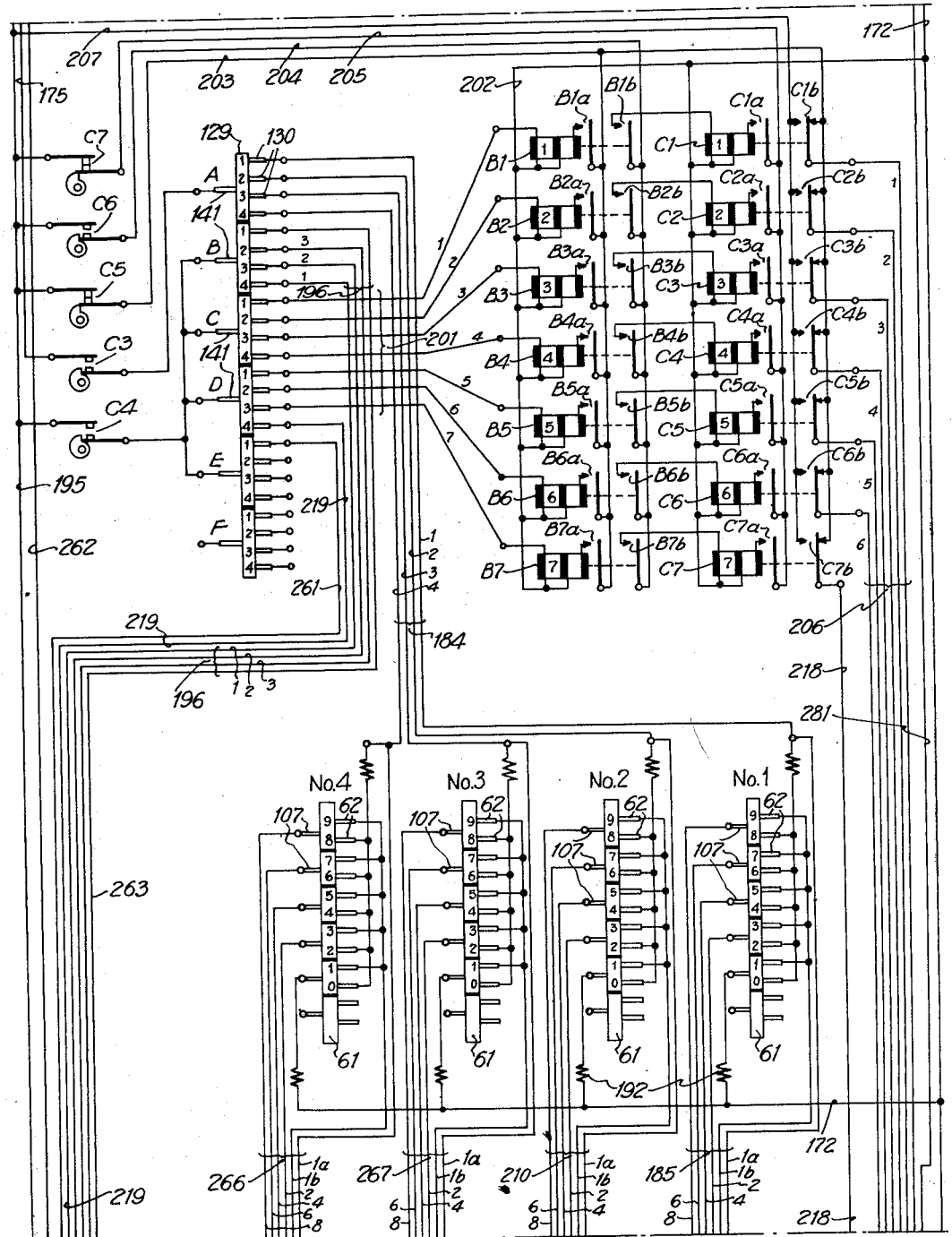
Figure 15C:
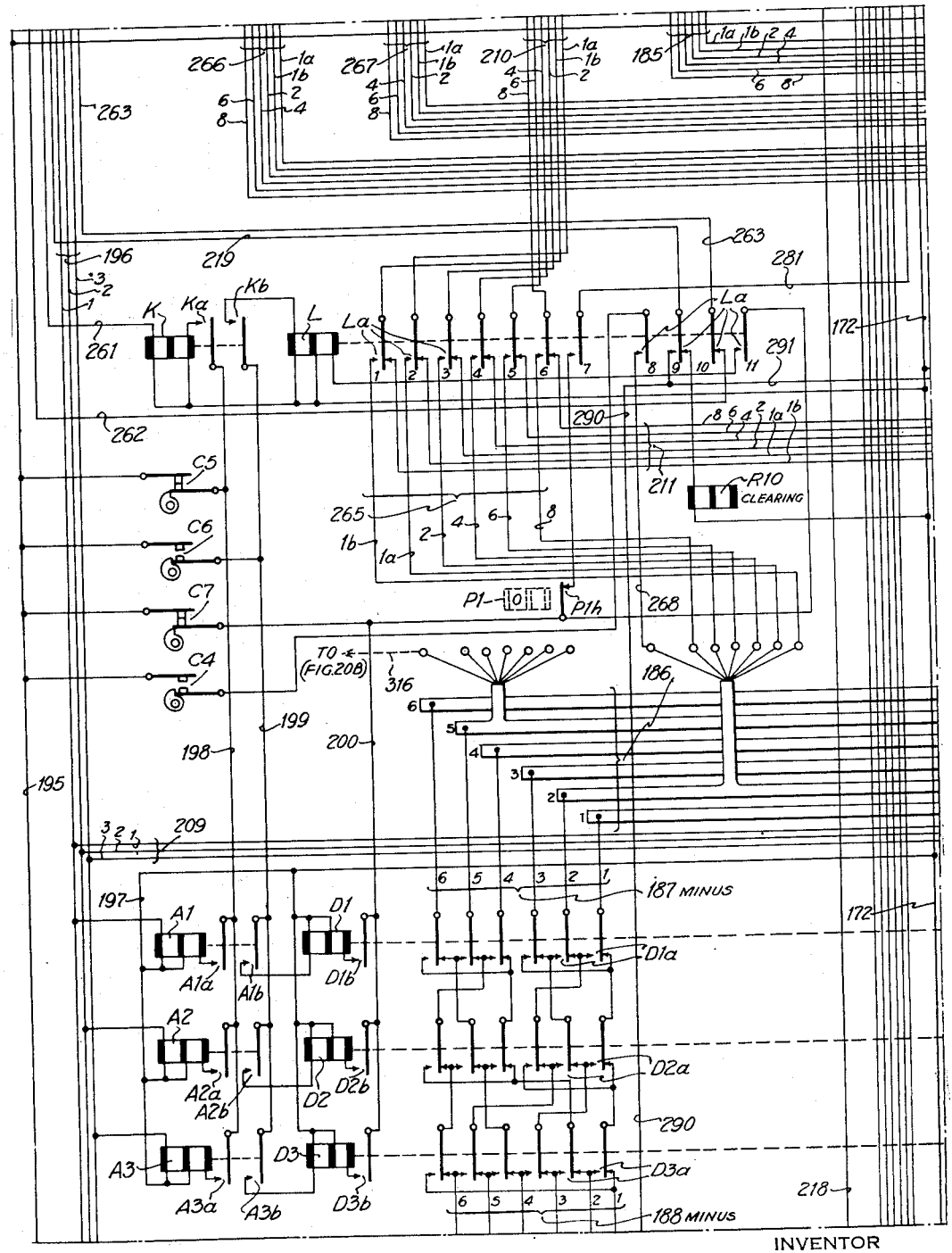
Figure 15D:
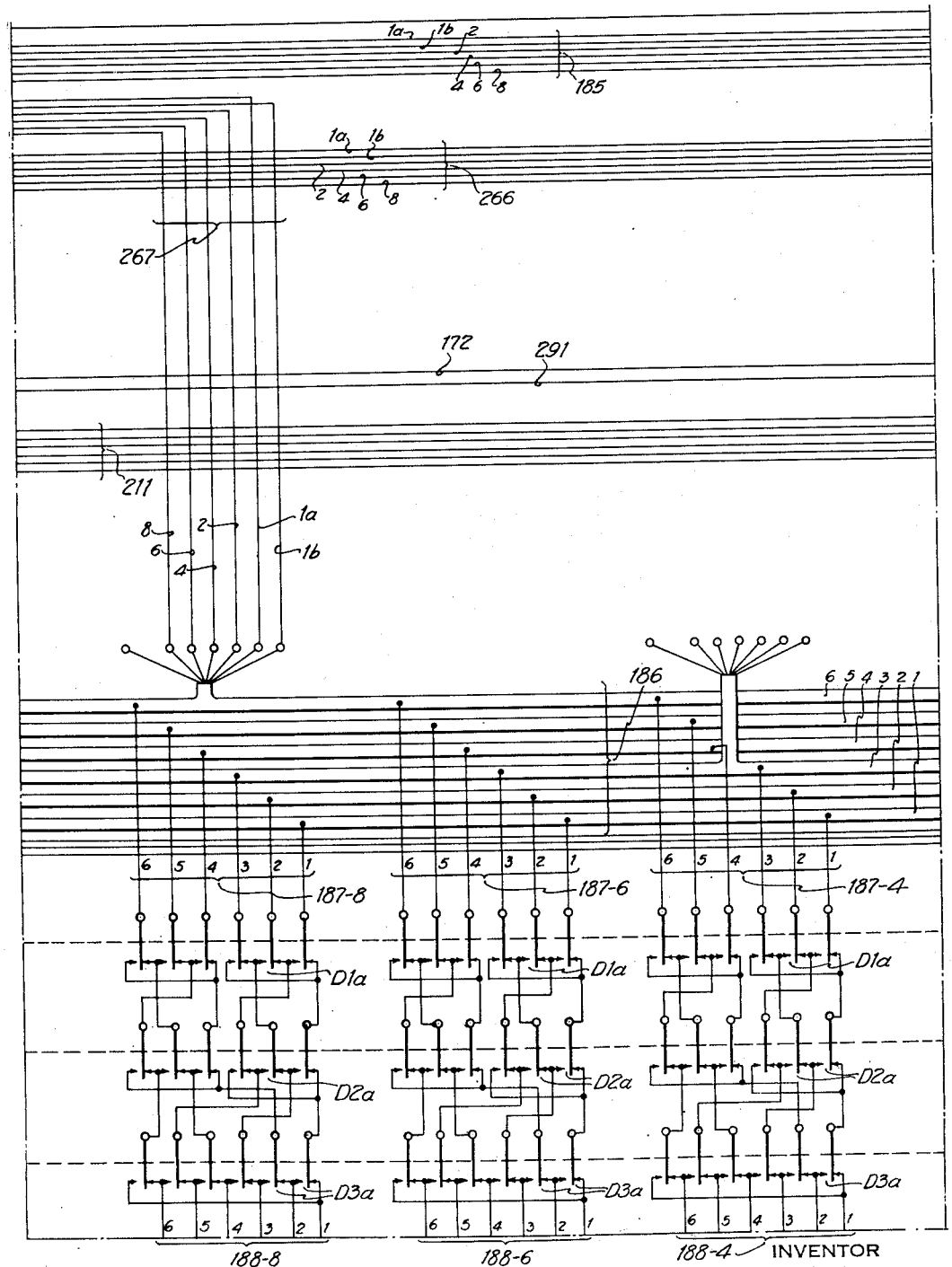
Figure 15E:
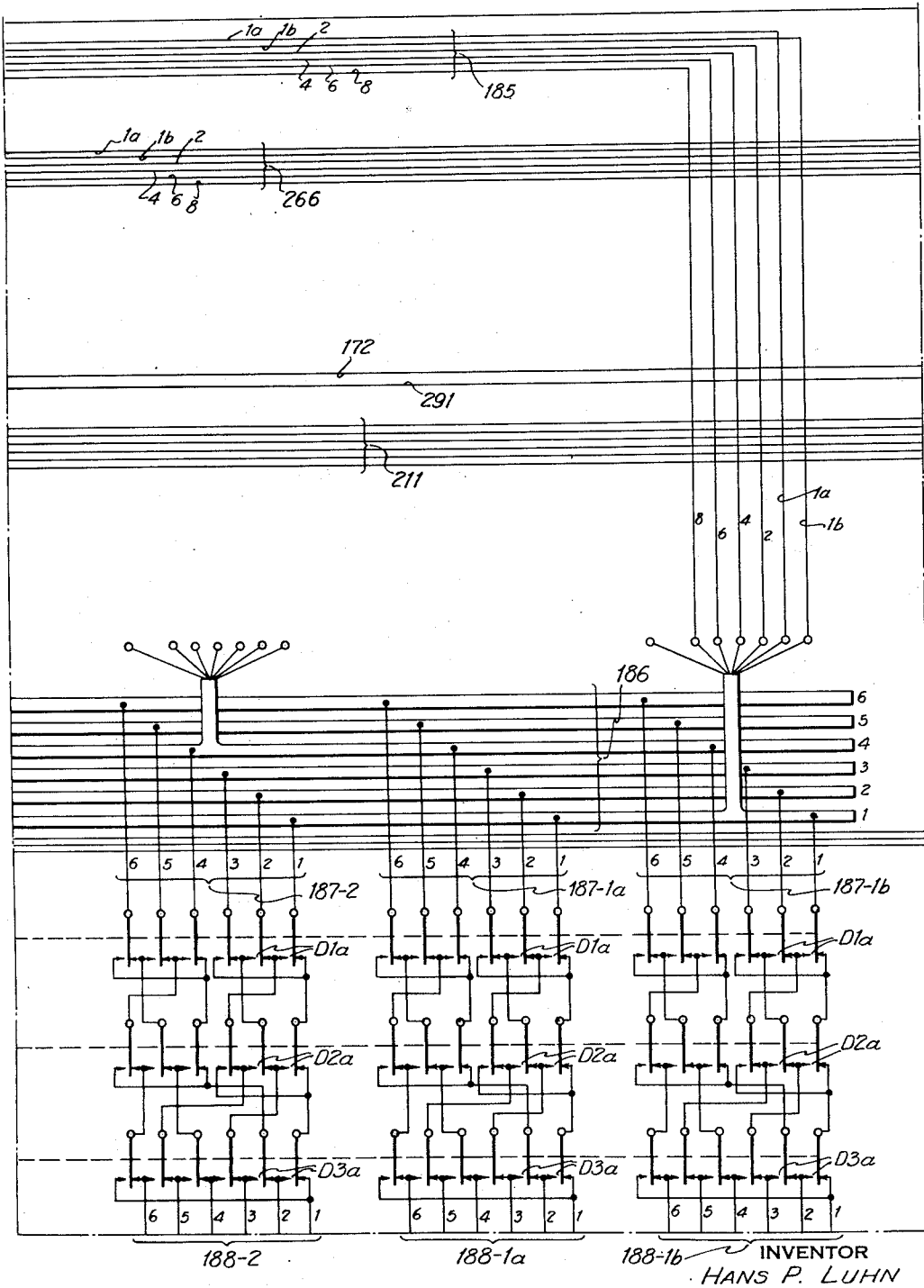
Figure 15F:
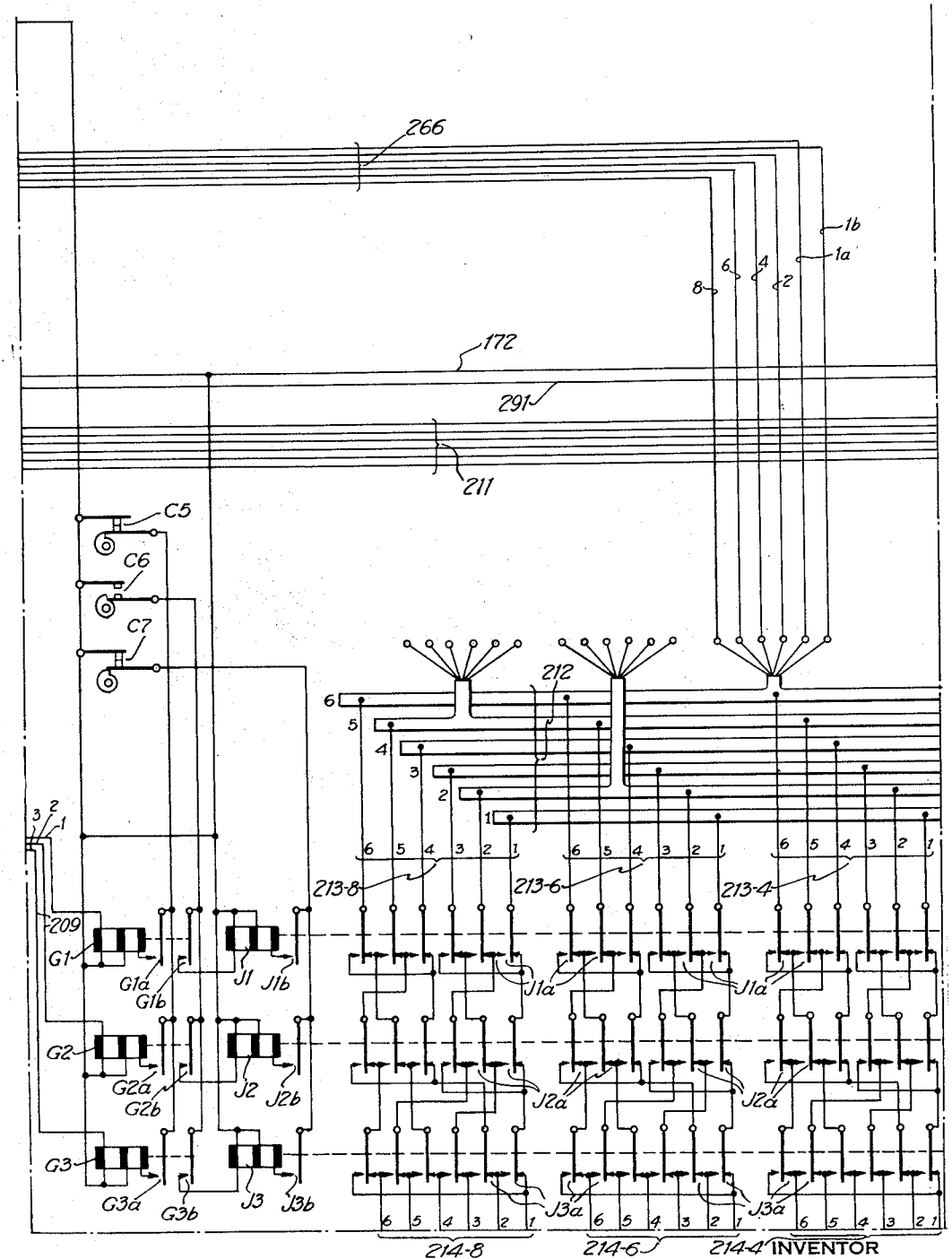
Figure 15G:
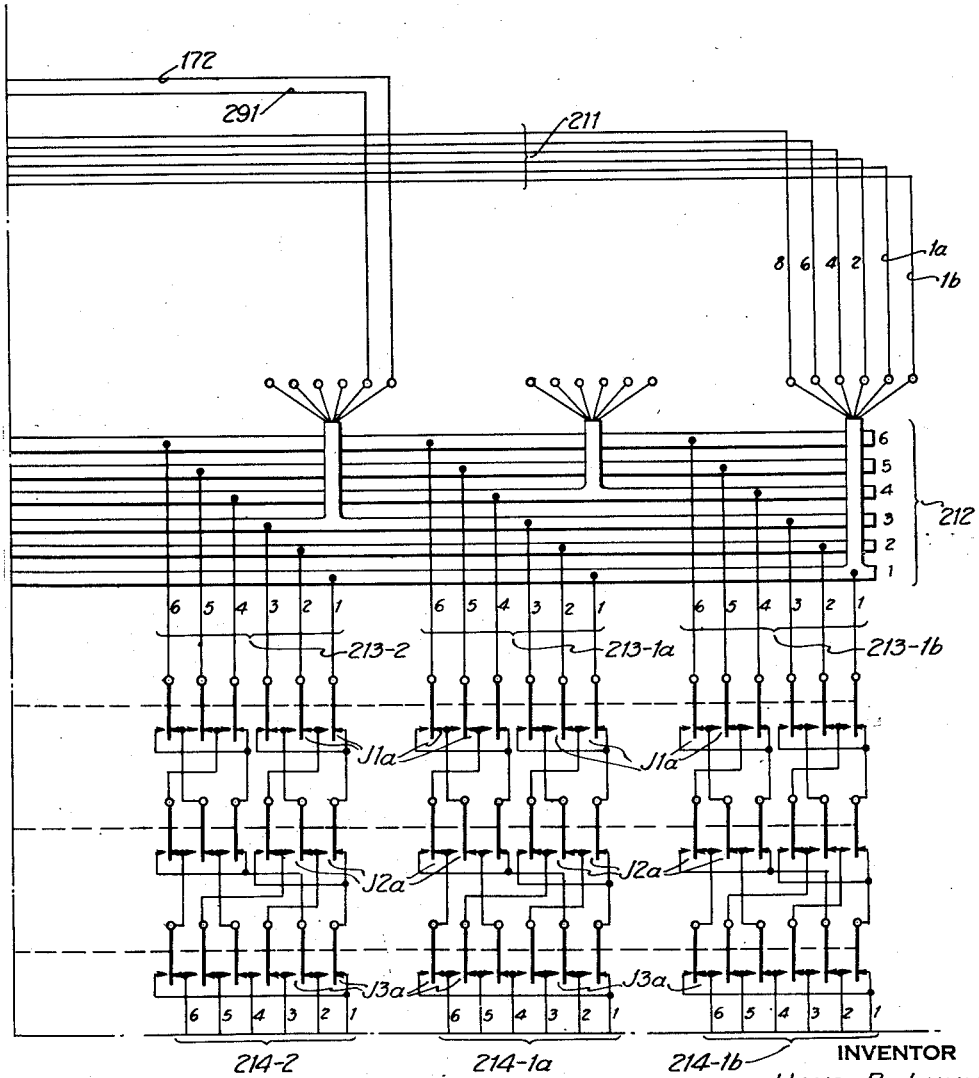
Figure 15H:
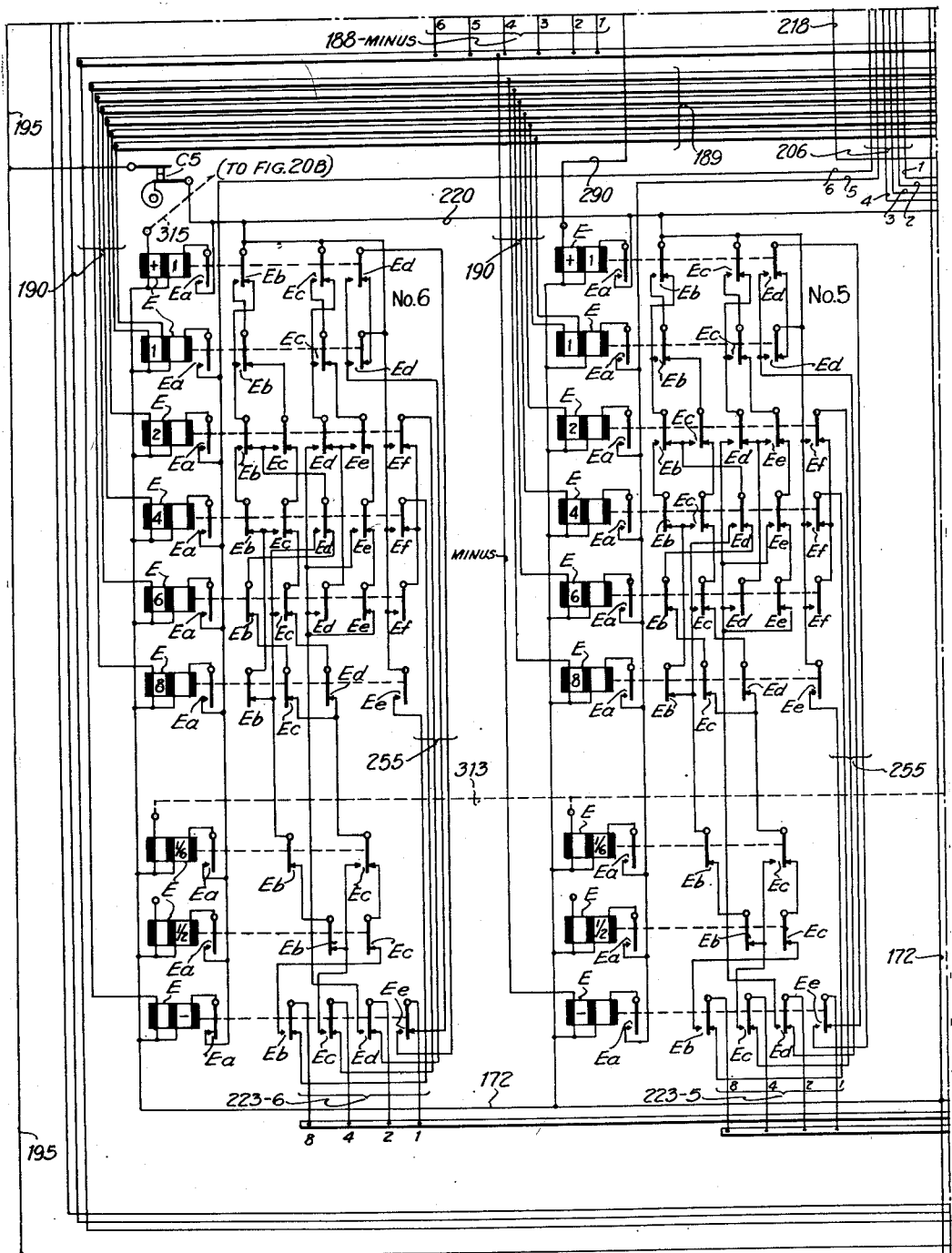
Figure 151:
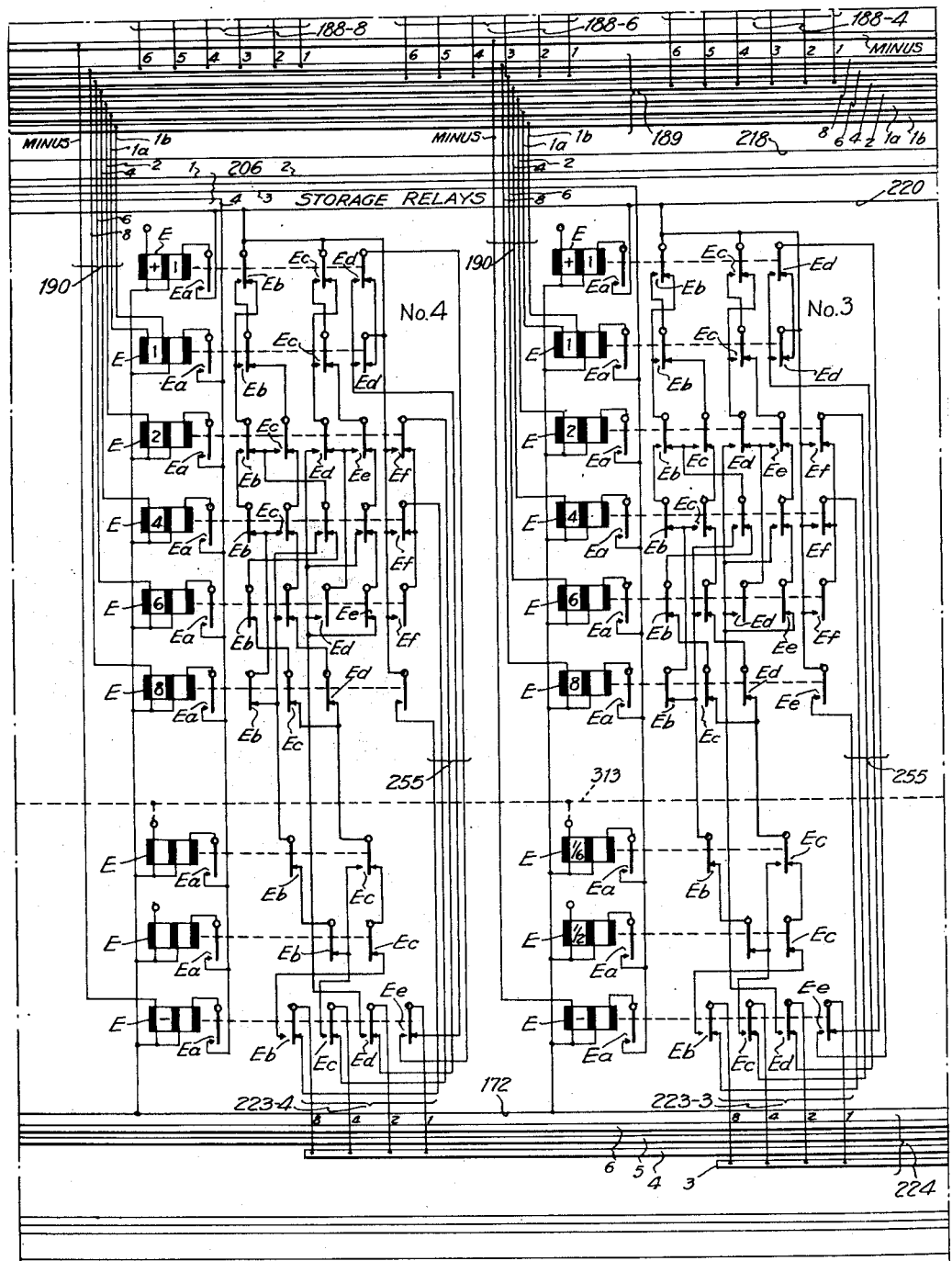
Figure 15J:
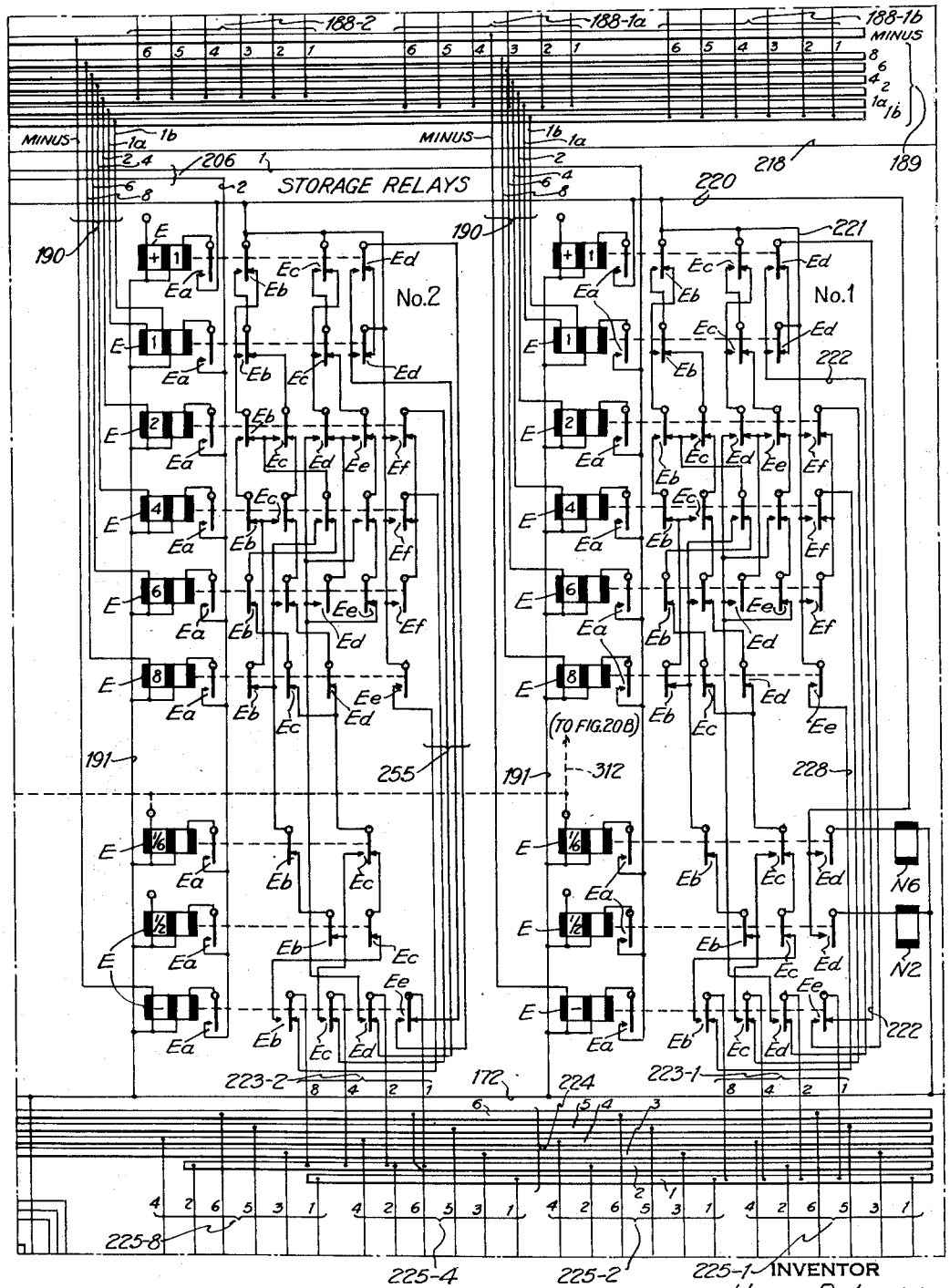
Figure 15K:
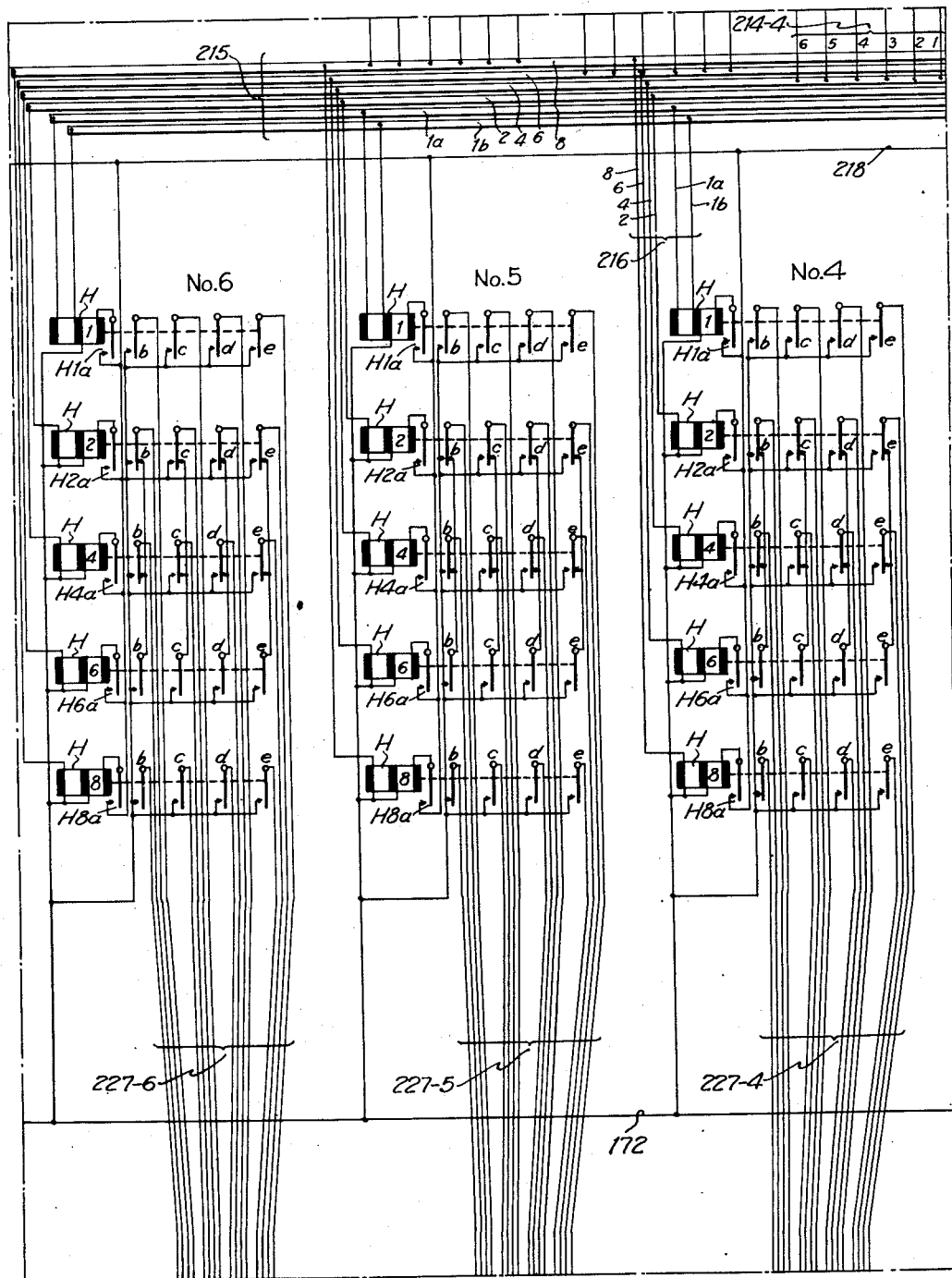
Figure 15L:
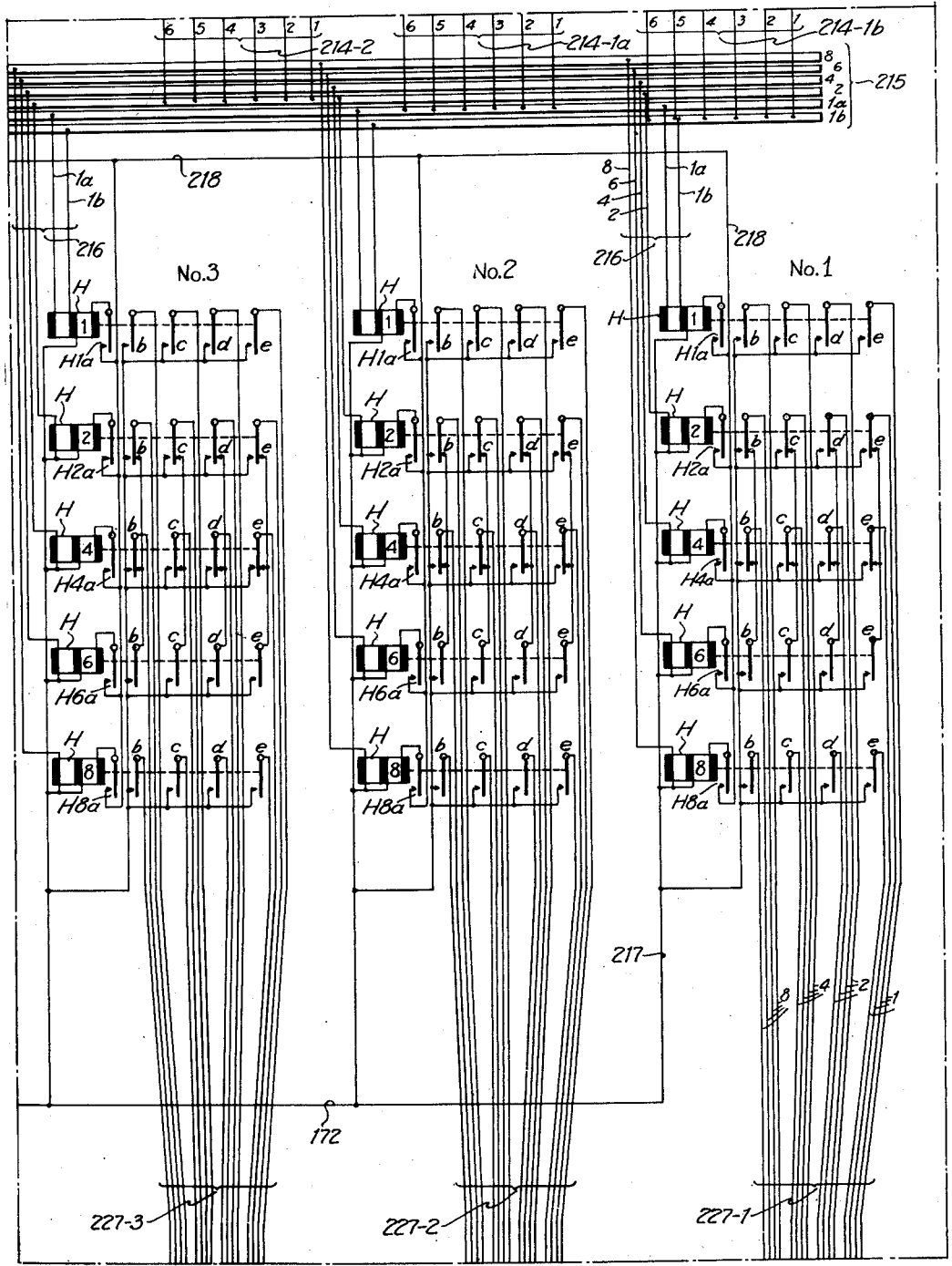
Figure 15M:
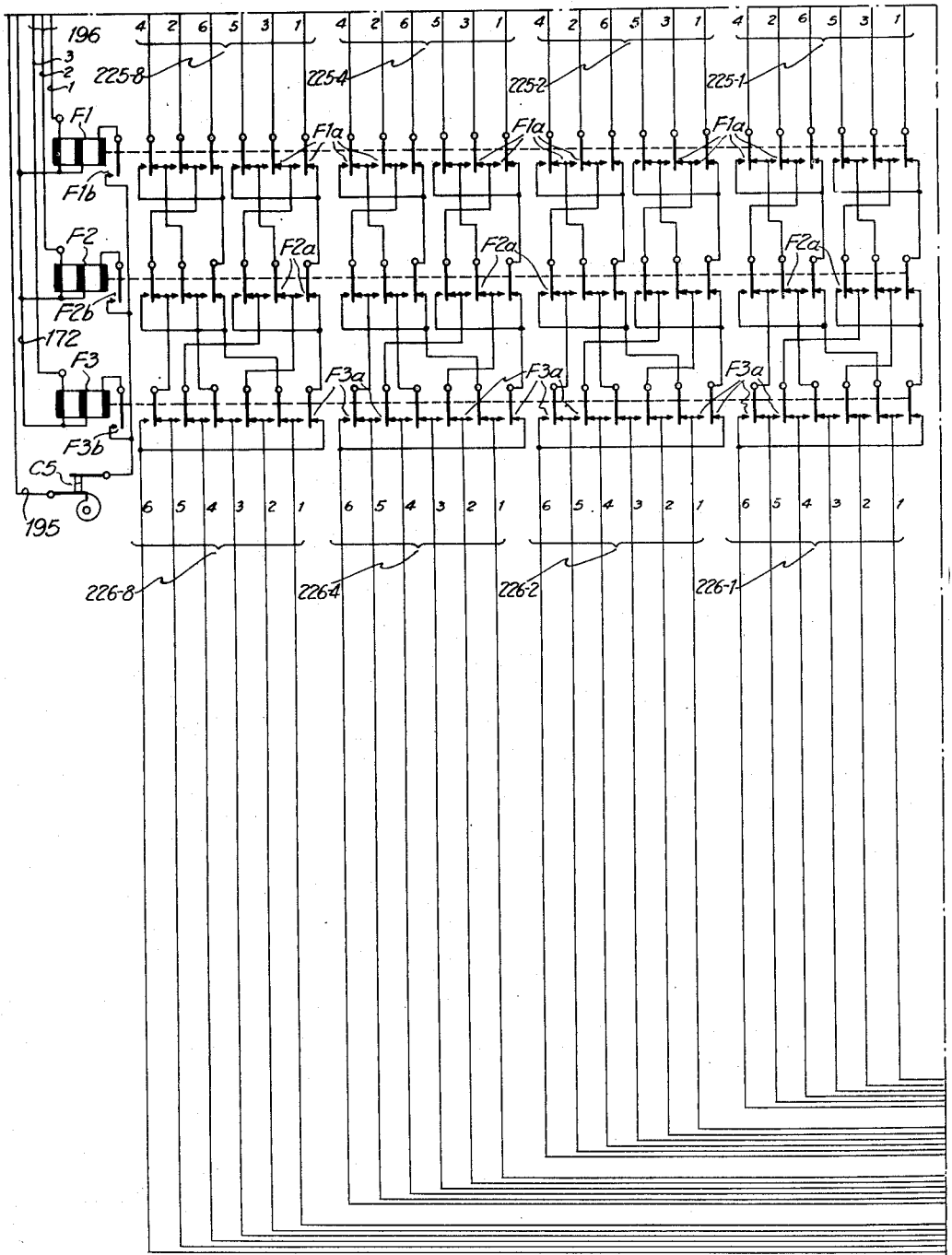
Figure 15N:
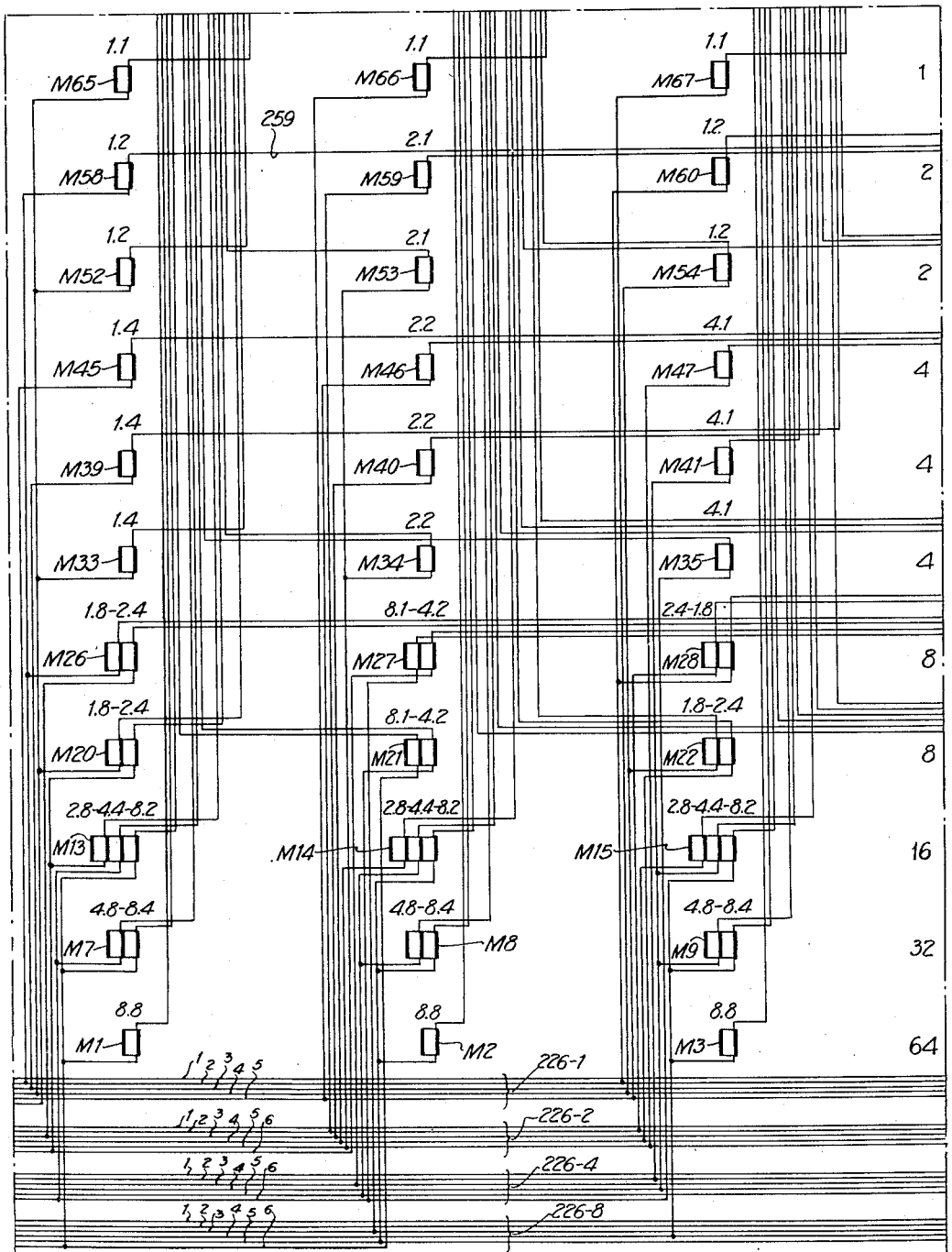
Figure 15P:
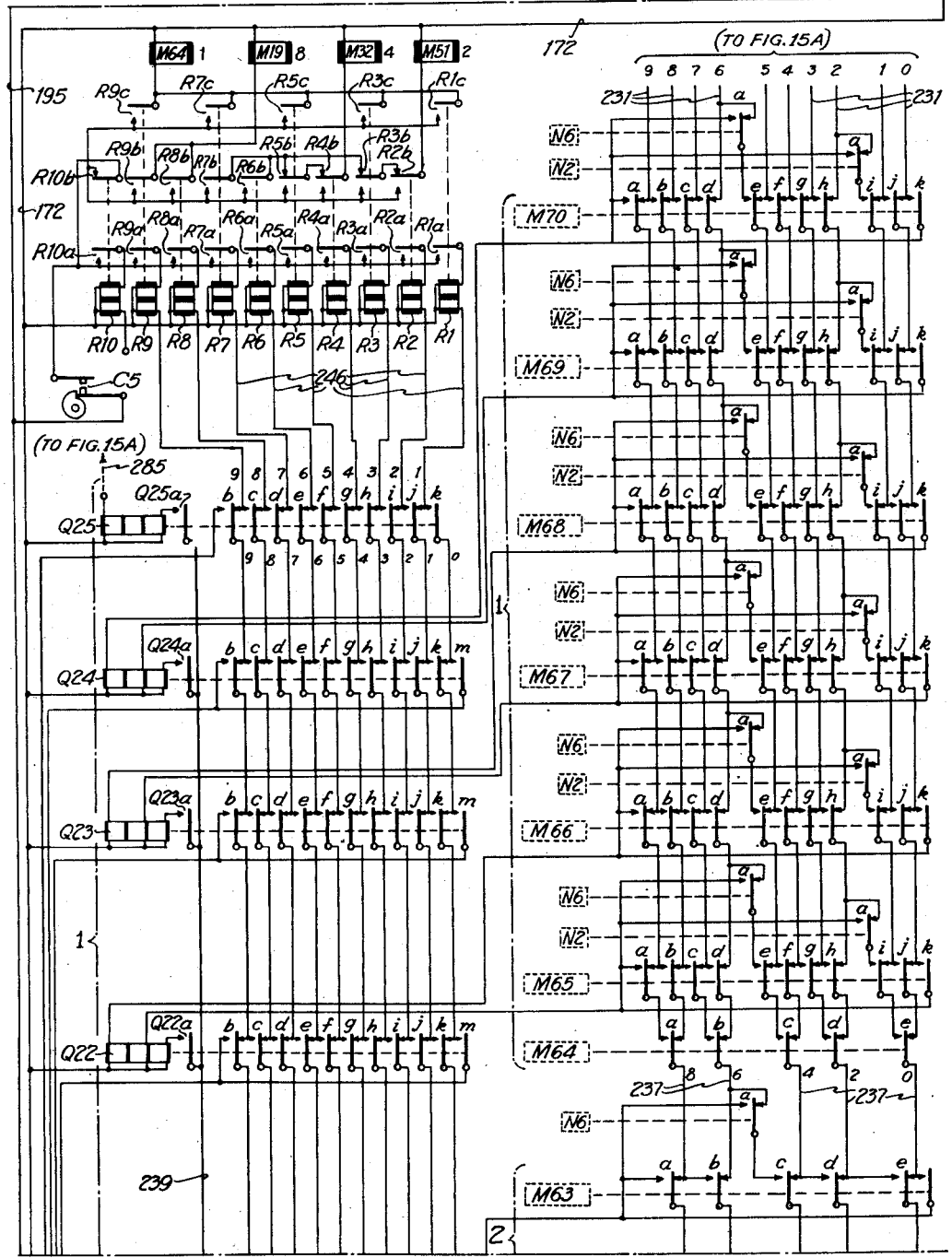
Figure 15Q:
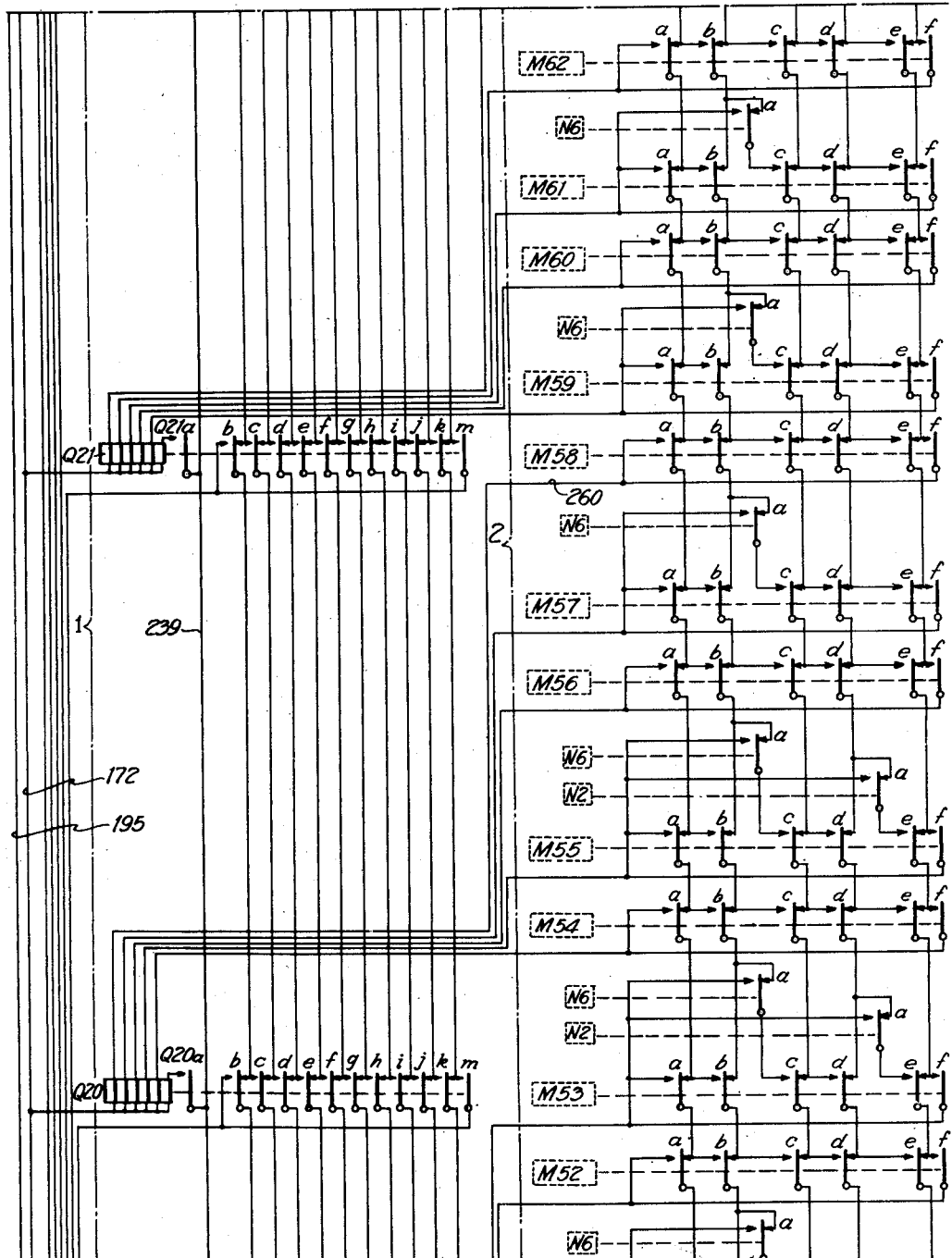
Figure 15R:
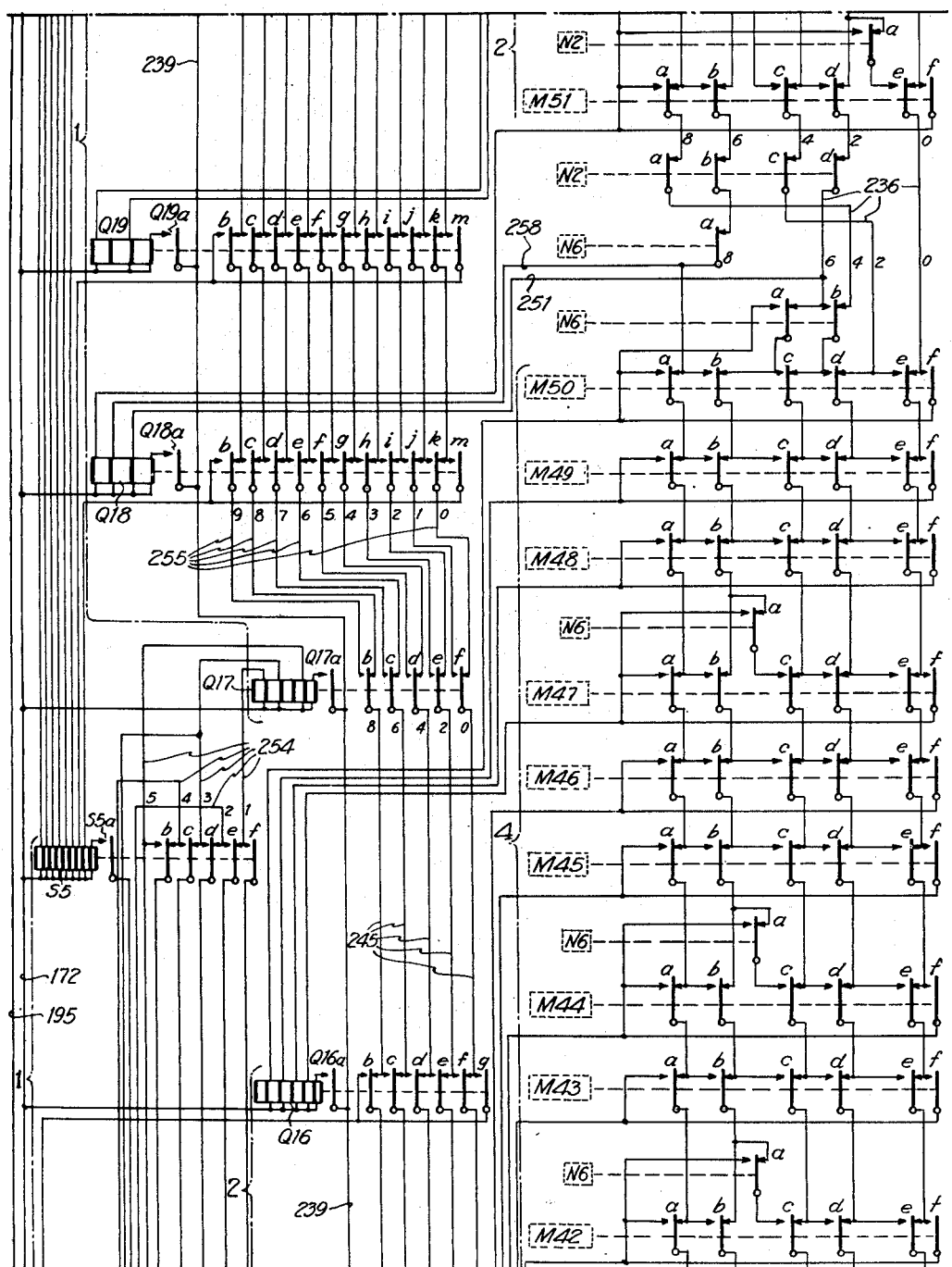
Figure 15S:
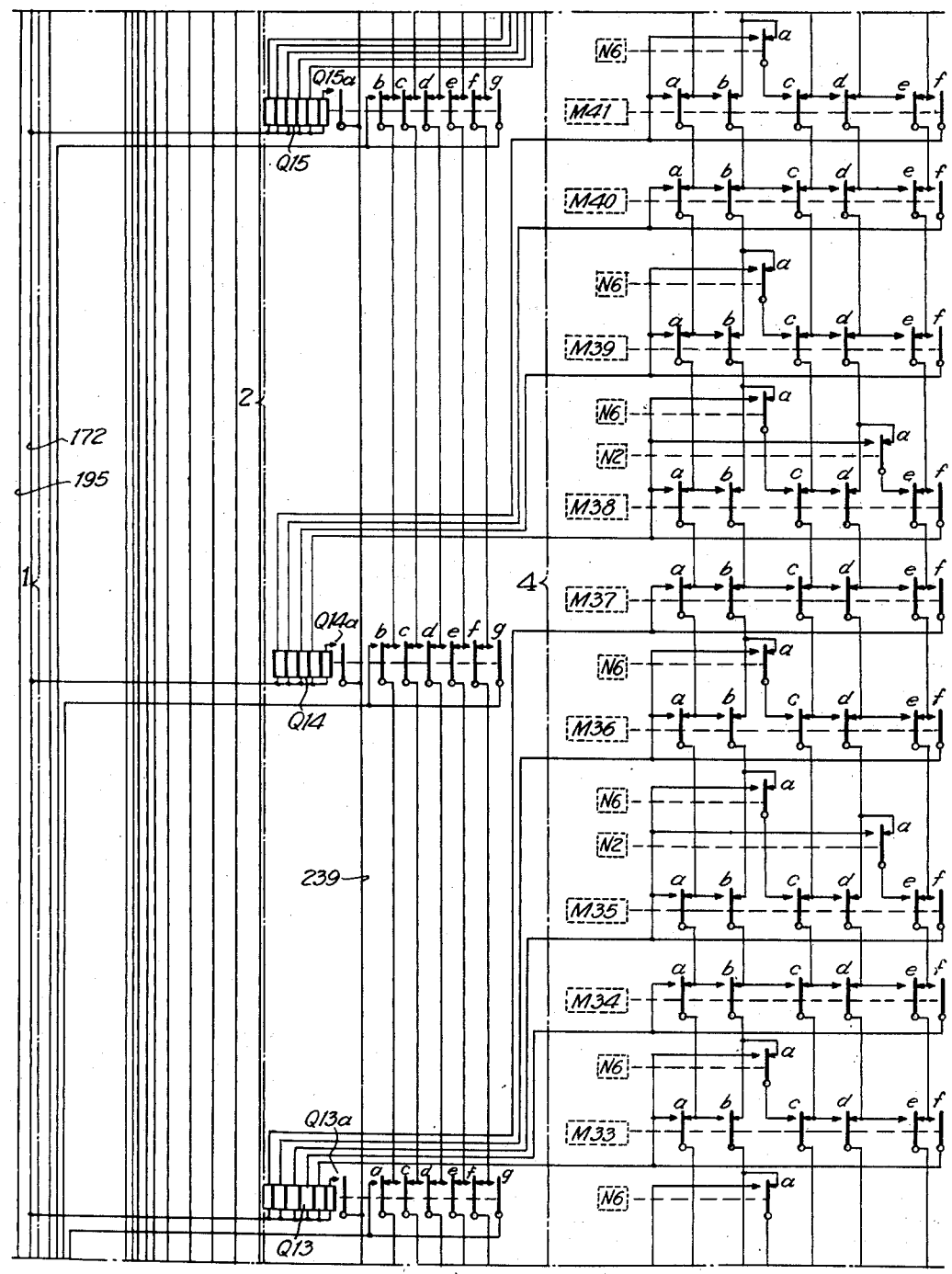
Figure 15T:
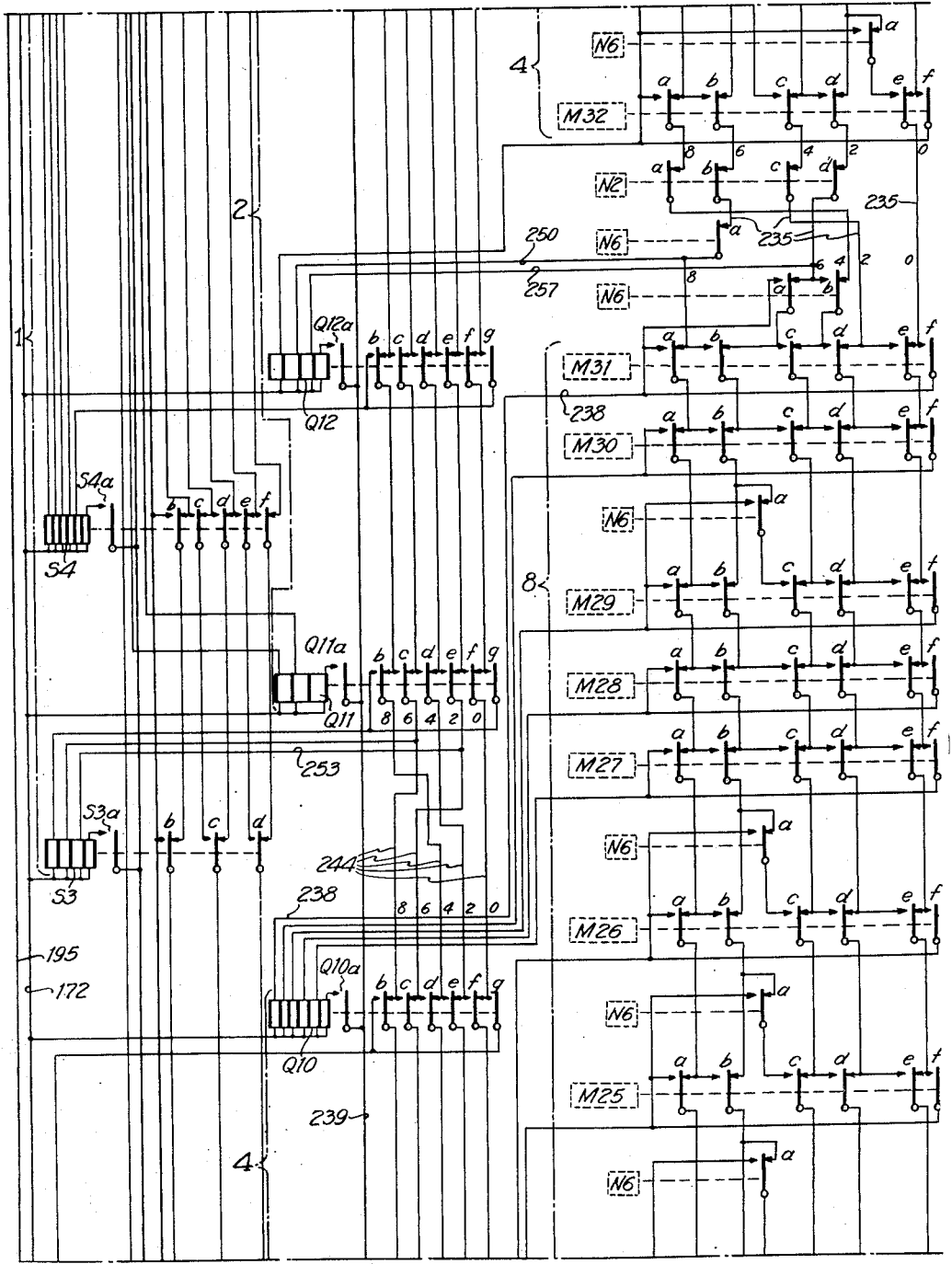
Figure 15U:
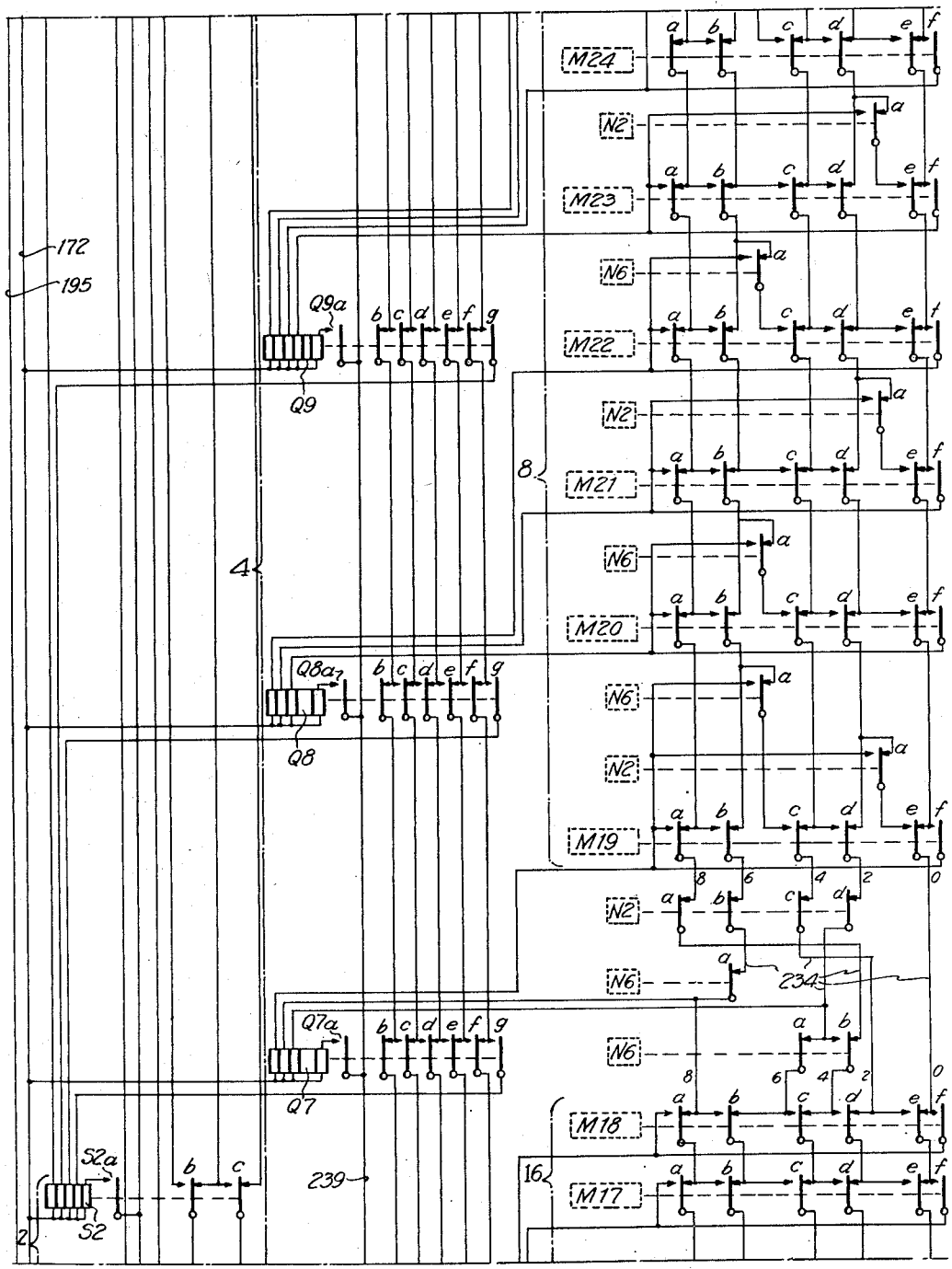
Figure 15V:
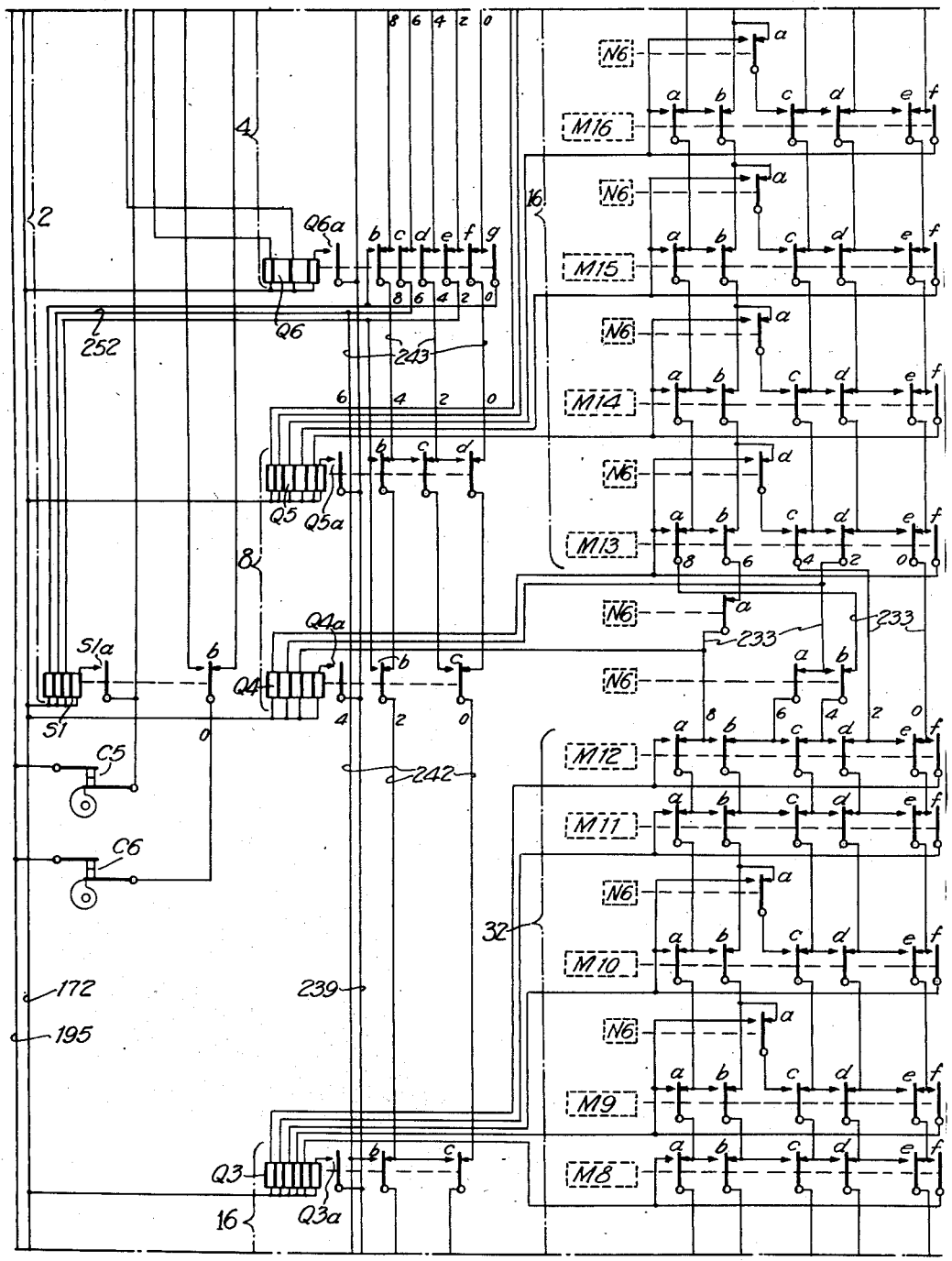
Figures 15W, 17:
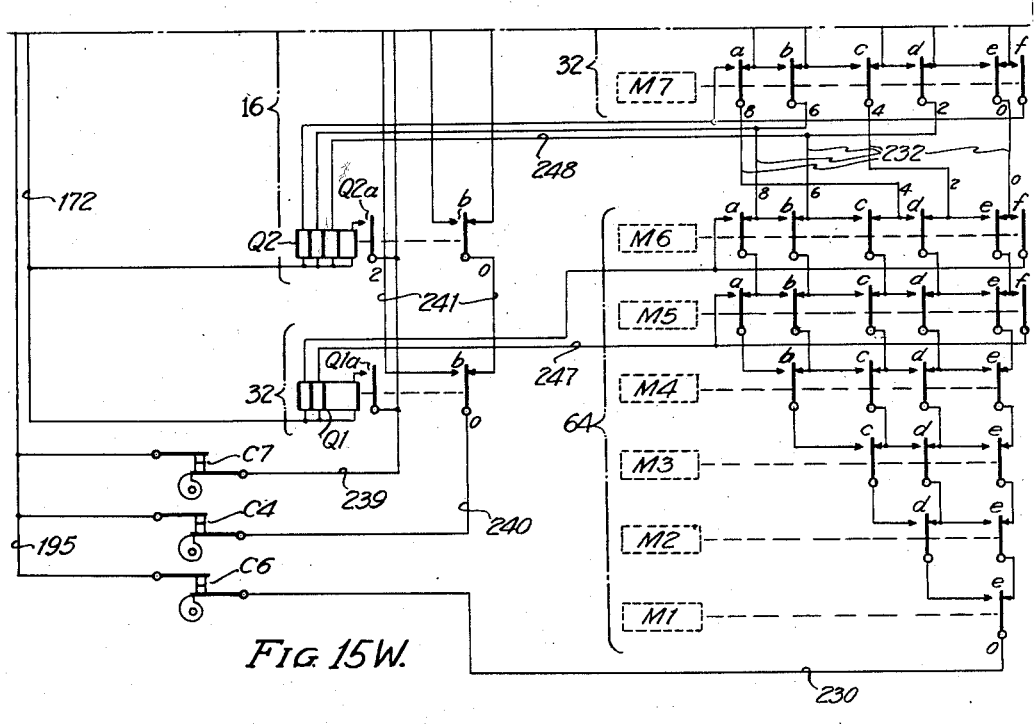
Figure 15X:
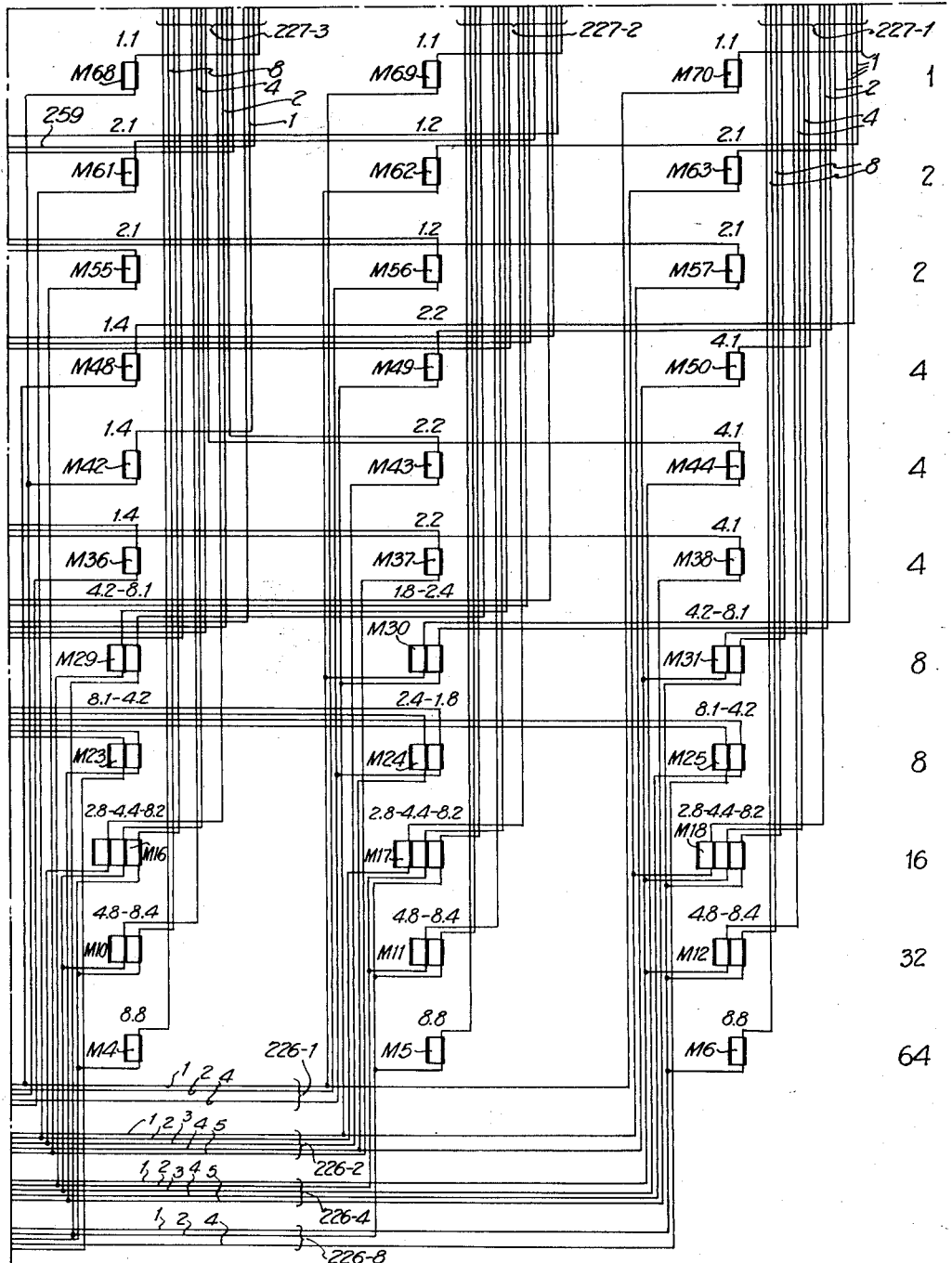

Figs. 15A to 15X arranged as shown in Fig. 17 (on the same sheet with Fig. 15W) constitute a wiring diagram of the apparatus interconnected for a multiplying operation.

Figure 16:
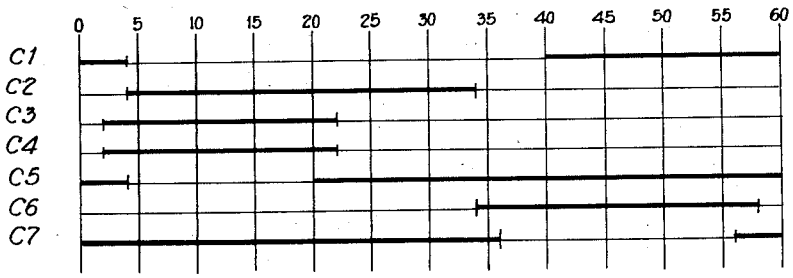

Fig. 16 (on sheet with Fig. 15G) is a timing diagram of the cam controlled contact devices.

Fig. 17 is a diagram indicating the manner of arrangement of Figs. 15A to 15X.

Figs. 18a to 18f arranged in order constitute a sequence chart for a series of operations involved in a multiplying and checking problem.

Figure 19:
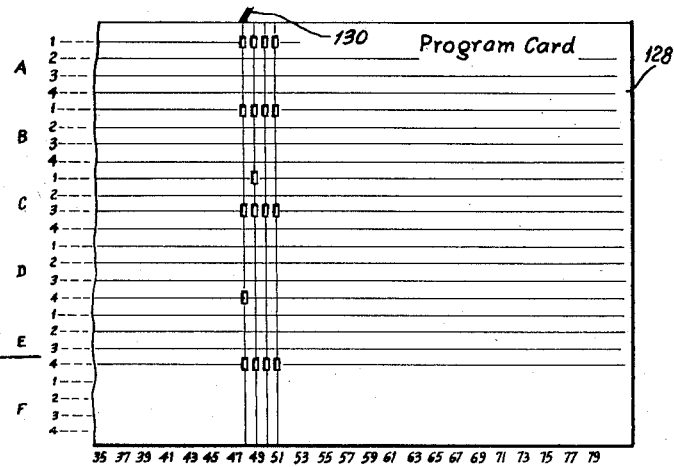

Fig. 19 is a view of a record card and related program card in their relative positions for controlling the machine in the performance of a cross adding problem.

Figs. 20B to 20G arranged as in Fig. 17 and replacing Figs. 15B to 15G constitute a wiring diagram of the apparatus interconnected for the cross adding problem of Fig. 19.

Figure 21:
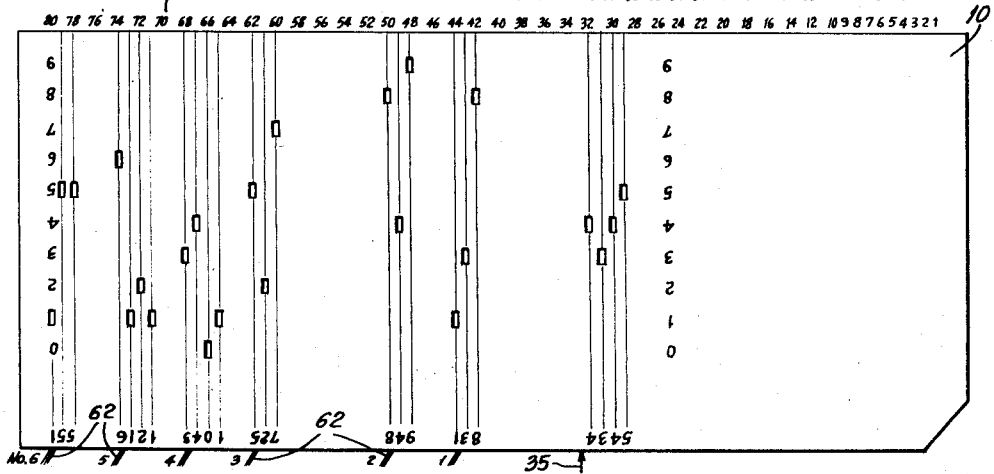

Fig. 21 is a diagram illustrating certain of the steps of operation involved in the problem of Fig. 19.

Fig. 22 is a view of a record card and related program card in their relative positions for controlling the machine in the performance of a double multiplying operation to obtain the sum of the products of two pairs of factors.

Fig. 23 is a diagram illustrating certain of the steps of operation involved in the problem of Fig. 22.

Figure 24:
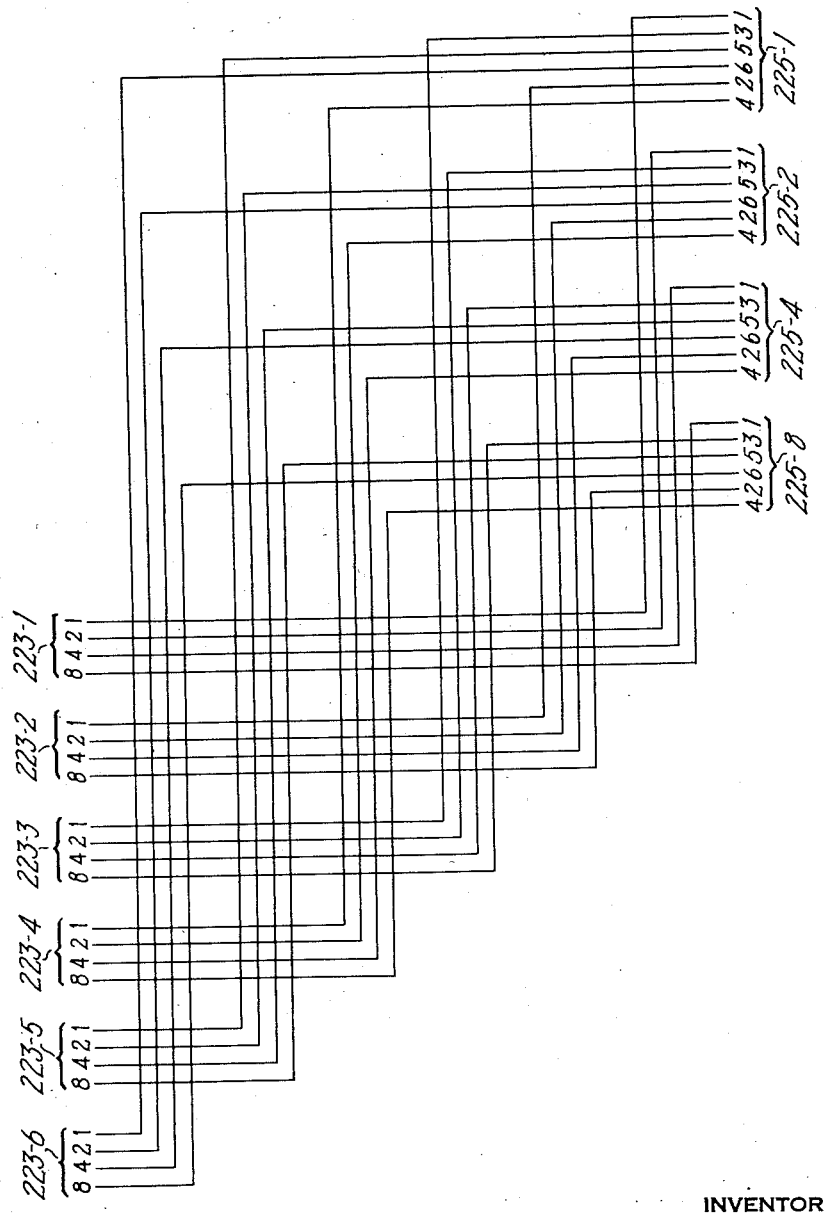

Fig. 24 is a diagram showing in more detail the circuit connections entering and leaving certain cables.

*Record card feeding and sensing mechanism*

*Card picker drive.*—The record card feeding mechanism is of the type shown in the Lee and Phillips Patent 1,772,186, granted August 5, 1930, and in the Weinlich et al. Patent 2,126,595, granted August 9, 1938. Record cards 10 are placed in the usual feed hopper 11 (Figs. 1 and 2) and from here they are advanced singly from the bottom of the stack by a picker 12 (see also Fig. 3a). Picker 12 is supported on bracket 13 secured to a rack 14 which is mounted for horizontal reciprocation in the frame of the machine. With the machine at rest or home position, rack 14 is in the right hand position shown in Figs. 1, 2 and 3a, and in such position bracket 13 engages and holds closed a pair of contacts designated 15.

The mechanism for reciprocating rack 14 comprises a motor M (Figs. 2 and 3a) which through worm and wheel connection 16 drives a shaft 17 upon which is secured a ratchet 18. A clutch magnet 19, when energized, will attract its armature 20 and an arm 21 thereon will cause closure of a pair of contacts 22 and opening of a pair of contacts 23. In such action a latch 24 will engage the central blade of the contacts to hold them in shifted position. Closure of contacts 22 serves to complete a circuit to motor M, so that upon energization of magnet 19 ratchet 18 is caused to rotate. In the plane of the ratchet is a dog 25 pivoted at 26 to a disk 27 freely rotatable on shaft 17 (see also Fig. 4), and prior to the energization of magnet 19 this dog 25 is held out of engagement with the ratchet by a latch 28 pivoted at 29 on disk 27 and biased clockwise by a spring 30 extending between the latch and dog 25. When magnet 19 is energized, arm 31 thereof will rock latch 28 as in Fig. 4 to release dog 25 for engagement with and movement by ratchet 18, whereupon disk 27 is turned counterclockwise and through the usual resilient connection (not shown) with gear 32 the latter is also turned until a radial arm of dog 25 strikes a fixed stop 33, which swings dog 25 clockwise about its pivot and back to its initial latched position.

Thereupon, spring drum 34 through gear connection with gear 32 returns the parts to home position. Gear 32 meshes with teeth in the lower edge of rack 14 so that in this manner the rack 14 is reciprocated upon energization of magnet 19 and on its forward stroke picker 12 (Fig. 3a) advances to the dotted line position indicated, to bring a card 10 into position with its leading edge projected to the left of a row of punches 35. In this position the leading edge is in position to be received in the jaws of a carriage which will subsequently advance the card step by step or column by column past the sensing and punching devices.

*Carriage drive.*—Rack 14 has teeth along its upper edge meshing with a gear 36 free on a shaft 37 (see Fig. 11) and having a cam 40 integral therewith. An arm 41 secured to shaft 37 has a lever 38 pivoted thereto lying in the plane of cam 40 and normally held in the position shown in Fig. 11 by an arm 39 pivoted to the frame of the machine. As soon as rack 14 moves to the left, arm 39 rocks away from lever 38 permitting it to engage cam 40, and rotation of the latter will then turn arm 41 and shaft 37 in a clockwise direction and through a gear 42 on the shaft a carriage rack 43 will be advanced to the right. Upon return of rack 14, cam 40 returns leaving arm 41 in its advanced position.

In Fig. 8 rack 43 is shown viewed from the opposite direction than that of Figs. 3a and 11 and consequently the rack is moved to the left through the devices just described. The upper edge of the rack has ratchet teeth engageable by a stepping pawl 44 which will hold the rack 43 in its advanced position, while the rack 14 returns. A spring drum 45 serves to urge the rack 43 to the right through gears 46 and such advance will later take place step by step under control of the usual escapement device including stepping pawl 44 and holding pawl 47. It will be sufficient to state that a rod 48, when oscillated, will cause pawls 44, 47 to alternate in coacting with the ratchet teeth to allow the rack to escape one tooth or step for each oscillation of the rod.

Referring now to Figs. 1 and 9, rack 43 has secured thereto a plate 49 which in turn is secured to a carriage comprising a pair of parallel angles 50 connected by a tie bar 51. Each angle carries a pair of rollers 52 riding on a stationary guide rail 53, so that as the rack 43 is reciprocated the carriage moves therewith as an integral part of the assembly. With the machine in home position, the carriage is in its left hand position as viewed and shown in Fig. 3 and, as a card 10 is advanced from the hopper, the carriage moves to the right to the relative position with respect to the card 10 and the row of punches 35 as shown in Fig. 10. This is the position to which card 10 is advanced by the picker 12. In this position the leading corners of the card extend into a pair of jaws formed by the right end 54 of each angle 50 and a member 55 mounted for vertical movement on pins 56 in plate 50. A spring 57 normally holds member 55 down to open the jaws for entry of the card corners therebetween.

Fastened to each angle 50 is a spring blade 58 having a lateral projection 59 (see Fig. 9) which, as the carriage moves to the right, engages a stationary incline 60, and as a result the blade 58 is flexed to elevate its free end into the path of the card 10 where it stands at the end of the right hand stroke of the carriage as shown in Fig. 10.

Located to one side of the path of travel of the card is a series of rollers 61 and cooperating brushes 62. These rollers have worm gears 63 at their extremities (Figs. 2 and 6) meshing with a common threaded shaft 64 constantly rotated by a motor M2 through gearing generally designated 65. The two rollers 61 farthest to the right (Fig. 10) being in rotation as the card 10 is advanced to the position shown engage the upper surface of the card and urge it against the elevated edge of blade 58 to locate the card accurately within the carriage jaws. Thereafter, jaw 55 is moved up to clamp the card firmly to the carriage. This upward movement is brought about as follows. A horizontally slidable link 66 is supported on each carriage angle 50 and is held to the left as shown in Fig. 10 as the carriage moves to card receiving position, by a latch 67. When the carriage has moved to its full extent, the left end of latch 67 lies beneath an arm 68 secured to armature 69 (see Fig. 3) pivoted at 70. Upon energization of a magnet 71, the armature is rocked and arm 68 will engage and rock latch 67, whereupon link 66 is released and its spring 72 (Fig. 10) will shift it to the right. A pin 73 in the link will then straighten a toggle formed by a link 74 between pin 73 and fixed eccentrically adjustable lower pin 56 and a link 75 between pin 73 and a pin 76 in the slidable member 55. Straightening of the toggle will force member 55 up against card 10 to secure the card to the carriage.

*Card ejecting devices.*—With the card gripped by the carriage the latter is now advanced step by step to the left under control of the escapement mechanism until it reaches the position shown in Fig. 3. When the parts arrive in such position, a bell crank 77 pivoted on each angle 50 has its horizontal arm under arm 68 and its vertical arm extends into a slot 78 in link 66. Energization of magnet 71 at such time will rock arm 68 against bell crank 77 and rock the latter to draw link 66 to the left, where it will be held by latch 67. Such movement will result in breaking the toggle 74, 75 to lower member 55. Constantly running rollers 61 thereupon rapidly advance the card through the now open gripper jaws into a hopper 79, guided by stationary deflector blade 80. The stop blade 58 is in its lowered position at this time, since when the carriage commenced its leftward movement the extension 59 of the blade moved out of contact with fixed incline 60.

The brushes 62 (see Figs. 3 and 6) in each row are insulated from one another and mounted in holders 81. The several holders are supported in a frame having a pair of side plates 82 whose upper and lower edges are notched and each holder is provided with integral teeth 83, through which the holder may be located in selected positions along the plates. The bottom of each holder has a pair of toothed slides 84 that may be retracted toward one another, so the holder may be raised to lift teeth 83 out of the cooperating notches and selectively set in other notches. Thereafter, slides 84 are projected into corresponding notches in the lower edges of the plates 82 and locked by set screws 85.

The frame supporting holders 81 is supported at its left end (as viewed in Figs. 3 and 3a) on a pair of eccentric cams 86 on a rod 87 and at its right end by a pair of latches 88 carried by eccentric cams 89 on a rod 90. By means of a finger piece 91 (Fig. 7) the latches 88 may be rocked out of engagement with cooperating projections of the frame to allow the latter to rock clockwise as viewed in Fig. 3 about cams 86 and, when in such position, the holders 81 may be selectively adjusted along the side plates 82.

When the machine is in operative condition, the frame is held in the upper position to press brushes 62 against rollers 61 and the eccentric cams 86, 89 are in the position shown in Fig. 3. In such position the upper flattened end of latch 88 (Fig. 7) is spaced slightly away from a part of the fixed framework of the machine as designated at 92, so that the latch cannot be rocked with the frame elevated. To lower the frame a knob 93 (Figs. 5 and 6) through a unidirectional coupling 94 will turn a rod 95 after a finger piece 96 is raised to lift a tooth thereon out of a notched disk 97 secured to the rod. Finger piece 96 when lifted opens a pair of safety contacts 98. Rod 95 carries a bevel gear 99 meshing with a bevel gear 100 on a rod 101, which also carries a bevel gear 102 (see Fig. 8) meshing with a bevel gear 103 on rod 87. Gear 100 meshes with a bevel gear 104 on rod 90. Through these connections both rods 87 and 90 are turned through 180° to lower the brush holder frame, after which the latches 88 may be rocked to afford access to the brushes. When the frame is swung back again and latched, the brushes will be out of contact with rollers 61 and knob 93 is then turned 180° to its initial position to elevate the frame and bring the brushes into contact with the rollers in an arcuate path from left to right as viewed in Fig. 3, thereby preventing damage to the brushes as they contact the rollers.

The rollers 61 are journaled in holders 105 which are located in an upper frame comprising notched side plates 106 (Figs. 3 and 6). These holders are set and held in position in the same manner as holders 81 and all except the two extreme holders are provided with a set of six brushes 107, each of which contacts a separate insulated section of the related roller 61.

As seen in Fig. 6, each section of roller 61 has a single brush 107 contacting its upper surface and a pair of brushes 62 contacting its lower surface. The reason for this arrangement will be explained later in connection with the description of the circuits completed therethrough. The frame formed by plates 106 is pivoted at 108 (Fig. 3a) and held in position by a latch 109 (Fig. 3). To locate the holders, the frame is swung to a vertical position about pivot 108, and such swinging is also effected when access to the card passing the brushes is desired.

*Punching mechanism.*—The punching mechanism is of well known construction and comprises a row of twelve punches 35 (Fig. 3a) over the top of each of which lies the end of a horizontally slidable interposer 110. Upon energization of a magnet 111, lever 112 is rocked to depress key stem 113 to rock bell crank 114 and shift the related interposer 110 to the left to bring its end beneath a pivoted punch operating bar 115. At the same time the side of a notch in the interposer engages and rocks a bail 116 to draw upwardly a hook 117 to close a pair of contacts 118. Through circuits to be described, contacts 118 energize magnet 119 which will attract its armature and through linkage generally designated 120 will rock bar 115 clockwise to press the end of the advanced interposer 110 against punch 35 and force the latter through the card. Depression of the end of interposer 110 will cause rocking of bail 121 connected to a rod 48, so the latter rocks and through an arm 122 (Fig. 8) thereon pawl 47 is lowered into engagement with a ratchet tooth in rack 43 to hold the rack and connected card carriage while the punch penetrates the card. Concurrently, pawl 44 is raised out of engagement with the rack and through its usual loose connection on rod 48 its nose shifts slightly to the left, so that when rod 48 rocks back pawl 47 is withdrawn and pawl 44 is lowered into engagement with the next ratchet tooth to space the carriage one column.

When pawl 44 is rocked, it engages and rocks a lever 123 to open so-called floating cam contacts 124 whose reclosure is delayed by a cam 125 as explained in the patent to W. F. Gutgesell, No. 1,939,049, granted December 12, 1933. As further set forth in this patent, so-called automatic spacing may be effected by directly energizing magnet 119, in which case bar 115 will be rocked against a so-called space interposer (not shown) which is similar to interposers 110, except that its left end is normally extended under the bar 115, so that the escapement bail 121 will be rocked to effect escapement without accompanying punching.

*Program card carriage.*—Referring to Figs. 1, 5 and 9, the carriage rack 43 has secured thereto a pair of arms 126 and 127 which travel back and forth with the carriage, and between which there is placed a program card 128 which accordingly moves back and forth with the arms. With a record card 10 gripped in the carriage the leading and trailing edges thereof are aligned respectively with the corresponding edges of the program card 128. Extending across the path of card 128 is a contact roller 129 and a row of twenty-four sensing brushes 130 (see Fig. 6) which are movable into contact with the card along a line coextensive with the row of punches 35, so that when a column of record cards 10 is at the punches, the corresponding column of card 128 (that is a column equally distant from the leading edge of the card) is at the row of brushes 130.

Roller 129 is journaled in a door 131 pivoted at 132 and after card 128 is placed between arms 126, 127 the door is closed and held by latch 133 and through engagement with a pin 134 closes door contacts 135. This brings roller 129 into contact with the upper surface of card 128. A magnet 136 when energized will in the usual manner, through linkage generally designated 137, elevate brushes 130 into engagement with the under surface of the card 128. Also, when magnet 136 is energized, its armature 138 will engage contacts 139 and 140 to open the former and close the latter. It will be understood that for the passage of a succession of record cards through the machine, the program card will remain in its carriage and will advance step by step past brushes 130 with each of the record cards in turn. The roller 129 (Fig. 6) is comprised of six separately insulated sections, each of which is in line with a set of four of the brushes 130 and contacting each section there is also a single brush 141 as shown.

*Other contacts.*—The card feeding and punching devices effect the incidental operation of a number of contacts as follows. When the carriage rack 43 is in its so-called last column position (to the right in Fig. 8), a finger 142 thereon engages and rocks a lever 143 to open a pair of contacts 144 and close a pair of contacts 145. When the rack is in its extreme right hand position as viewed in Fig. 3 (that is, in its card receiving position), an adjustable screw 146 will engage the center blade of pairs of contacts 147, 148 to open the former and close the latter. When magnet 71 (Fig. 2) is energized, an arm 149 secured to its armature is rocked therewith to close a pair of contacts 150.

A number of cam controlled circuit breakers or contacts are required in the apparatus and the controlling cams are secured to a shaft 151 (Figs. 13 and 14), where they are designated 152 generally. These cams operate contacts generally prefixed C, as C1, C2, etc. The shaft 151 is normally at rest and is driven in the following manner. A motor M3 through belt and pulleys 153 drives a shaft 154 which through reduction gearing 155 drives a shaft 156 coaxial with shaft 151. Secured to shaft 156 is a roller 157 (Fig. 14) about which are spaced three balls 158 in the plane of a disk 159 having an internal camming surface 160. Adjacent to disk 159 is a disk 161 with three depending fingers 162 normally abutting the balls to hold them against springs 163 in the position shown. A spring 164 urges disk 161 counterclockwise with respect to disk 159 and is normally restrained against such action by armature latch 165 and back stop latch 166. Thus, rotation of roller 157 will be idle. Upon energization of magnet 167 armature 165 and stop 166 are withdrawn and spring 164 will cause disk 161 to rock slightly counterclockwise with respect to disk 159.

In doing so, fingers 162 move away from balls 158 allowing their light springs 163 to urge the balls into the recesses formed by the cam surface 160, so that a clutching action is effected between roller 157 and disk 159 to drive the latter, which is secured to shaft 151, and will consequently drive the cams 152. If magnet 167 is energized only momentarily, its armature will engage the next following projection of disk 161 and hold it while the companion projection of disk 159 moves up to it with the result that the two disks are again relatively displaced as in Fig. 14 and shaft 151 is stopped after having made a sixth of a revolution. It will be apparent that other forms of partial revolution clutches may be employed, other than the one illustrated by way of example in Figs. 13 and 14.

*The record and program cards.*—In Fig. 12 are shown a record card and the program card juxtaposed in the relationship they have in the machine. Each card has columns numbered 1 to 80, and it will be noted that the record cards are fed through the machine, face up, with the highest numbered column leading so that, when the eightieth column is at the punches 35, the first column of the program card is at the sensing brushes 129. Each record card has a multiplier amount punched in a field 10A, such as 95205 in the example shown, and also a multiplicand amount such as 256339801479 punched in field 10B. A six column field is set aside for the multiplier factor and a twelve column field is set aside for the multiplicand factor. Factors of a lesser number of digits may, of course, occur in any of the record cards. The product obtained as a result of multiplication will be punched in a field 10C.

The program card is divided into six horizontal sections designated A to F, and each of these is subdivided into four rows of punching positions numbered 1 to 4. For the multiplying and checking operations which will first be dealt with, section F and rows 2, 3 and 4 of section E are not utilized. The considerations governing the location of perforations in this card will now be given for the "Multiply" field 128A of card 128.

As the multiplicand field 10B of card 10 has twelve columns, twelve perforations are made in row 1 of section A beginning with a column (18) coinciding with the column just to the left of the highest ordered column of the product field 10C which is to receive the units digit of the product (column 63). Five perforations are made in row 2 of section A, since the multiplier field has five places. Row 1 of section B has seventeen perforations determined by the fact that the product field 10C of card 10 is to have digits punched in one or more of the seventeen columns of such field or the higher orders are to be automatically spaced or skipped, if the size of the product does not complete the field.

Rows 2, 3 and 4 of section B are arbitrarily punched for seventeen columns, so that column by column the order is 2; 3; 2 and 3; 4; 4 and 2; blank. This series is then repeated to the extent of the field 128A. Circuits controlled by these perforations control so-called rotators whose operation will be explained in connection with the circuit diagram.

Rows 1, 2, 3 and 4 of section C and rows 1 and 2 of section D are also punched arbitrarily as shown, each with eight perforations which are displaced one column to the right for the six successive rows. Circuits controlled by these perforations control so-called E storage devices in a manner also to be explained in the circuit diagram.

Row 3 of section D has sixteen perforations, that is, one less than the capacity of the field 128A. Row 4 of section D has a single perforation in the first column of the field and its function is to clear a certain relay setting in the apparatus preparatory to a new computation.

In the Check field 128B, the perforations will cause the machine to remultiply the factors and subtract the result from the product obtained during the initial computation to obtain a check of the accuracy thereof. In the second multiplication, different circuit connections are employed as will be pointed out and, if a disagreement occurs, the machine will stop. Row 3 of section A has seventeen perforations and controls the reading of the product punched in the record cards. Rows 3 and 4 have twelve and five holes respectively to control the rereading of the multiplicand and multiplier factors in the record card. No holes are punched in row 1 of section B.

Rows 2, 3 and 4 of section B are punched as for field 128A. Rows 1, 2, 3 and 4 of section C and rows 1 and 2 of section D are also punched as for field 128A, except that the first set of eight holes does not begin with the first column but with the fourth instead. This, as will be seen from the explanation of the circuit diagram, will bring into operation different combinations of relays during multiplying operations, so that in effect the second or checking multiplication is with different mechanism.

Rows 3 and 4 of section D are punched as for field 128A and row 1 of section E is punched with eighteen holes which control so-called Mode relays, which function to cause the subtracting operation.

From this general explanation, it will be apparent how the program card is prepared for different field arrangements of the record cards, and the specific manner in which such cards control the machine will now be explained in detail in connection with the description of the circuit diagram.

Circuit diagram

In the circuit diagram (Figs. 15A to 15X), relays and their related contacts are shown adjacent to one another in most instances. In cases where this would complicate the connections, they have been shown separated for clarity and in such cases the relay magnets have been shown in dotted outline adjacent to their related contacts. For further clarity where a number of wires all extend to the same pair of cam contacts, the contacts are shown repeatedly and given the same designation as C1, C2, etc. Like identified cam contacts (of which there are seven different ones utilized, see Fig. 16) may thus be assumed to be the same contacts or duplicates, all having the same timing.

The operation of the machine will now be explained to show how a representative problem in multiplication is carried out, and for this purpose the example represented on card 10 of Fig. 12 will be followed. As a preliminary, such card together with others similarly punched with values in the multiplier field 10A and multiplicand field 10B are placed in the hopper 11 (Fig. 1) face up as viewed in Fig. 12, and program card 128 is placed in its carriage as shown.

The main switch 170 (Fig. 15A) is then closed connecting lines 171 and 172 to a 110 volt source of current. This will light lamp 173 and place motors M2 and M3 in operation. The gripper carriage 56 will at this time be in its extreme left or last column position, and the picker rack 14 will be in its extreme right hand position. With the former in such position the last column contacts 145 (Figs. 8 and 15A) will be closed, so that upon closure of switch 174 a circuit will be completed from line 171, switch 174, wire 175, interlock contacts 98, latch contacts 23, rack contacts 15, carriage contacts 147, contacts 145 (now closed) and gripper magnet 71 to line 172. Since no card is in the gripper at this time, the effect of energization of magnet 71 is simply to close contacts 150 (see Fig. 2) which thereupon complete a circuit from line 171, switch 174, wire 175, contacts 98, 23, 15, 147, 150, trip magnet 19, relay contacts STa, brush contacts 139 to line 172. Contacts 139 are closed at this time, since with the carriage in its last column position contacts 144 are open to prevent energization of brush magnet 136.

Trip magnet 19 opens contacts 23 and closes contacts 22, the latter making before the former break and there is now a circuit traceable from line 171, switch 174, wire 175, contacts 98, 22, motor M, contacts STa and 139 to line 172. As explained in the mechanical description, trip magnet 19 has tripped the motor clutch, so that rack 14 is driven to the left to advance the bottom card and concurrently the gripper carriage is driven to the right to receive the leading corners of the card in its jaws. When rack 14 completes its forward stroke, the clutch becomes disengaged and rack 14 returns under spring action to its right hand position, where it recloses rack contacts 15.

With the gripper carriage in its right hand position, contacts 148 will be closed so that now a circuit is traceable from wire 175, contacts 98, 23 (now restored), 15, 148 and gripper magnet 71 to line 172. Magnet 71 trips the gripper jaws to secure the card to the carriage. It will be noted that as rack 14 returns, the rollers 61 (Fig. 3) being in constant rotation, are urging the leading edge of card 10 against carriage stops 58, so that when the jaws close on the card it is accurately aligned against such registering stops.

A further circuit is also traceable from wire 175, contacts 98, 23, 15, 144, 135 to energize magnet 136 and thereby elevate brushes 129 (Fig. 5) against the program card 128.

At this point the twelfth column of program card 128 is at brushes 130 and the corresponding column 69 of card 10 is at the punches, the first row of brushes 62 is at the fifth or seventy-sixth column of card 10 and the second row is at the first or eightieth column. The relative location of card 10 and the carriage are shown in Fig. 10. From this position the cards are now automatically advanced six columns or steps to bring them to the relative positions with respect to the punches and brushes as indicated diagrammatically in Fig. 12, which might be termed the start of sensing position.

In this position, the first roller 61 and related brush 62 serve simply to help advance the card and are not used for sensing purposes. The second roller and brush (designated No. 1) are in line with the units order column (74) of the multiplicand, and the third roller and brush (designated No. 2) are in line with the units order column (80) of the multiplier. Concurrently, the brushes 130 are in line with column 18 of the program card 128 to sense the perforations therein. Advance of the card carriage to this starting position is effected as follows. In Figs. 18a to 18f are shown a timing chart on which the several cycles of operation are represented as numbered at the top of the diagram, each cycle being a sixth of a revolution of the C cams. Each cycle represents a step of advance of the cards commencing with the initial position of Fig. 10 where column 12 of card 128 is at sensing brushes 130 and column 69 of card 10 is at punches 35. To advance to the starting position, it is necessary to step the cards through six cycles, which stepping is effected automatically.

Cycles 1 to 6

*Advance of card to first sensing position.*—With the carriage rack 14 in its right hand position (Fig. 3a), contacts 15 will be closed so that a circuit is traceable in Fig. 15A from wire 175, contacts 98, 23, 15, 144, 135, 124, and C1, clutch magnet 167 to line 172. Reference to the timing chart (Fig. 16) shows that contacts C1 are closed with the machine at rest, and with clutch magnet 167 energized, the several C cams will make a cycle, that is, the controlling cams will turn one-sixth of a revolution to open and close the several C cams at times indicated in Fig. 16. Thus, shortly after the commencement of the cycle, contacts C1 open to break the circuit to the clutch magnet (see Fig. 18a, cycle 1).

Also, at the beginning of the cycle cam contacts C2 (Fig. 15A) close to complete a circuit from wire 175, contacts 98, 23, 15, 144, 135, 124, C2, wire 180, upper relay contacts P11c, connection 181, space relay SP, wire 182 to line 172. Relay SP closes its contacts SPa and a circuit is thereupon traceable from wire 175, contacts 98, 23, 15, 144, switch 178, wire 179, contacts SPa, wire 183, brush contacts 140 now closed, punch magnet 119 to line 172. The energization of punch magnet 119 will in the usual way cause an operation of the card carriage escapement mechanism to advance the card one column, and as an incident to such operation floating cam contacts 124 will be opened and will reclose again. At the end of this cycle 1 the 13th column of the program card is at its brushes 130. Fig. 18a indicates the relative periods of energization of the magnets and relays mentioned.

Near the end of the cam cycle, contacts C1 reclose so that, when contacts 124 are reclosed, clutch magnet 167 will again be energized and another cycle will follow during which contacts C2 again operate the punch magnet to advance the cards a further column. This operation is repeated through cycles 3, 4, 5 and 6 to advance the cards step by step until column 18 of the program card arrives at brushes 130 (see Fig. 12). Column 80 of the record card containing the units digit of the multiplier is at sensing brush 62 designated No. 2 and column 74 containing the units digit of the multiplicand is at brush 62 designated No. 1 (see Fig. 18a, cycle 7).

In the foregoing manner therefore the cards are advanced until the first active columns, i. e. columns of card 128 containing punched data arrive at the sensing brushes 130.

*Cycle 7*

During this cycle 7, the units digits of the two factors will be read from the record card, and entered in the multiplying mechanism where the units digit of the product of the pair of sensed digits will be obtained. This units digit of the product will be punched back into the record card 10 in the next following cycle (cycle 8) after the card has been advanced one step beyond the present sensing position to present column 62 to the punches 35.

At the bottom of Fig. 18a is indicated the relationship of the card columns to their sensing and punching devices, and this will aid in following the progress of the cards through the machine.

The factors to be multiplied are punched in the record card in what may be termed the "decimal system of notation." These factors are sensed and set up in what may be termed storage relays wherein, to reduce the number of relays required, the digits are set up in a combinational manner, which may best be explained by following the operation of the mechanism in accordance with the specific problem shown in Fig. 12.

*Entering the multiplicand digit.*—With brushes 130 sensing column 18 of the program card, No. 2 brushes 62 sensing column 80 of the record card 10 and No. 1 brushes 62 sensing column 74 of the record card, the following circuits will be completed under control of the perforations in these three card columns.

Referring to Figs. 15B and 16, cam contacts C3 close just after the beginning of cycle 7 commencing with the arrival of these card columns in their respective sensing positions, and a circuit is traceable from wire 175, contacts C3, the A brush 141, perforation in the 1 position of field A of card 128 (see Fig. 12), corresponding brush 130, the 1 wire of a group designated 184 which extends to the No. 1 brushes 62 that sense the even numbered rows of perforating positions of column 74 of the card 10. Concurrently, a parallel circuit is traceable from wire 175, contacts C3, A brush 141, perforation in the 2 position of field A, corresponding brush 130, 2 wire 184, to the brushes 62 of the No. 2 set that sense the even numbered perforating positions of column 80 of the record card. For the example chosen, it is noted that the multiplier digit 5 and the multiplicand digit 9 are the ones sensed during this cycle and, since these are not even values digits, the circuits to the brushes 62 just traced are not continued through the record card.

The circuit from the 1 wire 184 (see Fig. 15B) branches through the 1a wire of a group 185 (Figs. 15B, 15C, 15D, 15E) to the cable designated 1 of a group designated 186. From the 1 cable 186 the circuit continues through the right hand or 1 wire of a group 187—1a to one of a set of contacts generally designated D1a.

It will be noted that there are seven sets of contacts D1a extending across Figs. 15C, 15D and 15E, and all of these contacts are controlled by a relay magnet designated D1. The sets are separately designated as "minus" 8, 6, 4, 2, 1a and 1b. Each set has six shiftable contact blades connected through wires 187 to cables 186, so that each cable includes a wire 187 from each of the seven sets of contacts D1a. As an aid to identification of the connections to the group of wires 185, they are given designations corresponding to the sets of D1a contacts, to which they are connected through their related cable 186. Thus, for the circuits being specifically traced the 1a wire 185 connects to the 1 wire of group 187—1a (Fig. 15E). From here the circuit continues through right hand contacts D1a, the right hand contacts D2a, the right hand contacts D3a, thence through the 1 wire of a group of wires 188—1a (Fig. 15J), to the 1a cable of a group of cables designated 189. Through this cable the wires 188—1a each extend to 1a wires in six groups designated 190 (Figs. 15J, 15I and 15H), which extend to relays generally designated E arranged in six sets designated No. 1 to No. 6 in these three figures.

Continuing the tracing of the circuit, it extends from the 1a cable 189 (Fig. 15J), through the 1a wire 190, through left hand winding of the 1 storage relay E in the No. 1 set of relays, thence upwardly through the 1b wire 190 to the 1b cable 189, the 1 wire 188—1b (Fig. 15E), right hand contacts D3a of the 1b group, right hand contacts D2a, D1a, 1 wire of the group 187—1b, the 1 cable 186 to the 1b wire 185 (Figs. 15D, 15C, 15B) to the 9 brush 62 of the No. 1 set, which is now sensing the 9 index position of column 74 of the record card, in which the units digit 9 of the multiplicand is perforated so that the circuit continues through this 9 perforation to the 9. 8, section of contact roller 61, the related brush 197, 8 wire 185 (Figs. 15C, 15D, 15E), the 1 cable 186, through which it extends back to Fig. 15D and the 1 wire 187—8 in the 8 group, thence to right hand contacts D1a and D2a of this group, right hand contacts D3a of the group, to the 1 wire 188—8 in the 8 group (Fig. 15I), to the 8 cable 189 from which in Fig. 15J the circuit continues to the 8 wire 190, to the 8 relay magnet E in the No. 1 set, wire 191, to line 172.

From the foregoing it will be apparent that, immediately upon closure of cam contacts C3 (Fig. 15B), a series circuit is completed through the 1 and 8 relays E of the No. 1 set of contacts in Fig. 15J, that is, the sensing of a 9 hole has caused energization of the 1 and 8 relays and constitutes a combinational representation of the digit 9. Sensing of any other digit will also energize one or more of the E relays. In accordance with the circuit arrangement, whenever the multiplicand digit is an odd number 1, 3, 5, 7 or 9, the circuit extends through the 1 relay E as traced and then back to the brushes 62 (Fig. 15B) that sense the odd perforations and then continues to energize one of the even E relays 2, 4, 6 or 8, depending on the value of the odd perforation. Where the digit represented is 1, the circuit through the 1 perforation goes directly to line 172, through a resistor 192 (Fig. 15B).

Where the perforation represents an even digit 2, 4, 6 or 8, the related E relay is directly energized and there is no circuit to the 1 relay E. For example, if the multiplicand digit had been 8, the circuit would be traceable from wire 175 (Fig. 15B), contacts C3, the A brush 141, the A section of contact roller 129, the 1 perforation in the card column, the 1 brush 130, the 1 wire 184, the 8 brush 62, the 8 perforation, the 9, 8, section of roller 61, brush 107, 8 wire 185 (Figs. 15C, 15D, 15E), the 1 cable 186 (Fig. 15D), the 1 wire 187—8, contacts D1a, D2a and D3a, the 1 wire 188—8 (Fig. 15I), the 8 cable 189 (Fig. 15J), the 8 wire 190 of the No. 1 set of storage relays, the 8 relay E, wire 191, to line 172. The circuit involving the entry of the other digits will be aparent without specifically tracing the same. Where the digit is 0, no relay E will be energized.

Energization of any relay E in the No. 1 set (Fig. 15J) will close related contacts Ea to provide a holding circuit traceable from line 172, wire 191 of the No. 1 set, right hand winding of relay E, contacts Ea, the 1 wire of a group designated 206 (Figs. 15I, 15H, 15C, and 15B), right hand contacts C1b, wire 203, contacts C5 to line 195 (Fig. 15A), switch 174 to +55 volt source of current. Reference to Figs. 16 and 18a will show that the No. 1E relays are energized during the first half of cycle 7 and their holding circuit is established by contacts C5 before contacts C3 open, so that the holding continues over into the next cycle. Before the end of cycle 7, however, a further holding circuit is established which will maintain the No. 1E relays energized beyond the point of opening of contacts C5. This is effected as follows.

*E storage relay holding circuit.*—The perforation in the 1 row of field C of the program card is sensed concurrently with the other perforations in this column, and a circuit is completed therethrough traceable in Fig. 15B from line 195, contacts C4, the C brush 141, roller 129, the 1 perforation in field C of the card, the related brush 130, the 1 wire of a group designated 201, the winding of relay B1, wire 202 to line 172. Thus, the relay B1 is energized concurrently with the energization of the No. 1E relays during the first half of cycle 7 and will close a pair of contacts B1a to provide a holding circuit through wire 203 and contacts C5. The relay B1 also closes a pair of contacts B1b through which a circuit is completed when cam contacts C6 close in the second half of cycle 7, which is traceable from line 195, contacts C6, wire 204, contacts B1b, relay C1, to line 172. This relay in turn closes contacts C1a, providing a holding circuit through wire 205 and contacts C7, through which relay C1 is held energized through the major portion of the next following cycle.

Relay C1 shifts a pair of contacts C1b through which the holding circuit for the No. 1E relays is accordingly shifted from wire 203 and contacts C5 to wire 207, extending directly to line 195. Contacts C1b are of the make-before-break type, so that there is no interruption of the holding circuit.

Briefly, then, the sensing of a hole in the 1 position of field C will energize relay B1 in the first half of cycle 7, which relay will be held by contacts C5 to the beginning of cycle 8. During cycle 7, contacts C6 energize relay C1 and contacts C7 hold relay C1 energized until the latter part of cycle 8, so that the No. 1E relays are held energized until the same time. As will be explained subsequently in connection with succeeding cycles, the No. 1E relays will be kept energized through the first half of cycle 11 (see Fig. 18b).

*Selection of D rotator.*—Concurrently with the sensing of the multiplicand units digit, a circuit is traceable in Fig. 15A from +55 volt source of current, through switch 174 to line 195 (Fig. 15B), cam contacts C4, which close concurrently with contacts C3, the B brush 141, contact roller 129, the 2 perforation in the B field of the program card (see Fig. 12), the 3 wire of a group designated 196 (Fig. 15C), relay magnet A3, wire 197, to line 172. Relay A3 closes its contacts A3a to provide a holding circuit extending from line 195, contacts C5, wire 198, contacts A3a, right hand winding of magnet A3, wire 197, to line 172.

Reference to Fig. 16 will show that contacts C5 close before contacts C4 open, so that relay A3 will remain energized throughout the cycle and part way into the next cycle. The relay A3 closes its contacts A3b, which complete a circuit when contacts C6 close in the latter half of the cycle, which is traceable from line 195, contacts C6, wire 199, contacts A3b, left hand winding of relay D3, wire 197 to line 172. Relay D3 closes its contact D3b to provide a holding circuit which is completed near the end of the cycle, from line 195, contacts C7, wire 200, contacts D3b, right hand winding of relay D3, wire 197 to line 172. As seen in Figs. 16 and 18a, this holding circuit will continue through the major part of the next cycle until contacts C7 reopen. As a result, the relay D3 is energized to shift its several sets of contacts D3a through which multiplicand entering circuits have been traced hereinabove. The three relays D1, D2 and D3 and the related sets of contacts constitute a form of commutating device which under control of perforations in rows 2, 3 and 4 of field B of the program card 128 will select which of the six sets of E relays (Figs. 15H, 15I and 15J) is to receive the entry from the record column.

Referring to Fig. 15D, it will be recalled that the entry extending through the 1 wire 187—8 extended to the 1 wire 188, and thence to the No. 1 set of E relays. If none of the D1, D2 or D3 relays are energized, which is the case during the first half or factor sensing part of cycle 7, the circuit extends to the No. 1 set of relays. With relay D1 alone energized, all the 1 wires 187 are connected to the 5 wires 188. With D2 alone energized, the 1 wires 187 are connected to the 3 wires 188. With relays D3 and D2 both energized, the 1 wires 187 are connected to the 4 wires 188. With relays D3 and D1 both energized, the 1 wires 187 are connected to the 6 wires 188, and with relay D3 alone energized the 1 wires 187 are connected to the 2 wires 188.

Referring to Fig. 12, rows 2, 3 and 4 of field B are perforated so that the relays D1, D2 and D3 are selectively energized to cause entry of multiplicand digits into the sets of E relays in successive order, beginning with the No. 1 set for the units digit of the multiplicand.

It is to be noted that energization of relay D3 occurs in the latter part of cycle 7 after the units digit of the multiplicand is entered in the No. 1 set of E relays and simply prepares the entry path to the No. 2 set of E relays to direct the tens digit of the multiplicand therein during cycle 8.

*Entering the multiplier digit.*—In Figs. 15K and 15L are shown six sets of relays and contacts which shall be termed the H storage relays into which the multiplier digits are to be entered. Entry into these relays is effected in a manner similar to that described for entry of the multiplicand digit into the E relays, and the selection of the particular set to receive the digit is controlled by sets of contacts of relays J1, J2 and J3 (Fig. 15F), which in turn are controlled by relays generally designated G. The relays G are connected through wires 1, 2, 3 of a group generally designated 209 (Figs. 15F, 15E, 15D and 15C) to the corresponding wires of the group 196, so that these relays are energized in parallel with the corresponding A relays in Fig. 15C, which as already explained are energized under control of perforations in rows 2, 3 and 4 of field B of the program card 128.

The G relays (Fig. 15F) close their contacts suffixed $a$ to provide holding circuits through the cam contacts C5 and through their contacts suffixed $b$ energize the related J relays under control of contacts C6 in the latter part of the cycle, which relays in turn provide holding circuits through their contacts suffixed $b$ and cam contacts C7. Reference to 18a will show that the timing of the A and G relays and the timing of the D and J relays is also the same.

During the first half of cycle 7, none of the J relays is energized and the related contacts are all in the positions shown in Figs. 15F and 15G, and the entering circuit for the first or units order multiplier digit which is 5 is traceable as follows: from line 175 (Fig. 15B), contacts C3, the A brush 141, roller 129, the perforation in the second row of column 18 of field A of card 128 (see Fig. 12), corresponding brush 130, 2 wire 184, $1a$ wire of a group 210 (Fig. 15C), the 2 contacts L$a$, the $1a$ wire of a group designated 211 (Figs. 15D, 15E, 15F and 15G), the 1 cable of a group of cables designated 212, the 1 wire of a group designated 213—$1a$, right hand contacts J1$a$, J2$a$, J3$a$, the 1 wire of group 214—$1a$ (Fig. 15L) to cable $1a$ of a group designated 215, wire $1a$ of a group 216, winding of the 1 relay H of the No. 1 set, wire $1b$ of the group 216, cable $1b$ of the group 215, the 1 wire of the group 214—$1b$ (Fig. 15G), contacts J3$a$, J2$a$, J1$a$ to the 1 wire of the group 213—$1b$, the 1 cable 212, the $1b$ wire 211 (Figs. 15F, 15E, 15D, 15C), the 1 contacts L$a$, the $1b$ wire 210 (Fig. 15B), the brush 62 in the 5 position, corresponding brush 107, the 4 wire 210 (Fig. 15C), the 4 contacts L$a$, the 4 wire 211 (Figs. 15D, 15E, 15F, 15G), the 1 cable 212 (Fig. 15F), the 1 wire 213—4, contacts J1$a$, J2$a$, J3$a$, the 1 wire of the group 214—4 (Fig. 15K), the 4 cable 214 (Fig. 15L), the 4 wire 216, the 4 relay H in the No. 1 set, and thence through wire 217 to line 172.

Through this circuit the 1 and 4 relays of the No. 1 set of H relays are energized at the same time as the 1 and 8 relays in the No. 1 set of E storage relays are energized, that is, in the first half of cycle 7. Holding circuits are established by the H relays through their $a$ contacts. This holding circuit is traceable from line 172 (Fig. 15L), wire 217, right hand winding of the H relay, contacts $a$, wire 218 (Figs. 15K, 15J, 15I, 15H, 15C, 15B), right hand contacts C7$b$, wire 203, contacts C5 to line 195. As seen from Fig. 16, contacts C5 will hold the H relays energized throughout the remainder of the cycle 7 (see Fig. 18a) and into the next cycle.

Referring to Fig. 15B, when cam contacts C4 close, there is a circuit completed from line 195, contacts C4, D brush 141, perforation in the 3 row of card 128 (see Fig. 12), the corresponding brush 130, the 7 wire 201, relay B7, wire 202, to line 272. Relay B7 closes its contacts B7$a$ to provide a holding circuit, through wire 203, contacts C5, so that the contacts B7$b$ are closed throughout the remainder of cycle 7. In the latter part of the cycle, when cam contacts C6 close, a circuit will be completed from line 195, contacts C6, wire 204, contacts B7$b$, relay C7 to line 172. Relay C7 shifts its contacts C7$b$ to transfer the holding circuit of the H relays to wire 207, extending directly to line 195. Relay C7 also closes its contacts C7$a$ to provide a holding circuit for itself through wire 205, and contacts C7 which will accordingly keep relay C7 energized into the second half of the next cycle (cycle 8).

Referring to Fig. 12, it will be noted that row 3 of field D is perforated in each of columns 18 to 33 inclusive, and accordingly due to the overlapping of the pickup circuit for the relay B7 and the holding circuits, relay C7 will remain energized throughout succeeding cycles and the No. 1 set of H storage relays will accordingly remain energized continuously as indicated in Fig. 18a.

*Circuit for relay R10*—During the sensing of column 18, there is a circuit completed to energize the relay R10 (Fig. 15C) which may be traced at this time. This circuit is called into operation by the presence of a perforation in the 4 row of field D (Fig. 12), upon the sensing of which the circuit is traceable from line 195 (Fig. 15B), contacts C4, brush D, the hole in the 4 row, corresponding brush 130, a wire 219 (Fig. 15C), the 9 contacts L$a$, relay R10 to line 172. Relay R10 is again shown in the upper left hand part of Fig. 15P where it will open contacts R10$b$ to break any circuits that may be held therethrough at this time. This operation of R10 is in the nature of a preliminary clearing and under the present circumstances it is ineffective.

Briefly reviewing the operation of the machine thus far, it is seen that in the interval up to the middle of cycle 7 the units digit 9 in the multiplicand has been entered into the No. 1 set of E relays in combinational form, and the units multiplier digit has likewise been entered into the No. 1 set of H relays also in combinational form. In the latter part of cycle 7, circuits will be completed under the joint control of the E and H relays, to energize one or more of a group of relays shown in Figs. 15N and 15X. These relays are generally designated M and they control contacts in Figs. 15P and 15W inclusive in what is known as a relay adding chain. The M relays are arranged in horizontal rows, each row representing numerical values in accordance with the terms of the binary progression.

Thus, the uppermost row extending across Figs. 15N and 15X represents the first term 1 of the binary progression, the next two rows each represent the term 2, the next three represent the term 4, the next two represent the term 8, and the last three represent the terms 16, 32 and 64, respectively. The circuits through the contacts of the E and H relays will cause energization of the M relays in such manner that the sum of the binary values represented by the selected or energized relays will represent the product of the digits or factors set up on the E and H relays. Thus, for the example thus far, where a 9 is set on the E relays and a 5 on the H relays, the resulting circuits to be traced will cause energization of relays M12 (representing 32), M31 (representing 8), M48 (representing 4) and M70 (representing 1). The principles underlying the selection of these relays may best be explained by stating that the 9 digit is expressed in the binary system as the sum of the 1 and 8 terms and the 5 digit is expressed as the sum of the 1 and 4 terms, and by stating that the product thereof is the sum of the products obtained by multiplying each binary term of one factor by all the binary terms of the other factor. Thus, 5=binary terms 1 and 4
9=binary terms 1 and 8 their product 45=the sum of 1×1, 1×4, 8×1, and 8×4 or 1+4+8+32=45

In Figs. 15M and 15X, the M relays have indicated adjacent thereto the binary terms which control their energization. The term on the left represents the multiplicand value, and that on the right of the decimal point represents the multiplier.

Before tracing the circuits through the M relays, reference is to be had to Fig. 15M, where relays F1, F2 and F3 are shown controlling sets of contacts suffixed $a$. These three relays through wires 1, 2 and 3 of group 196 extend across Figs. 15J, 15I, 15H, 15C and 15B to the program card sensing brushes, so that they are energized as indicated in Fig. 18$a$ concurrently with the A and G relays, that is, at the beginning of the cycle. Accordingly, at the beginning of cycle 7, relay F3 is energized and closes its contacts F3$b$ (Fig. 15M) to provide a holding circuit through contacts C5, so that these contacts as well as contacts F3$a$ will be in shifted position throughout the remainder of the cycle during which four circuits are completed as follows.

*Circuit for relay M70.*—From line 195 (Fig. 15H), contacts C5, wire 220 (Figs. 15I, 15J), $d$ contacts of 1 relay E in the No. 1 set (now shifted), wire 222, $e$ contacts of minus relay E, the 1 wire of the group designated 223—1, the 1 cable of the group designated 224, thence to the 1 wire of the group designated 225—1 (Fig. 15M), right hand contacts F1$a$, F2$a$, right hand contacts F3$b$ (now shifted) to the 1 wire of a group designated 226—1 (Figs. 15N and 15X), relay M70, one of the four right hand wires of the group designated 227—1 (Fig. 15L), contacts $e$ of the 1 relay H in the No. 1 set (now closed), wire 217 to line 172. This represents the product 1 times 1. The connections between the group of wires 233—1 and the wires of the 225 group are shown in their specific relationship in Fig. 24, where it is seen that for the 223—1 group these four wires pass through the 1 cable 224 and branch therefrom to the four 1 wires of the four 225 groups. Similarly, the wires of each of the other 223 groups extend to like numbered cables and branch therefrom to the four 225 groups and to the correspondingly numbered wires in such groups. Thus, the 223—2 wires extend through the 2 cable 224 to the four 2 wires of which there is one in each of the four 225 groups.

*Circuit for relay M48.*—This circuit is traceable through the same path as above up to the 1 wire of the group 226—1 (Fig. 15X), where it branches upwardly to relay M48, thence upwardly through a second one of the right hand group of the four wires 227—1 (Fig. 15L), to the right hand contacts $e$ of the 4 relay H, and wire 217 to line 172. This represents the product 1 times 4.

*Circuit for relay M31.*—This circuit is traceable from line 195 as before, through contacts C5 to wire 220 (Fig. 15J), thence through wire 221, the $e$ contacts of the 8 relay E now closed, wire 228, $b$ contacts of the minus relay E, 8 wire of group 223—1, the 1 cable 224, the 1 wire of the group 225—3 (Fig. 15M), contacts F1$a$, F2$a$, F3$a$ (now shifted), to the 1 wire of the group 226—8 (Figs. 15M and 15X), right hand winding of relay M31, right hand 8 wire of the group 227—1 (Fig. 15L), the $b$ contacts of the 1 relay H in the No. 1 set, and wire 217 to line 172. This represents the product 8 times 1.

*Circuit for relay M12.*—This circuit is traceable through the same path as for relay M31 up to the 1 wire of the group 226—8 (Fig. 15X), where it branches upwardly to the right hand winding of relay M12, thence through the second from the left of the 8 wires of group 227—1 (Fig. 15L), the $b$ contacts of the 4 relay H and wire 217 to line 172. This represents the product 8 times 4.

These four circuits are concurrently completed upon closure of the contacts C5, and remain closed for the period indicated in Fig. 18$a$ along the line designated relay M, and will be held energized until contacts C5 reopen shortly after the commencement of the following cycle 8, at which time the selected M relays will become deenergized.

*Multiplying relay chain.*—Referring to Figs. 15P to 15W through which the contacts controlled by the M relays extend, these contacts as already stated constitute an adding chain with the contacts grouped in the order of binary term values. Thus, in Fig. 15W the contacts of relays M1 to M6 control the adding of the term 64, the next group (Figs. 15W and 15V) comprising the contacts of relays M7 to M12 control the adding of the term 32. The contacts of the relays comprising the group M13 to M18 (Figs. 15V and 15U) control the adding of the term 16. The contacts of the relays comprising the group M19 to M31 (Figs. 15U and 15T) control the adding of the term 8. The contacts of the relays comprising the group M32 to M50 (Figs. 15T, 15S and 15R) control the adding of the term 4. The contacts of the relays comprising the group M51 to M63 (Figs. 15R, 15Q and 15P) control the adding of the term 2. The contacts of the relays comprising the group of M64 to M70 (Fig. 15P) control the adding of the term 1.

In Fig. 15W the wire 230 may be said to have a 0 value and with all the M relays in the chain deenergized a series circuit extends upwardly through the entire chain to the 0 wire 231, which is connected as designated to the 0 relay P1 at the bottom of Fig. 15A. Between each group of like value relay contacts (Fig. 15W), connecting wires are separately identified as 232 between the 64 and 32 groups of contacts, as 233 between the 32 and 16 groups of contacts (Fig. 15V), as 234 between the 16 and 8 groups of contacts (Fig. 15U), as 235 between the 8 and 4 groups of contacts (Fig. 15T), as 236 between the 4 and 2 groups of contacts (Fig. 15R), as 237 between the 2 and 1 groups of contacts (Fig. 15P).

Included in the adding chain are contacts controlled by relays designated N6 and N2. These relays are inactive for the present problem and their contacts accordingly remain in the positions shown throughout the operation. They are utilized in handing fractions of denominators 6 and 2 as will be more fully explained in a later chapter.

An adding chain similar to the present one is disclosed in my copending application Serial No. 481,075, filed March 30, 1943 (now Patent No. 2,394,924, granted Feb. 12, 1946), and employs the same principles of interconnecting the relay contacts.

The separate wires in each group are given values 0, 2, 4, 6 and 8 as indicated, and it will be particularly noted that except in the case of the 0 wire each continuous connection starting at any point and extending upwardly, runs through wires whose values progressively double from section to section. To illustrate, the 2 wire 232 emerging from section 64 (Fig. 15W) has a value of 2 in that section; in entering section 32 its value is 4; in entering section 16 its value is 8; then going through the contacts in this section it continues to the 6 wire 234 in section 8 (this being the units digit of 16); then through the contacts in section 8 it extends to the 2 wire 235 entering section 4 (2 being the units digit of 32), then through the contacts in the 4 section to the 4 wire 236 entering the 2 section, and then through the sets of contacts in the 2 section to the 4 wire 237 entering the 1 section (4 being the units digit of 64), and then through the contacts of section 1 to the 4 wire 231. Thus, energization of relay M1 in section 64 (Fig. 15W) connects the wire 230 to the 2 wire 232, and this wire value is repeatedly doubled (disregarding the tens digits) to ultimately arrive at 4 wire 231.

Taking as a further illustration the energization of a relay in section 32, the 0 zero 232 is connected over to the 2 wire 233, and tracing this wire the circuit passes progressively through the 4 wire 234, the 8 wire 235, the 6 (16) wire 236, the 2 (32) wire 237 to the 2 wire 231. There is thus one less doubling of the initial 2 value for a 32 entry than for a 64 entry, and similarly for a 16 entry the initial 2 value of wire 234 is doubled three times to a 6 (16) value; for an 8 entry the initial 2 value of wire 235 is doubled twice to an 8 value; for a 4 entry the initial 2 value of wire 236 is doubled once to a 4 value.

It will be apparent that where a relay is energized in each of two different sections, there will be a composite doubling; for example, where the contacts are shifted in both the 64 and 8 sections, the initial 0 wire 230 connects to the 2 wire 232, then to the 4 wire 233 and the 8 wire 234. In the 8 section it shifts to the 8 wire 235 (representing 16+2), then to the 6 wire 236 (representing 32+4), then to the 2 wire 235 (representing 64+8), and to the 2 wire 231. Thus, the 2 value of section 64 is doubled 5 times and combined with the 2 value of section 8 doubled twice, giving 64+8 or 72. Where more than one relay in a section is energized, there is an initial doubling or quadrupling. Where, for example, in section 4 if three relays M32, M33 and M34 were energized, the 0 wire 235 would connect to the 6 wire 236, then go to the 2 (12) wire 237 and to the 2 wire 231 to represent the units digit 2 of the sum of the three 4's set in section 4. Thus, the sum of three 4's is obtained by adding three 2's to get 6, and then doubling once to get 12. In the uppermost section 1, the contacts shift to raise the value of wires 237 by a single digit only, so that all doubling is taken care of between wires 232 and 237 and a 1 is added between wires 237 and 231 if required.

Returning now to the specific problem, it will be recalled that relays M12, M31, M48, and M70 are energized at about the middle of cycle 7, in accordance with the setting of digits 9 and 5 in the No. 1 sets of E and H relays respectively. With these particular M relays energized, a circuit through the adding relay chain is traceable upon closure of cam contacts C6 (Fig. 15W) in the latter part of cycle 7 as follows: from line 195, contacts C6, wire 230, serially through the e contacts of relays M1 to M6 to 0 wire 232, thence through the e contacts of relays M7 to M11 (Fig. 15V), to the e contacts of relay M12 now shifted, to the 4 entering wire 233, thence through the c contacts of relays M13 to M18, the b contacts of N6 and the a contacts of N2 to the 8 entering wire 234 (Fig. 15U), contacts a of relays M19 to M30 (Fig. 15T) and shifted contacts of relay M31 to the right hand or f contacts of this relay and the 0 wire 235, thence through the e contacts of relays M32 to M47 (Figs. 15S and 15R), the shifted contacts e of relay M48, contacts d of relays M49 and M50, contacts c of N2, the 4 entering wire 236, thence through the c contacts of relays M51 to M63 (Figs. 15Q and 15P) to the 4 wire 237, then through the c contacts of relay M64 and f contacts of relays M65 to M69, the shifted f contacts of relay M70 to the 5 wire 231, which continues in Fig. 15A through the 5 relay P1 to line 172. The 5 represented by this relay indicates the units digit of the product of the two factors 9 and 5.

The 5 relay P1 closes its contacts P1g to establish a holding circuit through contacts C7, so that this relay remains energized into the middle of cycle 8, after the controlling M relays have become deenergized.

*Punch selector circuit.*—The 5 relay P1 also shifts a pair of related contacts designated P1a so that, at the beginning of cycle 8, when cam contacts C2 close, a circuit is traceable from line 175 (Fig. 15A), contacts 98, 23, 15, 144, 135, 124, C2, wire 180, lower contacts P11c, serially through the upper contacts P1a in the 0, 1, 2, 3, and 4 positions, lower contacts P1a in the 5 position, plug connection 181a, through punch interposer magnet 111 designated 5 to line 172. Energization of 5 magnet 111 will advance the related punch interposer during cycle 8 to close punch contacts 118 and energize the punch magnet 119, whereby the 5 position in column 62 of card 10 is perforated.

*Tens carry circuit.*—The relay chain circuit, which was completed through the contacts of the M relays, will branch to energize one or more of the set of relays generally designated Q which may be termed "carry" relays. For the particular example where the tens digit of the product obtained is 4, this circuit is traceable from line 195 (Fig. 15W), contacts C6, wire 230, serially through the e contacts of relays M1 to M6 to 0 wire 232, thence through the c contacts of relays M7 to M11 and the shifted e contacts of relay M12 to the 4 entering wire 233 as before (Fig. 15V), and then through c contacts of relays M13 to M18, to the 8 wire 234, the a contacts of relays M19 to M30 (Figs. 15U and 15T), to the shifted a contacts of relay M31. The circuit branches at this point through the left hand of these e contacts (Fig. 15T), through wire 238 to a winding of relay Q10 and to line 172. Relay Q10 then closes its contacts Q10a which provide a holding circuit from line 172, right hand winding of relay Q10, contacts Q10a, wire 239 (Figs. 15U, 15V, 15W), contacts C7 to line 195. Reference to time chart (Fig. 16) will show that this circuit will be held beyond the middle of the next cycle 8.

A general explanation will be given at this time to explain the arrangement of the wiring between the contacts of the carry relays designated Q1 to Q25.

This wiring constitutes an adding chain similar to that for the M relays and serves to energize the R relays (Fig. 15P) in accordance with the units digit of the sum of binary terms from 1 to 32. The energization of relay Q1 (Fig. 15W) represents an entry of 32 on this chain or more specifically a carry of 32 from the M relay chain. Relays Q2 and Q3 represent entries for carries of 16 from the M relay chain. Relays Q4 and Q5 (Fig. 15V) represent the value 8. Relays Q6 to Q10 (Figs. 15U, 15V and 15T) represent the value 4. Relays Q11 to Q16 (Figs. 15S, 15T, 15R) represent the value 2 and relays Q17 to Q25 (Figs. 15R, 15Q, 15P) represent the value 1. The wire 240 (Fig. 15W) to the b contacts of relay Q1 may be said to have a 0 value, and when all the Q relays in the chain are deenergized, there will be no circuit completed through the chain.

Between each group of like value relay contacts, the connecting wires are separately identified as 241 between the 32 and 16 groups of contacts, as 242 between the 16 and 8 groups of contacts (Fig. 15V), as 243 between the 8 and 4 groups of contacts, as 244 (Fig. 15T) between the 4 and 2 groups of contacts, as 245 (Fig. 15R) between the 2 and 1 groups of contacts. Just as for the M relay chain, the separate wires in each group are given values 0, 2, 4, 6 and 8 as indicated, and it will again be noted, except in the case of the 0 wire, that each continuous connection starting at any point and extending upwardly runs through wires whose values progressively double from section to section.

To illustrate, with relay Q1 energized, there is a circuit traceable from line 195 (Fig. 15W), contacts C4, 0 wire 240, b contacts of relay Q1 to the 2 wire 241, which extends to the 4 wire 242 in the 8 section (Fig. 15U), thence to the 6 wire 243 entering the 4 section (this being the units digit of 16), thence through the c contacts of relays Q6, Q7, Q8, Q9 and Q10 to the 2 wire 244 entering the 2 section (2 being the units digit of 32), thence through the e contacts of relays Q11 to Q16, to the 2 wire 245 entering the 1 section, and then through the c contacts of the Q17 relay and the i contacts of relays Q18 to Q25 to the 2 wire 246, and the relay R2, to line 172. This energization of relay Q1 connects wire 240 to the 2 wire 241, and this wire value is repeatedly doubled (disregarding the tens digit) to ultimately arrive at the 2 wire 246.

Referring to Fig. 15W, the principles underlying the energization of the Q relays may be explained by stating that, whenever the sum of the terms set on the M relays is greater than 9, one or more of the Q relays will be energized whose value is, or the sum of whose values equals, the number represented by the hundreds and tens positions of the sum of the M relay terms. To illustrate, if relays M1 to M5 (Fig. 15W) were energized to represent the addition of five 64's, whose sum is 320, the circuit from 0 wire 230 would go through the M relay adding chain to energize the 0 relay P, in accordance with the units digit of this sum, and this circuit would branch through wire 247 (Fig. 15W) to relay Q1, which as stated represents the value 32.

To illustrate further, assume the energization of relays M1, M2 and M3, whose sum represents 192, the adding circuit would extend through the chain to energize the 2 relay P, in accordance with the units digit, and would branch through wire 248 (Fig. 15W) to energize relay Q2 to represent 16. Since the carry part of the sum is 19, other Q relays will also be energized to aggregate a setting of 19 on the Q relays. For the specific example of three 64's, the M circuit when traced will branch through a wire 250 (Fig. 15T) to energize relay Q12 representing the value 2 and will also branch through a wire 251 (Fig. 15R), to energize relay Q18 representing the value 1. Thus, upon completion of the adding chain through the M relay contacts, relays Q2, Q12, and Q18 will also be energized to represent 19 or the carry part of this sum. The adding chain established by these three Q relays will itself complete a circuit to the relay R9 which represents the right hand or units digit of this sum 19.

The left hand or tens digit of this sum is set up under control of the Q adding chain to energize one of five relays designated S1 to S5. The contacts of these five relays are arranged to form a further or third adding chain, of which the relays S1 and S2 represent the value 2 and the relays S3 to S5 represent the value 1. To illustrate the manner in which the S relays are energized, let it be assumed that relay Q1 is energized to represent to carry of 32 from the M relays. Accordingly, the Q adding chain will energize the R2 relay for the units digit of this amount, through a circuit traceable from line 195 (Fig. 15W), contacts C4, wire 240, b contacts of relay Q1 (shifted), 2 wire 241, the 4 wire 242 (Fig. 15V), 6 wire 243, contacts of relays Q6 to Q10 (Fig. 15T), 2 wire 244, c contacts of relays Q11 to Q17, 2 wire 255, i contacts of relays Q18 to Q25 and relay R2 to line 172. This circuit branches through wire 252 (Fig. 15V) to energize relay S1 representing 2. The circuit also branches through wire 253 (Fig. 15T) to energize relay S3 representing 1, so that the S relays are now energized to represent the value 3 and the adding chain through the contacts thereof, whose wiring is the same in principle as that of the Q and M chains, will complete a circuit to one of the 5 wires 254 (Fig. 15R). These wires 254 are connected to Q relays as follows: the 1 wire 254 is connected to relay Q17 representing the value of 1, the 2 wire 154 is connected to the relay Q11 representing the value of 2, the 3 wire 254 is connected to relays Q11 and Q17 representing the values 2 and 1 respectively, the 4 wire is connected to relay Q6 representing the value 4, and the 5 wire is connected to relays Q6 and Q17 representing the values 4 and 1 respectively.

In the operation of the apparatus, there is a sequential operation of the several sets of adding relay chains, wherein the M relays are first energized in accordance with the terms of the binary progression whose sum equals the product sought and, when cam contacts C6 close (see Figs. 15W, 16 and 18a), circuits are completed to energize the P and Q relays, and these relays will be held over into the next cycle wherein, when contacts C4 close, the S relays will become energized and held so that in turn, when contacts C6 (see Fig. 16) close the adding chain through the contacts of the S relays will be completed to selectively energize relays Q6, Q11 and Q17 in the latter part of the next cycle.

Referring to Fig. 15P, the R relays are provided with contacts suffixed b and c, through which relays M19, M32, M51 and M64 are selectively energized. These relays have values of 8, 4, 2 and 1 respectively, and through the *b* and *c* contacts of the R relays will be energized singly or in combination to represent the digital value of any energized R relay. For example, if relay R9 were energized, a circuit would be traced upon closure of contacts C5 to energize relay M19 and relay M64 representing the terms 8 and 1. The energization of these four M relays occurs in the next cycle concurrently with the setting of other M relays for that cycle, so that the digital value carried into the Q relays on one cycle is added into the sum of the digits set up for the next cycle. Concurrently, the next higher carry set on the S relays in one cycle will be transferred to the Q relays in the following cycle to be added to any Q carries at that time, and in the second half of the cycle a new setting of Q and S relays is effected.

Referring to Fig. 18a, for the specific example chosen there is here indicated in cycle 7 that the units digit 9 is entered in the No. 1 set of E relays and the units digit 5 of the multiplier is entered into the No. 1 set of H relays, and that the relays F are adjusted to associate the No. 1 set of both E and H relays to energize the M relays to represent the product 45. The units digit 5 of this product will, as already explained, be punched in column 62 of the record card during the earlier part of the next cycle, namely, cycle 8. As also represented in this diagram, the tens digit 4 of the product is in effect added to the product obtained in the next cycle through energization of relay R4 (Fig. 15P) and the subsequent energization of relay M32 in the 4 section of the M relay chain.

Cycle 8

At the beginning of this cycle, the several relays are energized as indicated in Fig. 18a. Column 19 of program card 128 is at brushes 130 and columns 73 and 79 of card 10 are at the No. 1 and No. 2 brushes 62 respectively, so that the tens digits of the two factors are now about to be sensed. The sensing circuits will be controlled through the contacts of the D relays to enter the digits sensed into the No. 2 sets of E and H relays. Specifically, the tens digit of the multiplicand, which is 7, will be represented by energization of the 1 and 6 relays E in the No. 2 set of Fig. 15J. Since the tens digit of the multiplier is 0, there will be no entry made in the corresponding H relays.

The circuit path through which the multiplicand digit 7 is entered is traceable as follows: from line 175 (Fig. 15B), contacts C3, A brush 141, roller 129, the 1 perforation in field A of card 128, corresponding brush 130, 1 wire 184, the 1a wire 185 (Figs. 15C, 15D, 15E), the 1 cable 186, the 1 wire 187—1a, contacts D1a, D2a, contacts D3a (now shifted), the 2 wire 188—1a (Fig. 15J), the 1a cable 189, the 1a wire 190 in the No. 2 set of E relays, the 1 relay E in this set, the 1b wire 190, 1b cable 189, 2 wire 188—1b (Fig. 15E), contacts D3a shifted, contacts D2a, D1a, 1 wire 187—1b, 1 cable 186, 1b wire 185 (Figs. 15D, 15C and 15B), brush 62 of the No. 1 set sensing the 7 perforation in the record card, corresponding brush 107, the 6 wire 185 (Figs. 15C, 15D, 15E), the 1 cable 186 (Fig. 15D), the 1 wire 187—6, contacts D1a, D2a, D3a (now shifted), the 2 wire 188—6 (Fig. 15I), the 6 cable 189 (Fig. 15J), 6 wire 190 in the No. 2 set, 6 relay E, to line 172. Thus, the digit 7 is set up on the No. 2 set of E relays.

At the same time, relay B1 (Fig. 15B) is re-energized and a parallel circuit is completed to also energize relay B2. This latter circuit is traceable from line 195, contacts C4, C brush 141, roller 129, perforation in the 2 row of field C of card 128 (see Fig. 12), corresponding brush 130, the 2 wire 201, relay B2 to line 172. This relay establishes a holding circuit and controls the later energization of relay C2 which picks up at the time indicated in Fig. 18a, so that its contacts complete a holding circuit for the E relays of the No. 2 set, through the 2 wire 206. The sensing of the card and setting up of the digits on the E relays takes place while the first or units digit of the product is being punched in column 62 of the record card, and spacing of the card will take place as an incident to punching operation. About the middle of cycle 8, therefore, the units digit 9 of the multiplicand will stand in the No. 1 set of E relays and the tens digit 7 will stand in the No. 2 set, while the units digit 5 of the multiplier will stand in the No. 1 set of H relays, and there will be no entry in the No. 2 set since the digit in this case is 0.

The M relays will now be energized through circuits controlled by contacts of the F relays, so that cross products as indicated at the bottom of Fig. 18a (cycle 8) will be obtained. In this figure these cross products are indicated as decimal amounts for simplicity, but it will be understood that the M relays would be energized in accordance with equivalent binary values. Briefly, the M relays will be set in accordance with the product of $7 \times 5$ and $9 \times 0$, or $35+0$. The $7 \times 5$ expressed in the binary system will be $$4 \times 4 = 16\text{---relay M18}$$
$$4 \times 1 = 4\text{---relay M50}$$
$$2 \times 4 = 8\text{---relay M30}$$
$$2 \times 1 = 2\text{---relay M63}$$
$$1 \times 4 = 4\text{---relay M48}$$
$$1 \times 1 = 1\text{---relay M70}$$

$$35$$

To effect the cross connection between the multiplier and multiplicand digits indicated in Fig. 18a, relay F2 is energized in the beginning of the cycle under control of the perforation in the third row of field B of card 128 (Fig. 12) and will be held energized along with relays A2, G2 as indicated in Fig. 18a. Therefore, when contacts C5 (Fig. 15H) close, the following M relays whose aggregate value is 35 will be energized through circuits now to be traced:

*Circuit for relay M18.*—This circuit is traceable from line 195 (Fig. 15H), contacts C5, wire 220 (Figs. 15I and 15J), to the No. 2 set of E storage relays in which the digit 7 is now set or entered by energization of the 1 and 6E relays. From wire 220 the circuit extends through the *d* contacts of the 1 relay (now shifted), the *f* contacts of the 6 relay in parallel, and from the latter contacts it also branches through the *f* contacts of the 2 and 4 relays to continue through the three central wires of the group designated 255. The left hand one of this trio of wires continues the circuit through the *c* contacts of the minus relay E, the 4 wire of group 223—2, the 2 cable 224, the 2 wire of group 225—4 (Fig. 15M), contacts F1a, F2a (shifted) and F3a to the 1 wire 226—4, which continues across Figs. 15N and 15X to the central winding of relay M18, the second wire from the left in the 4 group of wires designated 227—1 (Fig. 15L), the c contacts of magnet H4 now shifted, wire 217 to line 172.

*Circuit for relay M50.*—This circuit follows the same path as for relay M18 up to the 1 wire of the group 226—4 (Fig. 15X). In this figure the circuit continues to relay M50, thence through the right hand wire of the group 227—1 (Fig. 15L), the c contacts of magnet H1 and wire 217 to line 172.

*Circuit for relay M30.*—This circuit is the same as for relay M18 up to the 2 wire of the group 223—2 (Fig. 15J). From here it continues to the 2 cable 224, thence through the 2 wire of the group 225—2 (Fig. 15M), from where it continues through the contacts F1a, F2a (shifted), and F3a of this group to the 1 wire 226—2, which continues across Figs. 15N and 15X to the right hand winding of the relay M30, and thence through the second from the left of the group of 2 wires 227—1 (Fig. 15L), the d contacts of relay H4 and wire 217 to line 172.

*Circuit for relay M63.*—This circuit follows the same path as for relay M30 up to the 1 wire of the group 226—2 (Fig. 15X), from which it continues to the relay M63 of the right hand wire of the 2 group 227—1 which in Fig. 15L extends to the d contacts of magnet H1 and magnet 217 to line 172.

*Circuit for relay M48.*—This circuit is the same as for relay M18 up to the 1 wire 223—2 (Fig. 15J), and it continues through the cable 224 to the 2 wire of the group 225—1 (Fig. 15M) and through contacts F1a, F2a shifted, and F3a of this group to the 1 wire 226—1. This wire extends across Figs. 15N and 15X where it extends to relay M48 and to the second from the left of the 1 group of wires 227—1 (Fig. 15L) and the e contacts of relay H4 and wire 217 to line 172.

*Circuit for relay M70.*—This circuit is traceable through the same path as relay M48 up to the 1 wire of the group 226—1 (Fig. 15X). From here it extends through relay M70, the right hand wire of the 1 group 227—1 (Fig. 15L), through the e contacts of relay H, and wire 217 to line 172.

*Circuit for relay M32.*—The closure of the contacts C5 in Fig. 15P will at the same time complete a circuit from line 195, contacts C5, contacts R10b, lower contacts R4b now in shifted position, and relay M32 to line 172. Near the middle of cycle 8, therefore, when cam contacts C6 reclose, the relays M18, M50, M30, M63, M48, M70 and M32 are in energized condition and circuits will accordingly be completed through the adding chain to energize the P relay 9 and the relays Q12 and Q18. The circuits involved are as follows:

*Circuit for relay P9.*—This circuit is traceable from line 195 (Fig. 15W), contacts C6, wire 230, the 3 contacts of relays M1 to M6, 0 wire, e contacts of relays M7 to M12 (Fig. 15V), 0 wire 233, e contacts of relays M13 to M17 (Fig. 15U), e contacts of relay M18 (now shifted), and the c contacts of relay N2 to the 4 entering wire 234, thence through the c contacts of relays M19 to M29 (Fig. 15T), c contacts of relay M30 now shifted, b contacts of relay M31, a contacts of relay N6, and the d contacts of relay N2 to the 2 wire 235, thence through the d contacts of relay M32 now shifted, c contacts of relays M33 to M47, c contacts of relay M48 now shifted, b contacts of relay M49, b contacts of relay M50 now shifted, contacts N6a, N2b, the b contacts of relays M51 to M62, the b contacts of relay M63 now shifted (Fig. 15) to the 8 wire 237, thence through the contacts M64a, the b contacts of relays M65 to M69, the b contacts of relay M70 now shifted to the 9 wire 231 (Fig. 15A), the 9 relay P1 to line 172.

Before contacts C6 open, the contacts C7 (Fig. 15A) will close to provide a holding circuit for the P magnet, through its contacts P1g to maintain the relay energized through the first half of the next cycle 9, during which through contacts P1a the 9 punch interposer magnet 111 will be energized to effect punching of a 9 in column 61 of card 10, as indicated at the bottom of Fig. 18b (cycle 9).

*Circuit for carry relays Q12 and Q18.*—The adding chain circuit just traced branches in Fig. 15T through wire 257 and relay Q12 in the 2 section. A further branch occurs in Fig. 15R where through wire 258 it continues through the central winding of relay Q18 in the 1 section. The setting of relays Q12 and Q18 will establish circuit connections through the carry chain to energize relay R3 (Fig. 15P) to represent a tens carry of three units. This circuit is traceable as follows:

*Carry chain circuit.*—The energization of relays Q12 and Q18 resulted in the closure of their a contacts to provide holding circuits through contacts C7 to hold the Q magnets through the first part of the following cycle 9 so that, when contacts C4 close at the beginning of this following cycle, the circuit is traceable from wire 195 (Fig. 15W), contacts C4, wire 240, the b contacts of relays Q1 and Q2, the c contacts of relays Q3 and Q4, the d contacts of relay Q5, f contacts of relays Q6 to Q11, f contacts of relay Q12 (now shifted), e contacts of relays Q13 to Q17, 2 wire 255, i contacts of relay Q18 (now shifted), h contacts of relays Q19 to Q25, the 3 wire 246, relay R3 and to line 172. Closure of contacts R3c will establish a circuit from wire 195 (Fig. 15P), contacts C5, R10b, R3c to the relay M64 representing the value 1. Shifting of contacts R3b will complete a parallel circuit from contacts C5, R10b, lower contacts R3b, contacts R2b, and relay M51 representing the value 2. Thus, relays M51 and M64 will be energized in cycle 9 to add a 3 to the main adding chain at that time.

Cycle 9

At the beginning of this cycle, the several relays are energized as indicated in Fig. 18b. Column 20 of program card 128 is at brushes 130 and columns 72 and 78 of card 10 are at the No. 1 and No. 2 brushes 62 respectively, so that the hundreds digits of the two factors are now about to be sensed. The sensing circuits will be controlled through the contacts of the D and J relays to enter the digits sensed into the No. 3 sets of E and H relays. Specifically, the hundreds digit of the multiplicand, which is a 4, will be represented by energization of the 4 relay E in the No. 3 set of Fig. 15I, and the hundreds digit of the multiplier, which is 2, will be represented by energization of the 2 relay H in the No. 3 set of Fig. 15L.

The circuit path through which the multiplicand digit 4 is entered is traceable as follows: from line 175 (Fig. 15B), contacts C3, A brush 141, roller 129, the 1 perforation in field A of card 128, corresponding brush 130, 1 wire 184, brush 62 of the No. 1 set sensing the 4 perforation in the record card, corresponding brush 107, the 4 wire 185 (Figs. 15C, 15D, 15E), the 1 cable 186 (Fig. 15D), the 1 wire 187—4, contacts D1a, D2a (now shifted), D3a, the 3 wire 188—4 (Fig. 15I), the 4 cable 189, the 4 wire 190 in the No. 3 set, the 4 relay E to line 172. Thus, the digit 4 is set up on the No. 3 set of E relays.

At the same time relays B1 and B2 are reenergized under control of the perforations in the 1 and 2 rows of section C of card 128 (Fig. 12), and a parallel circuit is completed to also energize relay B3 under control of the perforation in row 3 of this field C. This latter circuit is traceable from line 195 (Fig. 15B), contacts C4, C brush 141, roller 129, perforation in the 3 row of field C of card 128, corresponding brush 130, the 3 wire 201, relay B3 to line 172. This relay establishes a holding circuit and controls the later energization of relay C3 which picks up at the time indicated in Fig. 18b, so that its contacts complete a holding circuit for the E relays of the No. 3 set through the 3 wire 206.

The sensing of the card and setting up of the digits on the E relays takes place while the second or tens digit of the product is being punched in column 61 of the record card, and spacing of the card will take place as an incident to punching operations. About the middle of cycle 9, therefore, the units digit 9 in the multiplicand will stand in the No. 1 set of E relays, the tens digit 7 will stand in the No. 2 set and the hundreds digit 4 will stand in the No. 3 set; the units digit 5 of the multiplier will stand in the No. 1 set of H relays, there will be no entry in the No. 2 set, and the hundreds digit 2 will stand in the No. 3 set. The entry circuit for the hundreds digit 2 is traceable from line 195 (Fig. 15B), contacts C3, A brush 141, roller 129, the 2 perforation in column 20 of field A of the program card, the 2 wire 184, brush 62 of the No. 2 set sensing the 2 perforation in the record card, the 2 wire 210 (Fig. 15C), the 3 contacts La, the 2 wire 211 (Figs. 15D, 15E, 15F, 15G), 1 cable 212, 1 wire 213—2, contacts J1a, J2a now shifted, contacts J3a, to the wire 214—2 (Fig. 15L), the 2 cable 215, the 2 wire 216, the 2 relay H in the No. 3 set to line 172.

The M relays will now be energized through circuits controlled by contacts of the F relays, so that cross products as indicated at the bottom of Fig. 18b (cycle 9) will be obtained. Briefly, the M relays will be set in accordance with the products of 9×2, 7×0, 4×5 or 18+20, and the M relays which are energized in accordance therewith are as follows:

$$\begin{array}{ll} 4\times 4=16 \\ 4\times 1= 4 \end{array}\Big\}20 \quad \begin{array}{l} \text{Relay M18} \\ \text{Relay M50} \end{array}$$
$$\begin{array}{ll} 8\times 2=16 \\ 1\times 2= 2 \end{array}\Big\}18 \quad \begin{array}{l} \text{Relay M16} \\ \text{Relay M58} \end{array}$$

38

It will be recalled that carry control relays M51 and M64 are also energized to add a 3 for the result 41 as indicated at the bottom of Fig. 18b (cycle 9). The determination of the cross connections between the E and H relays for the selection of the M relays is effected by the commutating contacts of the F relays, of which for cycle 9 the F2 and F3 relays are energized. The circuits for the relays M18, M50, M16 and M58 will now be specifically traced.

*Circuit for relay M18.*—From line 195 (Fig. 15H), contacts C5, wire 220 (Fig. 15I), f contacts of the 4 relay E in the No. 3 set, the second from the left of the group of wires 255, c contacts of the minus relay E, 4 wire of the group 223—3, 3 cable 224 (Fig. 15J), 3 wire of the group 225—4 (Fig. 15M), contacts F1a, F2a shifted, F3a shifted to the 1 wire of the group 226—4 (Figs. 15N, 15X), central winding of relay M18, second wire from the left in the 4 group 227—1 (Fig. 15L), c contacts of relay H4 in the No. 1 set now shifted, and wire 270 to line 172.

*Circuit for relay M50.*—This circuit traverses the same path as for relay M18 up to the 1 wire of the group 226—4 (Fig. 15X). Here it branches through relay M50 to the right hand wire of the 4 group 227 (Fig. 15L), the now closed c contacts of the 1 relay H and to line 172.

*Circuit for relay M16.*—This circuit is traceable from wire 220 (Fig. 15J), the e contacts of relay E8, wire 228, b contacts of the minus relay E, 8 wire 223—1, the 1 cable 224, 1 wire of the group 225—8 (Fig. 15M), contacts F1a, F2a shifted and F3a shifted to the 3 wire 226—8 (Figs. 15N and 15X), to the right hand winding of the relay 16, the 8 wire of the group 227—3, third from the left (Fig. 15L), d contacts of relay H2 to line 172.

*Circuit for relay M58.*—This circuit is traceable from wire 220 (Fig. 15J), d contacts of relay E1 of the No. 1 set, wire 222, e contacts of minus relay E, 1 wire of group 223—1, 1 cable 224, 1 wire of group 225—1 (Fig. 15M), contacts F1a, contacts F2a shifted, contacts F3a shifted, 3 wire of group 226—1 (Fig. 15N), relay M58, wire 259 (Fig. 15), to the 1 wire of group 227—3 third from the left (Fig. 15L), e contacts of relay H2 to line 172.

Thus, the appropriate M relays are energized for completing a circuit through the adding chain to perforate a 1 in column 60 of the card 10. The total represented by the M relay settings is 41, so that the circuits now to be traced will result in energization of the 1 relay P1 and the carry relays Q12, Q18 and Q20.

*Circuit for 1 relay P1.*—This circuit is traceable from line 195 (Fig. 15W), contacts C6, wire 230, e contacts of relays M1 to M15 (Fig. 15V), e contacts of relay M16 now shifted, d contacts of relay M17, d contacts of relay M18 now shifted, contacts N6b, N2a, the 8 wire 234, a contacts of relays M19 to M31, contacts N6a, N2b, 6 wire 235, b contacts of relays M32, the M49 relays (Figs. 15S and 15R), b contacts of relay M50, now shifted, contacts N6a, N2b, 6 wire 236, b contacts of relay M51 now shifted, a contacts of relays M52 to M57 (Fig. 15Q), a contacts of relay M58 now shifted, f contacts of relay M58 now shifted also, b contacts of relay M59 to M63 (Fig. 15P), e contacts of relay M64 now shifted, i contacts of relays M65 to M70 and 1 wire 231 which in Fig. 15A extends to the 1 relay P1 and line 172.

*Tens carry circuits.*—Circuits branching from the adding chain will energize adding relays Q12, Q18 and Q20 as follows: In Fig. 15T the circuit branches from the a contacts of relay M31, through wire 250 to the relay Q12 and line 172. In Fig. 15R there is a further branching from the b contacts of relay M50, through wire 258, relay Q18 and line 171. In Fig. 15Q a third branch extends from the a contacts of relay M58, through wire 260, to relay Q20 in line 172. These three Q relays represent the values 2, 1 and 1 respectively to indicate a tens carry of 4 and set up the carry adding chain through which relay R4 of Fig. 15P is energized. This circuit is traceable from line 195 (Fig. 15W), contacts C4, wire 240, b contacts of relays Q1 and Q2, c contacts of of relays Q3, Q4 (Fig. 15V), d contacts of relay Q5, f contacts of relays Q6 to Q11 (Fig. 15U), f contacts of Q12 now shifted, e contacts of relays Q13 to Q17 (Figs. 15S and 15R), 2 wire 255, i contacts of relay Q18 now shifted, h contacts of relay Q17, h contacts of relay Q20 now shifted, g contacts of relays Q21 to Q25, 4 wire 246 to relay R4 in line 172. Relay R4 establishes a holding circuit and through its holding contacts R4b of relay R4 representing the value 4 will be energized to add 4 during the following cycle 10.

Cycle 10

In Fig. 18b it will be noted that in this cycle the thousands digit 1 is entered in the No. 4 set of E relays and the thousands digit 5 is entered in the No. 4 set of H relays, and that relay F1 alone is energized to associate the sets of E relays with the sets of H relays indicated by the crossed oblique lines at the bottom of Fig. 18b (cycle 10). The scheme of these cross connections may be understood from Fig. 15M where the numbers 1 to 6 of the groups 225 represent the numbers of the E sets of relays and the numbers 1 to 6 of the groups 226 represent the numbers of the H sets of relays. With only relay F1 energized, the 4 wire 225—1 (representing an entry of 1 in the No. 4 set of E relays) is connected to the No. 1 wire 226—1. This 1 wire 226—1 is connected to the appropriate relays representing the multiplication of 1×1, 1×2, 1 ×4, 1×8, and circuits will be completed in accordance with the setting of the H relays in the No. 1 set.

To illustrate this, the circuit for energizing relay M48 representing the product of 1×4 and the circuit for energizing relay M70 representing the product of 1×1 will now be traced. These two relays will represent the product 1×5 obtained by multiplying the digit 1 in the No. 4 set of E relays by the digit 5 represented by the setting of the No. 1 set of H relays.

*Circuit for relay M48.*—This is traceable from line 220 (Fig. 15I), d contacts of the 1 relay E in the No. 4 set, wire 255 second from the right, e contacts of the minus relay E, 1 wire of the group 223—4, the 4 cable 224 (Fig. 15J), the 4 wire of the group 225—1 (Fig. 15M). This wire, as already pointed out, is connected through the contacts of the F relays to the 1 wire 226—1 which extends across Fig. 15N to 15X, where the connection extends to relay N48, and from there through the 1 wire of the group 227—1 second from the left (Fig. 15L), to the e contacts of the 4 relay H in the No. 1 set, and thence to line 172. In Fig. 15X the 1 wire of the group 226—1 extends also to relay M70, the right hand 1 wire of the group 227—1 (Fig. 15L), to the e contacts of the 1 relay H of the No. 1 set, and thence to line 172.

In accordance with this system of identification in Fig. 15M, it is to be noted that for the selection of the appropriate M relays for the multiplication of a 7 in the No. 2 set of E relays by a 2 in the No. 3 set of H relays, circuits will extend through the contacts of the E relays in the No. 2 set to the 2 cable 187 (Fig. 15J), from which they will continue for the 4, 2 and 1 binary terms representing the digit 7, through the 2 wires of the groups 225—4, 225—2, and 225—1 to the 3 wires in the groups 226—4, 226—2, and 226—1. These wires are connected to relays M27, M43 and M58 and to the contacts of the 2 relay H in the No. 3 set. The several M relays selected in accordance with the separate binary term products during this cycle may be listed as follows:

$$\begin{array}{l} 1\times 4 = 4 \\ 1\times 1 = 1 \end{array}\bigg\}5 \quad \begin{array}{l}\text{Relay M48} \\ \text{Relay M70}\end{array}$$

$$\begin{array}{l} 4\times 2 = 8 \\ 2\times 2 = 4 \\ 1\times 2 = 2 \end{array}\bigg\}14 \quad \begin{array}{l}\text{Relay M27} \\ \text{Relay M43} \\ \text{Relay M58}\end{array}$$

$$\begin{array}{l} 8\times 4 = 32 \\ 8\times 1 = 8 \\ 1\times 4 = 4 \\ 1\times 1 = 1 \end{array}\bigg\}45 \quad \begin{array}{l}\text{Relay M9} \\ \text{Relay M25} \\ \text{Relay M39} \\ \text{Relay M67}\end{array}$$

$$\overline{64}$$

The energization of these M relays will, of course, be accompanied by energization of relay M32 to introduce the carry of four as indicated in Fig. 18b to obtain the total 68. The specific tracing of circuits for selecting the M relays in cycles 7, 8 and 9 will serve to indicate the manner in which it is determined what M relays will be energized so that further specific tracing of such circuits may be obviated.

Cycle 11

In this cycle the fifth digit 9 of the multiplier is entered into the No. 5 set of H relays, being directed thereto due to the energization of the A1 and A3 relays (Fig. 18b). The fifth digit of the multiplicand is also entered into the No. 5 set of E relays. This digit happens to be 0, so there is in effect no entry made into the E relays.

Referring to program card 128 in Fig. 12, it will be noted that there are five perforations in field 128A along row 2 of field A, and it will be recalled that it is through these perforations that multiplier entering circuits are completed. Accordingly, after the entry of the fifth multiplier digit, there will be no further entries made in the H relays. It will also be noted on line 3 of field D of the card that perforations extend across the field 128A, and it will be recalled that these perforations will cause energization of relay B7 (Fig. 15B) and also of relay C7 which controls the holding circuit for the H or multiplier relays. Accordingly, as indicated in the timing diagram, the H relays are now set to represent the complete multiplier and this setting will be retained throughout subsequent multiplication operations.

In the case of the sets of E relays, the sixth digit of the 12 place multiplicand will be entered in the No. 6 set of E relays during cycle 12, and during such cycle also the setting on the No. 1 set of E relays will be cleared. This is controlled by the perforations in the 1, 2, 3 and 4 rows of the field C and the perforations in rows 1 and 2 of field D of card 128 (Fig. 12). It will be recalled that in cycle 7 relay B1 was energized in response to the sensing of a hole in row 1 of field C, and this resulted in the energization of the C1 relay later in that cycle. In cycle 8 both the B1 and B2 relays were energized in response to perforations in both the 1 and 2 rows of field C. Then in cycle 9 relays B1, B2 and B3 and also C1, C2 and C3 were energized, and in cycle 10 relays C1, C2, C3 and C4 are all energized. In cycle 11 relay B1 is not reenergized due to the absence of a perforation in row 1 of field C of the program card, so that its associated relay C1 will become deenergized in the second half of cycle 11 and as a result the holding circuit for the No. 1 set of E relays is broken at that time.

It will be noted that the arrangement of perforations in rows 1, 2, 3 and 4 of field C and rows 1 and 2 of field D is such that the relays C2, C3, C4, C5 and C6 will in turn become deenergized in succeeding cycles, so that the settings in the No. 2, No. 3, etc. sets of E relays will be successively cleared. It will also be observed on card 128 that the perforations in rows 2, 3 and 4 are arranged so that the factors sensed are entered in turn into the No. 6 sets of storage relays E and H, the seventh factor sensed is entered in the No. 1 sets, and the eighth factor sensed is entered into the No. 2 sets, and so on throughout the multiplying operations.

In cycle 11 it is noted at the bottom of Fig. 18b that the summation results in a three place number. This involves the selection of one of the S relays and the operation of the third adding chain extending through the contacts of the S relays to select a Q relay for operation in cycle 12. The circuits involved will now be sufficiently explained to make clear the manner in which the third adding chain functions. The selection of the M relays for operation during this cycle without tracing each specific circuit will be in accordance with the following table:

```
   E H         M      Q        S
 8×8=64⎫       2
 8×1= 8⎮      23    23=1
 1×8= 8⎬81    22    14=2
 1×1= 1⎭      66    12=2
 4×4=16⎫      15     5=8     4=1
 2×4= 8⎮      24
 1×4= 4⎬35    39
 4×1= 4⎮      41
 2×1= 2⎮      57
 1×1= 1⎭      67
 4×2= 8   8   27
              ─────
              4⎫6   32    13    1
              2⎭    51
              ─────
              130
```

Along with these M relays there will also be an energization of relays M32 and M51 to represent a carry of 6 from the addition performed in the previous cycle 10. The total being 130 as indicated in Fig. 18b will result in the energization of the 0 magnet P1 of Fig. 15A and the punching of a 0 in column 58 of card 10. The circuit branches to the Q relays indicated in the table above and the contacts of these Q relays will in turn establish a circuit to the relay R3 and will branch to energize relay S4 whose contacts will cause energization of relay Q17.

The M adding chain is traceable from line 195 (Fig. 15W), contacts C6, wire 230, e contacts of relay M1, e contacts of M2 now shifted, d contacts of relays M3 to M6 to the 4 wire 232, c contacts of relays M7 to M12, contacts N5b to the 8 wire 233, a contacts of relays M13 and M14, a contacts of relay M15 now shifted (branching at this point to relay Q5), f contacts of relay M15, e contacts of relays M16 to M21, e contacts of M22 now shifted, d contacts of relay M23 now shifted, c contacts of relay M24 now shifted, contacts N6a, b contacts of relays M25, M26, b contacts of M27 now shifted, a contacts of relays M28 to M31 (branching at this point to relay Q12), contacts N6a, N2b, b contacts of relay M32 now shifted, a contacts of relays M33 to M38, a contacts of relay M39 now shifted (branching at this point to relay Q14), f contacts of relay M39, e contacts of relay M40, e contacts of relay M41 now shifted, d contacts of relay M42 to M50, contacts M2c to the c contacts of relay M51 now shifted, contacts N6a, b contacts of relays M52 to M56, b contacts of relay M57 now shifted, a contacts of relay M58 to M64, b contacts of relay M65, b contacts of relay M66 now shifted, a contacts of relay M67 now shifted (branching at this point to relay Q23), k contacts of relay M67, j contacts of relays M58 to M70 and 0 wire 231, to the 0 magnet P1 in Fig. 15A to effect punching of a 0 at the beginning of cycle 12 in column 58 of card 10.

Later, at the beginning of the next cycle, the circuit through the Q adding chain is traceable from line 195 (Fig. 15W), contacts C4, b contacts of relays Q1 and Q2, c contacts of relays Q3 and Q4, d contacts of relay Q5 now shifted, d contacts of relay Q6 to Q10, b contacts of relay Q11, b contacts of relay Q12 now shifted (branching at this point to relay S4), g contacts of relay Q12, f contacts of relay Q13, f contacts of relay Q14 now shifted, e contacts of relays Q15 to Q17, 2 wire 255, i contacts of relay Q18 to Q22, i contacts of relay Q23 now shifted, h contacts of relay Q24 and Q25, relay R3 to line 172. Relay R3 will cause energization of relays M51 and M64 to carry a 3 into the M adding chain during cycle 12.

It is to be noted that the M adding circuit is completed when contacts C6 close in the latter part of cycle 11 (Fig. 16), and it is at such time that the Q relays are energized. The closure of contacts C7 before contacts C6 reopen at the end of the cycle establishes a holding circuit for the Q relays which is continued over into cycle 12 so that, when contacts C4 close in cycle 12, the circuit through the Q adding chain is completed to energize the S relay at that time, that is, during the first half of the cycle 12. The S relays when energized set contacts suffixed a to provide a holding circuit through contacts C5 (Fig. 15V) and from Fig. 16 it will be noted that the S relays will accordingly be held energized through the remainder of cycle 12 and over into the beginning of cycle 13.

At such time a circuit is completed from line 195 (Fig. 15B), contacts C6, b contacts of relay S1, c contacts of relay S2, d contacts of relay S3, f contacts of relay S4 now shifted, e contacts of relay S5, relay Q17 to line 172. The previously energized Q relays are dropped out through the opening of contacts C7 in their holding circuit and through the concurrent completion of the M adding chain in cycle 12 the Q2 relays will be energized where tens carry is required, which together with the now energized relay Q17 will be held upon reclosure of contacts C7. Briefly stated, the action is such that, when the M adding chain is operated, if there is a tens and hundreds carry, appropriate Q and S relays are energized in the following cycle during which the Q relays select one of the four M carry relays and the S relay selects a Q relay, so that the next completion of the adding chain will take into account the tens carry into the M chain and the hundreds carry into the Q chain.

*Cycle 12*

In this cycle as indicated in Fig. 18b, the sixth digit 8 of the multiplicand was entered into the No. 6 set of E relays, and the F relays are all in deenergized condition to effect cross multiplication of the several digits as indicated by the diagonal lines at the bottom of Fig. 18b. The following table shows the binary combinations involved and the M relays energized in accordance therewith:

| E H | M | Q | S |
|---|---|---|---|
| 4×8=32 ⎫ | 8 | | |
| 4×1= 4 ⎬63 | 38 | | |
| 2×8=16 ⎪ | 14 | | |
| 2×1= 2 ⎭ | 55 | 14= 2 | |
| 1×8= 8 | 22 | 12= 2 | |
| 1×1= 1 | 66 | 5= 8 | |
| 4×4=16 ⎫20 | 15 | | |
| 4×1= 4 ⎭ | 41 | | |
| 1×2= 2 | 2 | 58 | |
| 8×4=32 ⎫40 | 12 | | |
| 8×1= 8 ⎭ | 30 | | |
| 2 ⎫3 | 51 | | |
| 1 ⎭ | 64 | 17= 1 | 4=1 |
| 128 | | 13 | 1 |

This table also indicates that the carry relays M51 and M64 are also energized so that with the M adding chain so adjusted, a circuit would be completed therethrough to the 8 magnet P1 to punch an 8 in column 57 of card 10. Branch circuits through M adding chain will energize the Q relays 5, 12 and 14. It is indicated that relay Q17 is also energized at this time so that the sum represented by the Q relays is 13. The subsequent completion of the Q adding chain will energize relay R3 to pick up relays M51 and M64 for operation in the following cycle 13, and a branch of this chain will again energize relay S4 for the hundreds carry of the digit 1 indicated.

*Cycle 13*

From Fig. 18b it will be observed that in cycle 13 the seventh digit 9 of the multiplicand is entered in the No. 1 set of E relays and that the No. 2 set is now cleared. In this cycle the relays F3 are energized to establish the cross connections between the multiplier and multiplicand digits as indicated. The tracing of specific circuits involved will result in energization of the M and Q relays indicated in the following table:

| E H | M | Q |
|---|---|---|
| 4×8=32 ⎫36 | 8 | |
| 4×1= 4 ⎭ | 38 | |
| 1×4= 4 ⎫ | 39 | 7=4 |
| 1×1= 1 ⎭ 5 | 67 | 12=2 |
| 8×4=32 ⎫ | 12 | 14=2 |
| 8×1= 8 ⎬45 | 31 | |
| 1×4= 4 ⎪ | 48 | |
| 1×1= 1 ⎭ | 70 | |
| 2 ⎫3 | 51 | 17=1 |
| 1 ⎭ | 64 | |
| 89 | | 9 |

It will be noted that in this cycle a 3 is carried in the M adding chain and a 1 in the Q adding chain, resulting in the energization of the 9 relay P1, for punching a 9 hole in column 56 of card 10 and the energization of relay R9 (Fig. 15P) whose contacts R9b and R9c will energize carry relays M19 and M64 for adding a 9 to the M relay chain in the next cycle 14.

*Cycle 14*

In this cycle relay F2 is energized, the next digit of the multiplicand is entered in the No. 2 set of E relays, and selection of M relays for the cross products indicated is effected in accordance with the following table:

| E H | M | Q |
|---|---|---|
| 1×8= 8 ⎫9 | 22 | |
| 1×1= 1 ⎭ | 66 | |
| 8×2=16  16 | 16 | |
| 2×4= 8 ⎫ | 30 | |
| 2×1= 2 ⎬15 | 63 | 10=4 |
| 1×4= 4 ⎪ | 48 | |
| 1×1= 1 ⎭ | 70 | |
| 8 ⎫9 | 19 | |
| 1 ⎭ | 64 | |
| 49 | | 4 |

From the above table it will be noted that the units digit in the summation is 9 and will cause a punching of a 9 hole in column 55 of card 10, and the energization of relay Q10 will energize relay R4 and in turn the carry relay M32 to add a 4 to the M chain in the next following cycle.

*Cycles 15 to 21*

The operations occurring in these cycles will be understood from the foregoing detailed explanation and the relays involved in the cross connections effective for selection of the M relays in each section will be understood from the sequence diagram (Figs. 18b and 18c). It will be noted that the successive multiplicand digits are entered in turn in successively higher sections of the E relays, and ultimately in cycle 21 the E relays contain the digits 2 and 5 in the Nos. 6 and 5 sections to be multiplied by the two highest digits of the multiplier to produce a 4 for punching the column 48 of card 10 and a setting up of the carry relays to add a 6 during cycle 22.

*Cycle 22*

In this cycle relay F1 alone is energized to cross connect the No. 6 set of E relays and the No. 5 set of H relays, selecting the appropriate M relays which together with the carried 6 result in punching a 4 in column 47 and setting up a carry of two digits.

*Cycle 23*

In this cycle all of the sets of E relays are cleared so that the M adding chain receives only the carried setting of two digits, which results in energization of the 2 relay P1 and punching of the 2 in column 46 to complete the recording of the product of the two factors on the card. During this cycle relay C7 becomes deenergized to drop out the holding circuit for the H relays, so that the multiplier factor is cleared from the H relays.

*Cycle 24*

The punching of the last product digit in cycle 24 is accompanied by sensing of column 35 in card 128 (Fig. 12), and it will be noted that in this column of the card the only perforation occurs in row 1 of field E. This perforation will complete a circuit traceable in Fig. 15B from line 195, contacts C4, E brush 141, roller 129, perforation in the 1 row, brush 130, wire 261 (Fig. 15C), and relay K to line 172. Relay K closes its contacts Ka to provide a holding circuit through contacts C5, due to the overlapping of the timing of contacts C4 and C5 (Fig. 16) and the occurrence of successive perforations in row 1 of field E of card 128, relay K will now remain energized throughout the succeeding operations as indicated in Figs. 18c, 18d, 18e and 18f. Relay K also closes a pair of contacts Kb, through which a circuit is completed, when contacts C6 close, to energize relay L, and this relay will accordingly also be held energized throughout succeeding operations and will hold its contacts La in shifted position. The pickup circuit is traceable (Fig. 15C) from line 195, contacts C6, Kb and magnet L to line 172. The holding circuit is traceable from line 172, magnet L, its 11 contacts La and contacts C7 to line 195. Through the overlap in timing of contacts C6 and C7 (see Fig. 16), magnet L will be held along with magnet K.

It will be recalled that the No. 10 contacts La (Fig. 15C) provided a holding circuit for relay P12 (Fig. 15A) from line 172, relay P12, wire 262 (Figs. 15B and 15C), 10 contacts La, wire 263 (Fig. 15B), brush 130 sensing the 1 row of field B in card 128 (Fig. 12), roller 129, brush 141 and contacts C4 to line 195. Since in this cycle there is no perforation in row 1 of field B and since contacts La are also shifted, relay P12 will be deenergized and will in turn through opening of contacts P12b (Fig. 15A) deenergize relay P11. When contacts C7 open, relay P11 restores its contacts to the condition shown in Fig. 15A to permit further spacing of the card to take place without accompanying punching as will be explained presently.

Cycle 25

During this and subsequent cycles, the multiplier and multiplicand are again sensed digit by digit, beginning with the units orders thereof, sensing is effected by the No. 4 and No. 3 brushes 62 respectively, and multiplying operations will be repeated to recompute the product. At the same time, the perforations in the product field 10C of card 10 will be sensed by the No. 2 set of brushes. Thus, as indicated at the bottom of Fig. 18d, columns 62, 74 and 80 are sensed in cycle 25 by the No. 2, 3 and 4 sets of brushes 62 respectively at the same time that column 36 of program card 128 is sensed by brushes 130.

*Entering the multiplier digit 5.*—As indicated at the bottom of Fig. 18d, the multiplier digit 5 is to be entered in the No. 4 set of H relays; and this is effected through the following circuit traceable in Fig. 15B from line 175, contacts C3, A brush 141, roller 129, perforation in the 4 row of field A (Fig. 12), 4 wire 184, wire 1a of group 266 (Figs. 15C, 15D, 15E and 15F), the 6 cable 212 (Fig. 15G), 6 wire of the group 213—1a, contacts J1a, J2a, J3a, 1a cable 215 (Fig. 15K), 1 relay H in the No. 4 set, 1b cable 215 (Fig. 15L), 4 wire 214—1b, contacts J3a, J2a, J1a, to the 6 wire 213—1b, 6 cable 212 (Fig. 15F), 1b wire 266 (Figs. 15B, 15C, 15D), the brush 62 of the No. 4 set sensing the multiplier digit perforation 5, corresponding brush 107, 4 wire 266 back to Fig. 1F, 6 cable 212, 6 wire 213—4, contacts J1a, J2a, J3a, 4 wire 214—4 (Fig. 15K), 4 cable 215, 4 wire of the group 216, 4 magnet H in the No. 4 set, to line 172. In this manner the 5 digit in the units order of the multiplier is set in the No. 4 set of H relays as the combination 1 and 4.

*Entering the multiplicand digit 9.*—Concurrently the units digit 9 of the multiplicand is entered in the No. 4 set of E relays, through a circuit traceable from line 175 (Fig. 15B), contacts C3, A brush 141, roller 129, perforation in the 3 row of field A (Fig. 12), 3 wire 184, wire 1a of a group 267 (Figs. 15C, 15D), 6 cable 186 (Fig. 15E), 6 wire 187—1a, contacts D1a, D2a, D3a to the 4 wire 188—1a (Fig. 15J) to the 1a cable 189 (Fig. 15I), 1a wire of the group 190 of the No. 4 set of E relays, 1 magnet E, 1b wire 180, 1b cable 189 (Fig. 15J), 4 wire 188—1a, Fig. 15E, contacts D3a, D2a and D1a, 6 wire 187—1b, 6 cable 186 (Fig. 15D) to the 1b wire 267 (Figs. 15C, 15B), brush 62 of the No. 3 set sensing the 9 digit of the multiplicand, brush 107, 8 wire 267 back to Fig. 15D, 6 cable 186, 6 wire 187—8, contacts D1a, D2a, D3a, 4 wire 188—8 (Fig. 15I), 8 cable 189, 8 wire of the group 190 to the No. 4 set of the E relays, 8 relay E to line 172. In this manner the units digit of the multiplicand is entered into the No. 4 set of E relays.

It is to be recalled that in the initial multiplication the units digits of the two factors were entered into the No. 1 sets of E and H relays. Now upon remultiplication, they are entered in the No. 4 sets. This is done by connecting the entries through the 6 cables 186 and 212 for remultiplication, whereas previously the circuits extended through the No. 1 cables. The object in doing this is to use different relays during the recomputation so that the same results will now be obtained through the utilization of different devices throughout the machine.

*Entering the product digit 5.*—The units digit of the product is entered into the No. 5 set of E relays, and this is effected through the following circuit: from line 175 (Fig. 15B), contacts C3, A brush 141, perforation in the 2 row of field A (Fig. 12), the 2 wire 184, wire 1a of group 210 (Fig. 15C), No. 2 contacts La now shifted, to the 1a wire of group 265, thence to the 2 cable 186 (Figs. 15D, 15E), 2 wire 187—1a, contacts D1a, D2a, D3a to the 5 wire 188—1a (Fig. 15J), the 1a cable 189 (Figs. 15I and 15H), 1a wire of the group 190 in the No. 5 set of E relays, 1 relay E, 1b wire 190, 1b cable 189 (Figs. 15I, 15J), 5 wire 188—1b (Fig. 15E), contacts D3a, D2a, D1a, 2 wire 188—1b, 2 cable 186 (Figs. 15D, 15C), 1b wire 265, No. 1 contact La now shifted, 1b wire 210 (Fig. 15B), brush 62 of the No. 2 set sensing the 5 perforation in the units order of the product, brush 107, 4 wire 210 (Fig. 15C), 4 contacts La now shifted, 4 wire 265, 2 cable 186 (Fig. 15D), 2 wire 187—4, contacts D1a, D2a, D3a, 5 wire 188—4 (Fig. 15I), 4 cable 189 (Fig. 15H), 4 wire of the group 190 asscociated with the No. 5 set of E relays, 4 magnet E to line 172. In this manner the units digit of the product is entered in the No. 5 set of E relays.

Energization of the 1 and 4E relays causes closure of their Ea contacts to provide a holding circuit (Fig. 15H), from line 172, the 1 and 4E relays, their a contacts, the 5 wire of the group 206, extending over to Fig. 15B, contacts C5b, wire 203, contacts C5, to line 195. This holding circuit is maintained until contacts C5 open at the beginning of the next cycle 26 (Fig. 16), so that at such time the entry in the No. 5 set of E relays is cleared. This is brought about by the arrangement of the perforations in field C of card 128 and in rows 1 and 2 of field D which are located so that the entry in the No. 5 set of E relays is not held beyond the beginning of the next cycle.

Referring to the bottom of Fig. 18d, cycle 25, during this cycle the F relays interconnect the E and H relays for multiplication as indicated by the diagonal lines which represent that the units digits of the multiplier and multiplicand, respectively 5 and 9, will select M relays representing the value 45.

The multiplicand digit is to be subtracted from the new product, and this is done by in effect multiplying the complement of the punched product digit by unity and setting the result on appropriate M relays, so that the M adding chain will then obtain the units digit of the recomputed product with the corresponding digit of the punched product subtracted therefrom. If the result is 0, it is an indication that the previous computations have been correct.

In order to obtain the complement of the product digit, it is necessary to energize the minus E relay of the No. 5 set. This is brought about as follows:

*Energization of the minus relay E in the No. 5 set.*—Upon closure of contacts C4 (Fig. 15C), a circuit is traceable from line 195, contacts C4, 8 contacts $La$ now closed, wire 268, 2 cable 186, 2 wire 187-minus (Fig. 15H), minus cable 189, minus wire of the group 190, minus relay E, to line 172. This relay will close its $Ea$ contacts to hold through the 5 wire 206, and with the 1 and 4E relays this minus relay will also be held only until the beginning of the following cycle. The minus relay E serves to invert the circuit connections to wires 223 in accordance with the 9's complement of the number set up.

*Complementing to 10 (fugitive one entry).*—It is necessary for the units product digit to be complemented to 10 for subtracting purposes, and this is effected by energizing the +1 magnet E in the No. 5 set. The circuit involved is traceable from line 195 (Fig. 15B), contacts C4, D brush 141, roller 129, perforation in the 4 row of field D (Fig. 12), wire 219 (Fig. 15C), 9 contacts $La$ now shifted, wire 290 (Fig. 15H), +1 relay E in the No. 5 set, to line 172. This relay also holds through its $a$ contacts and cam contacts C5 to the beginning of the following cycle, and thereafter there will be no + relays E picked up, inasmuch as there is only one perforation in row 4 of field D for the checking or verifying operation.

*Entering 1 in the No. 3 set of H relays.*—The circuit just traced branches at shifted 9 contacts $La$, to wire 291 (Figs. 15D, 15E, 15F and 15G), to the 3 cable 312, thence through the 3 wire 213—1$a$, contacts J1$a$, J2$a$, J3$a$ to the 3 wire 214—1$a$ (Fig. 15L), 1$a$ cable 215, 1$a$ wire 216 of the group related to the No. 3 set of H relays, 1 relay H, 1$b$ wire 216, 1$b$ cable 215, 3 wire 214—1$b$ (Fig. 15G), contacts J3$a$, J2$a$, J1$a$, 3 wire 213—1$b$, 3 cable 212, to line 172.

Through the foregoing circuits the E and H sets of relays will now contain entries as represented at the bottom of Fig. 18$d$, cycle 25, that is, in the No. 5 set of E relays the minus, +1, 4 and 1 relays are energized. In the No. 4 set, the 1 and 8 relays are energized. In the No. 4 set of H relays, the 1 and 4 relays are energized, and the 1 relay is energized in the No. 3 set.

Referring now to Fig. 15H, when contacts C5 close, circuit paths will be completed from wire 220 in the No. 5 set of E relays to the 1 and 4 wires 223—5 to represent the tens complement of the product digit 5. The circuit for the 1 wire is traceable upwardly from this wire to the $e$ contacts of minus relay E now shifted, through the right hand wire of the group 255, $d$ contacts of +1 relay E now shifted, $d$ contacts of the 1 relay E now shifted, to wire 220.

For the 4 wire the circuit is traceable from this wire to the $c$ contacts of the minus relay E now shifted, $b$ contacts of the ½ relay E, contacts $b$ of the ⅕ relay E, $d$ contacts of the 4 relay E now shifted, $b$ contacts of the 2 relay E, $b$ contacts of the 1 relay E now shifted, $b$ contacts of the +1 relay E now shifted, to wire 220.

In the No. 4 set of E relays (Fig. 15I), the wire 229 will direct current to the 1 and 8 wire 223—4 to represent a 0 entered in this set of relays.

From this point on, M relays will be energized in the now familiar manner and specific tracing thereof will therefore be omitted. Suffice it to say that the appropriate M relays are energized to represent the two partial products 45 and 5 indicated at the bottom of Fig. 18$d$ and upon closure of contacts C6 in Fig. 15W a circuit through the adding chain will be completed to energize the 0 magnet P1 (Fig. 15A) and the Q relays will concurrently be energized to represent the tens carry digit 5.

Energization of 0 relay P1 (Fig. 15A) closes its contacts P1$g$ to provide a holding circuit through contacts C7. No punching takes place since relay P11 is now deenergized, and its contacts P11$c$ are in the position shown. At the beginning of the next cycle (26) a circuit is completed from line 175, contacts 98, 23, 15, 144, 135, 124, C2, wire 180, upper contacts P11$c$, wire 181, and space relay SP to line 172. As a result, the cards are advanced one column or step and cycle 26 follows.

*Cycles 26 to 41*

In each of these cycles, through circuits requiring no specific tracing, entries into the E and H sets of relays will take place as indicated in Figs. 18$d$, 18$e$ and 18$f$, in which it will be noted that the multiplier digits are successively entered in the H relays until all five are set up and the entire multiplier is then held throughout the subsequent cycles. The setting of unity in the No. 3 set is also held therewith.

In the E relays the successive multiplicand digits are set up and then successively dropped as for the initial multiplication. It is to be particularly noted that the successive product digits are set up in successive sets of E relays and that the minus relay of the corresponding set is also energized concurrently. Such settings are only retained for a single cycle, so that the product digits 9, 1, 8, 0, 8, 9, 9, etc. occur in the 6, 1, 2, 3, 4, 5, 6, etc. sets as represented in Figs. 18$d$, 18$e$ and 18$f$ in positions where the action of rotator relay F will cross connect them with the No. 3 set of H relays containing the value 1. Thus, in each cycle following cycle 25, there will be a selecting of M relays representing 1 times the 9's complement of a product digit and, if the computation and machine operation are correct, the 0 relay P1 will be energized in each cycle.

*Error stop circuit.*—The failure to energize the 0 magnet P1 (Fig. 15A) through the M relay adding chain during any cycle is an indication that an error has occurred, and in such case the machine will stop and a signal lamp 280 (Fig. 15A) will be illuminated. This is effected as follows. In Fig. 15C the 0 relay P1 controls a pair of contacts P1$h$ through which, if this relay fails to energize, a circuit is completed when contacts C7 close at the end of a computing cycle, from line 195, contacts C7, P1$h$, 7 contacts $La$ (now closed), wire 281 (Figs. 15B and 15A), a winding of stop relay ST to line 172. Relay ST closes its contacts ST$c$ to establish a holding circuit through key contacts 282 and also closes its contacts ST$b$ to send current through lamp 280, which thus remains illuminated until contacts 282 are manually opened.

The occurrence of an error does not stop the operations at the time of failure, and the operations continue until the card is advanced through the machine and into the eject hopper. A new card, however, will not be fed into sensing position due to the fact that stop relay ST has opened and holds open contacts STa in the circuit of trip magnet 19. This failure to feed a new card together with the lighting of lamp 280 is a signal to the operator that the last card passed through the machine is in error.

*Cycle 42*

At the beginning of this cycle column 49 of card 128 has been advanced to brushes 130 and, due to the configuration of the usual skip bar, the card carriage moves automatically from here to its last column position as indicated in Fig. 18f, where 283 represents the position from which the start of operations was begun. From this point operations repeat automatically in the sequence explained in the paragraphs immediately following the heading "Circuit diagram." Briefly, when the card 10 reaches the last column position, contacts 145 (Fig. 15A) close to energize magnet 71 which releases the card for advance to the hopper. Magnet 71 closes contacts 150 to energize trip magnet 19 and this in turn closes contacts 22 to energize motor M to feed in a new card. When the new card is in position and carriage rack 14 has returned to close contacts 15, magnet 71 is again energized and with contacts 15 reclosed contacts C1 will energize clutch magnet 167 to initiate a new cycle 1.

When an error has occurred, trip magnet 19 will fail to energize as pointed out.

*Punching during checking*

In some cases it may be desirable to punch an indication that the computation has been verified and in such cases the program card is provided with perforations (shown in dotted outline) along row 1 of field B in the check field 128B. Such perforations, as has already been explained, will energize relay P12 (Fig. 15A) and keep it energized throughout the operations and in turn relay P11 will also remain energized in the same manner as during the initial multiplication. Contacts P11c will then be in shifted position and the repeated energization of the 0 relay P1 will then repeatedly energize the 0 punch selecting magnet 111 to punch a row of zeros in card 10 in columns 44 to 28 as indicated at 284 in Fig. 12. The presence of this row of zeros indicates that the computation has been found correct. Obviously, if an error occurs, resulting in energization of a P1 relay other than 0, a corresponding perforation will be made along with the illumination of lamp 280 (Fig. 15A) and locking of the machine. Such punching will serve to indicate the position in which the error occurred.

*Rounding off*

When it is desired to round off the lowest digit of the product, a connection 285 indicated in dotted lines is made between contacts P1f (Fig. 15A) and relay Q25 (Fig. 15P). It will be noted that with this connection made, there will be a circuit completed whenever the units digit of the product is 5 or greater, which is traceable from line 195 (Fig. 15A), contacts C7, P11b, P1f, connection 285 (Fig. 15P), relay Q25 to line 172. This circuit is completed concurrently with the other Q relays that may be required by the tens carry conditions and the effect is to increase the carry by one unit. Refering to Fig. 18a (cycle 7), this circuit is only effective in this cycle as relay P11 is energized in the latter part of the cycle to open its contacts P11b, and such contacts thereafter remain open.

*Punching result in binary code*

Provision is made in the machine whereby the result instead of being recorded in decimal form may be recorded in binary form. To effect this, switch 266 (Fig. 15A) is closed and plug connections 131a are made from any four magnets 111 to sockets 287 labeled 1, 2, 4, 8. No plug connections are made to contacts P1a. Accordingly, when a result digit is set on relays P1 (for example, the 1 relay P1), a circuit will be traceable from wire 180, contacts P11c (lower), switch 286, contacts P1b (lower), 1 socket 287, connection to the selected magnet 111 and to line 172. Other contacts P1b, P1c, P1d and P1e are interconnected to convert the decimal values into binary Fig. 15A.

*Adding hours and minutes*

In Fig. 19 is shown a record card containing perforations representing six values expressed in hours and minutes with the units of minutes in column 80, 74, 68, 62, 50 and 44. For this problem the sensing brushes 62 are correspondingly spaced so that these columns of the card are concurrently sensed and at such time column 33 is at the row of pickers. The program card is provided with perforations as indicated with those in column 48 sensed by brushes 130 concurrently with the sensing of the units of minutes digits in the record card.

Circuit connections are rearranged between the sensing brushes and the rotators as shown in Figs. 20B to 20G and these figures, when substituted for Figs. 15B to 15G as indicated in Fig. 17, will together with the remaining circuit figures constitute a wiring diagram for the solution of the problem of Fig. 19.

As for the prior problem, the cards are placed in the machine and upon closure of switch 174 (Fig. 15A) the record card is fed from the hopper into the stepping carriage, at which point the twelfth column of program card 128 is at brushes 130 as before.

From this position, the cards are now automatically advanced, as explained, thirty-six columns or steps to bring them to the relative positions with respect to the punches and brushes as indicated diagrammatically in Fig. 19 which is the start of sensing position; that is, the cards are repeatedly stepped until the first punched column of card 128 arrives at brushes 130.

During the first step or cycle wherein the cards are sensed, the units of minutes of the six amounts will be entered into the E relays and 1's will be entered in all positions of the H relays. This is indicated in Fig. 21 in column 1 thereof. For this operation, the rotators (relays D and J) are not operated but remain in their deenergized condition so that the F rotators or relays cross connect the H and E relays to multiply each units of minute digit by 1. The circuits through which the several entries are made will now be traced.

Upon closure of contacts C3 (Fig. 20B), a circuit is traceable from wire 175, A brush 141, roller 129, perforation in row 1 of field A of card 128, column 48 (see Fig. 19) to connection 300 which branches to the brushes 62 sensing the even numbered positions of the record card columns. Connection 300 also branches through a connection 301 (Figs. 20C, D, E) to all of the 1a sockets of cables 186. Taking the specific case of the digit 1 in column 44 of card 10, the circuit continues in Fig. 20E, through the 1 cable 186, the 1 wire 187—1a, contacts D1a, D2a, D3a to the 1 wire 188—1a (Fig. 15J), the 1a cable 189, 1a wire 190 related to the No. 1 set of E relays, the 1 relay E, 1b wire 190, 1b cable 189, 1 wire 188—1b (Fig. 20E), contacts D3a, D2a, D1a, 1 wire 187—1b, 1 cable 186, 1b wire of group 302 (Figs. 20D, 20C and 20B), brush 62 of the No. 1 set, 1 hole in column 44 of card 10 and connection 303 to line 172. In this manner the 1 relay E of the No. 1 set is energized.

Similarly, for the five other sets of brushes 62, the conection 301 extends in parallel through the 1 relays E of the No. 2 to No. 6 sets to wires 1b of groups 304 to 308. For the No. 2 and No. 5 sets of brushes, the circuits will not be completed since in these sets the digits are even numbers. In the No. 3 and No. 4 sets the circuits continue through the 5 and 3 brushes 62, respectively, to the 4 wire 307 and the 2 wire 305 to energize the 4 relay E of the No. 3 set and the 2 relay E of the No. 4 set.

Tracing that for the No. 3 set, it continues through the 4 wire 305 (Figs. 20C, 20D), 3 cable 186, 3 wire 187—4, contacts D1a, D2a, D3a, 3 wire 188—4 (Fig. 15I), 4 cable 189, 4 wire 190 of the No. 4 set and 4 relay E to line 172. Thus, during the closure of contacts C3, the six sets of E relays will receive the entries 1, 6, 3, 5, 8, 1 in set Nos. 6 to 1 in the order named. These relays set up holding circuits as before, through contacts C5 (Fig. 15H) which will maintain them until the next card column is sensed, at which time they are deenergized.

Figure 20B:
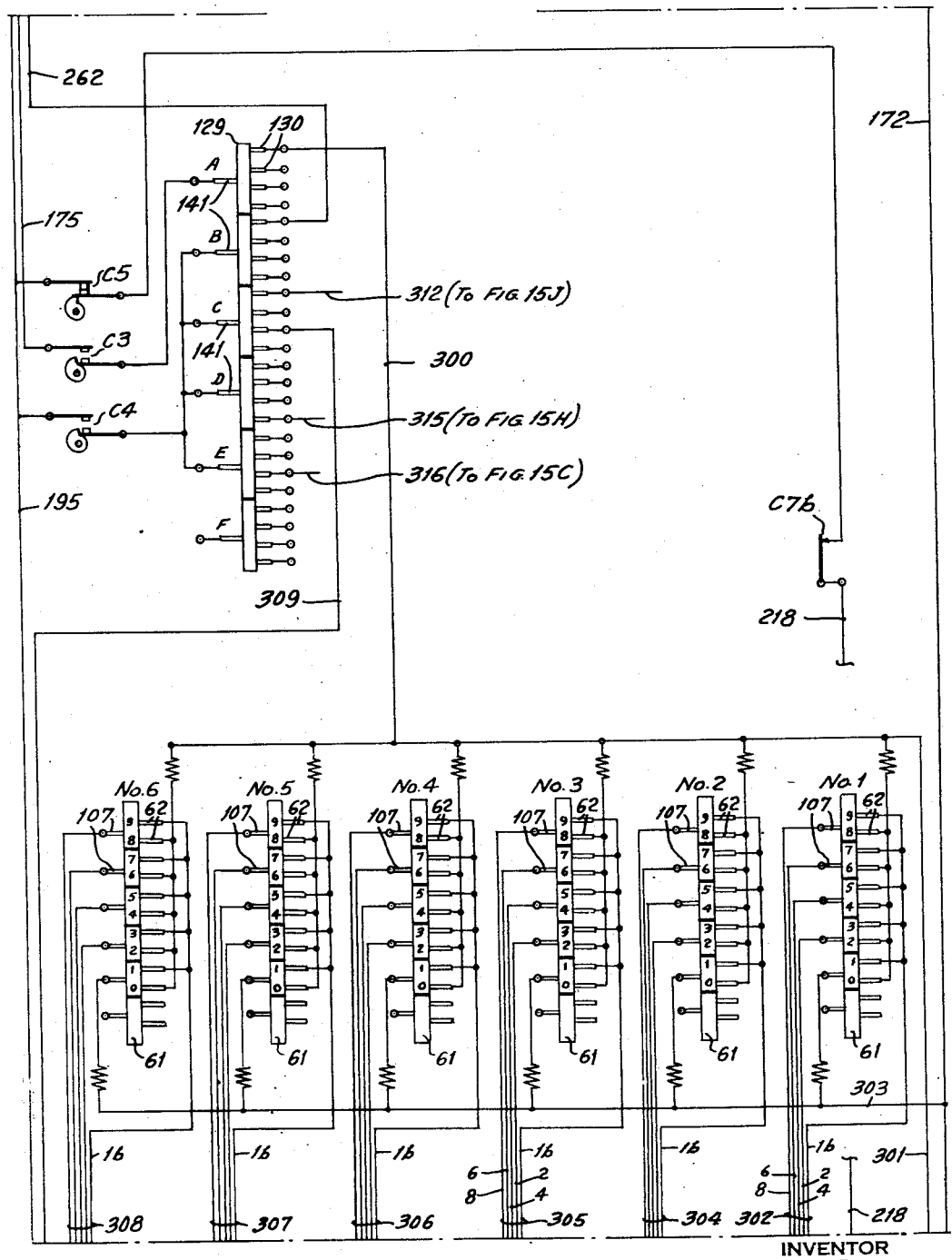
Figure 20C:
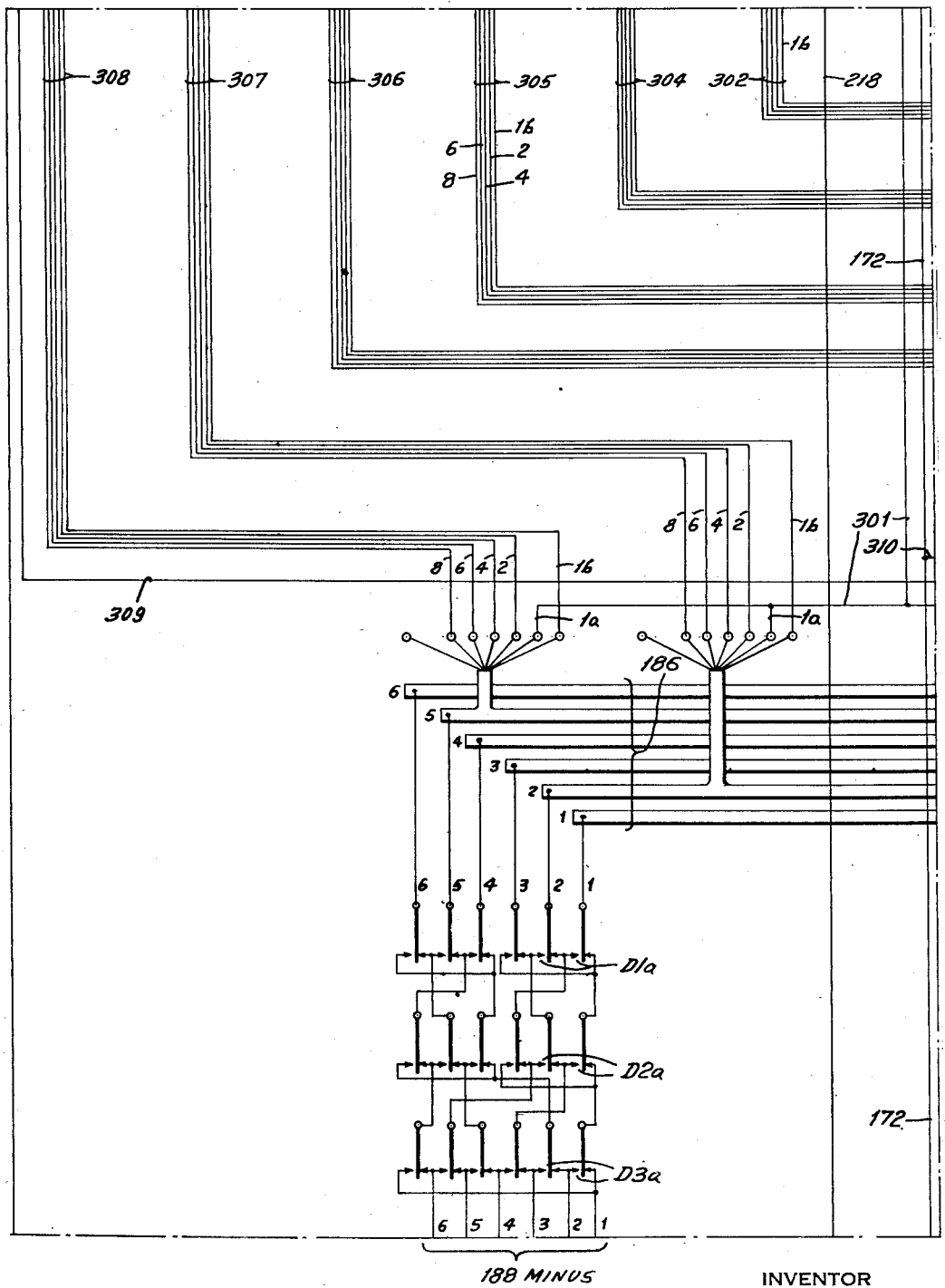
Figure 20D:
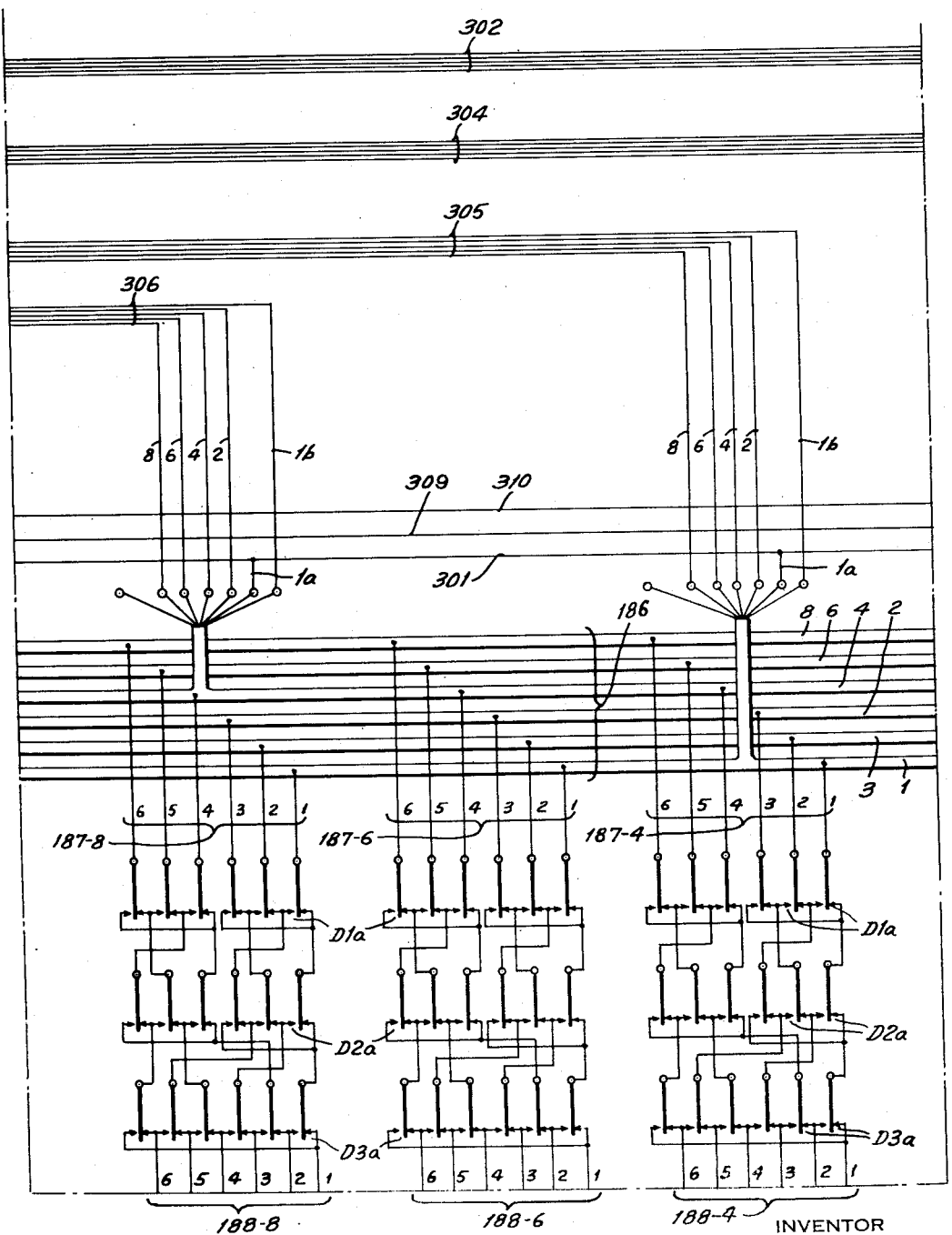
Figure 20E:
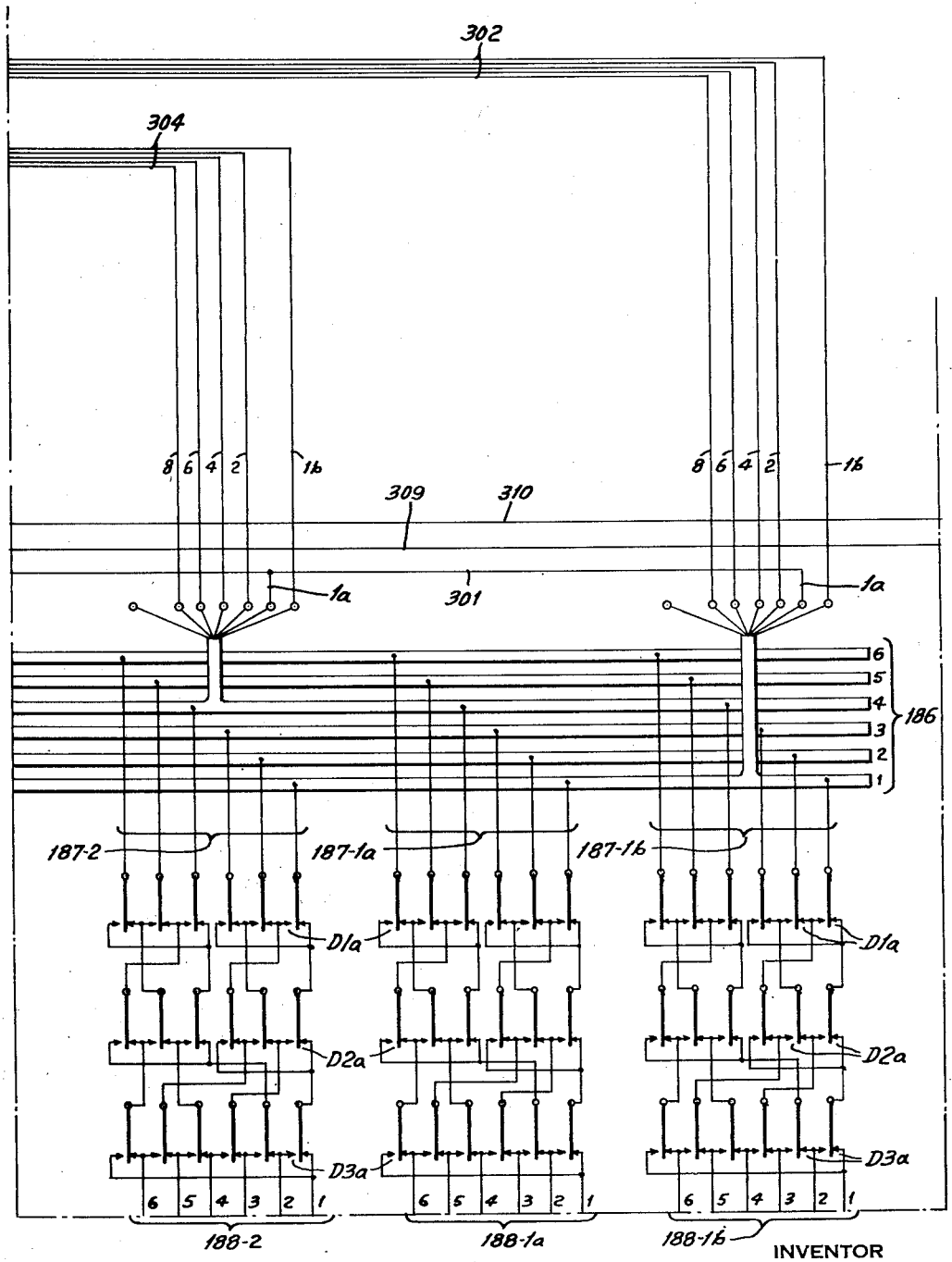
Figure 20F:
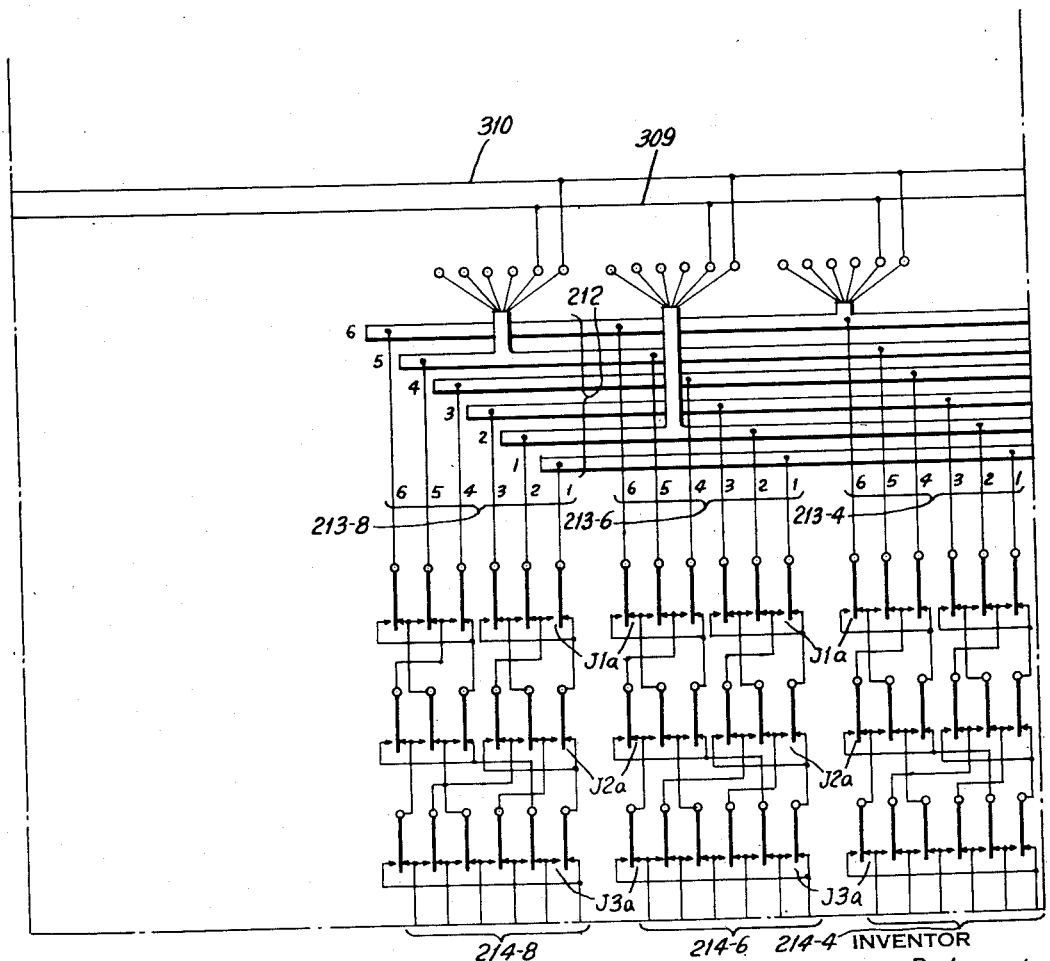
Figure 20G:
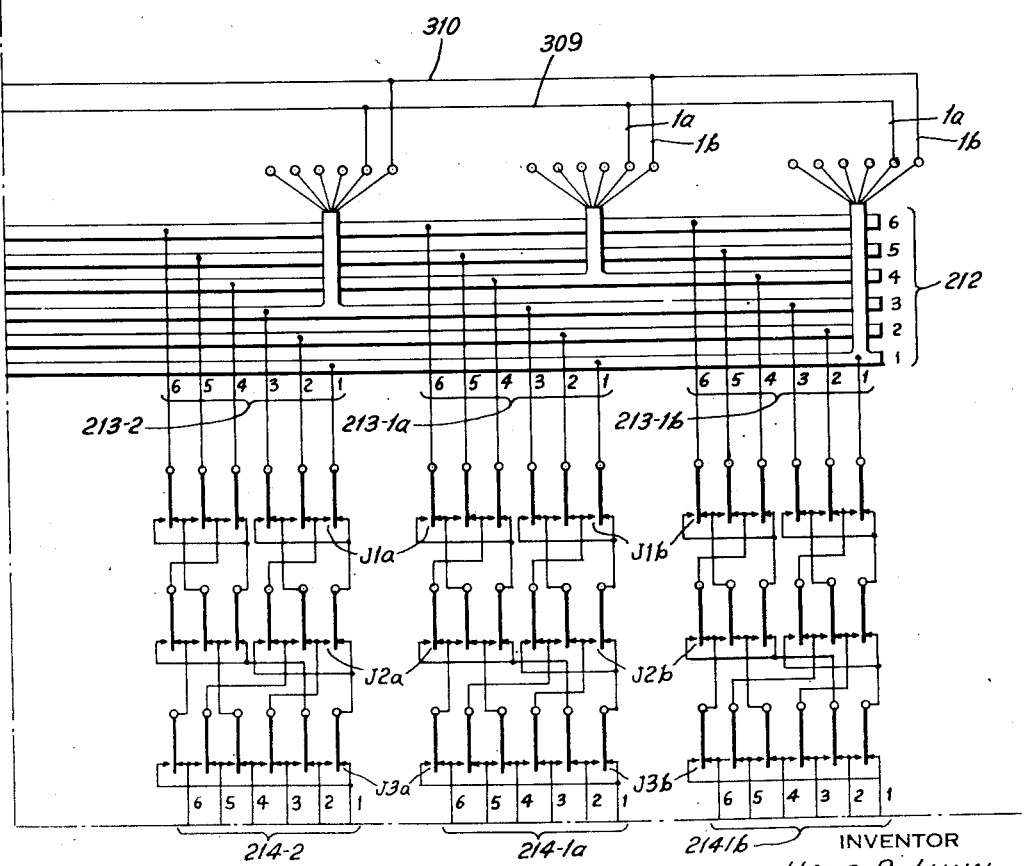

Referring to Fig. 20B, when contacts C4 close, a circuit is completed from line 195, contacts C4, C brush 141, perforation in row 3 of field C of card 128 (Fig. 19), connection 309 (Figs. 20C, 20D, 20E, 20F and 20G) in the last of which it branches in parallel through all the 1a wires of cables 212, all six wires 213—1a, contacts J1a, J2a, J3a, to all six wires 214—1a (Fig. 15L) to the 1a cable 215 and from here to all the 1 relays H and wires 1b of group 216 back to 1b cable 215, the six wires 214—1b (Fig. 20G), contacts J3a, J2a, J1a, the six wires 213—1b, cables 212 to common connection 310 (Figs. 20F, 20E, 20D and 20C) to line 172. Thus, all the 1 relays H in the six sets are energized concurrently and set holding circuits through wire 213 and contacts C5 as before. Reference to Fig. 16 will show that contacts C4 close again before contacts C5 open, so that as long as there are holes in successive columns of row 3 of field C in card 128, the H relays will remain continuously energized.

With digits set in the E and H relays, the further operation is exactly the same as explained for multiplying, i. e. the M relays are selectively energized for the partial products as indicated in Fig. 21, section 1, and upon completion of the circuit through the adding chain of relays the 4 relay P1 will be energized to cause punching of a 4 in column 32 of card 10 (see Fig. 19) when the card is advanced one step and a Q relay is energized in accordance with a tens carry of 2. Since the relays F are not operated for this problem, the cross connections remain set as indicated in Fig. 21.

If the amounts cross added were all decimal amounts, the succeeding cycles or steps would follow with the units digit of the successive sums being punched and tens carries held over just as in multiplying operations. For the present example, the second card columns sensed contain values of tens of minutes which are 6ths of hours and therefore in adding these values carries must take place accordingly.

In the corresponding column 49 of card 128, a hole is made in row 1 of field C to denote that in this column values whose denominators are other than 10 are to be added and this hole, when sensed, will complete a circuit (Fig. 20B) from line 195, contacts C4, c brush 141, hole in row 1 of field c, connection 312 to Fig. 15J and the ⅙ relay E of the No. 1 set. Through connections 313 the ⅙ relays of the rest of the sets of E relays are also energized.

The effect of this energization of the ⅙ relay E in the No. 1 set is to energize relay N6 (Fig. 15J) and this will cause shifting of all the contacts of this relay in the adding chain (Figs. 15P to 15W). These contacts are so arranged in the chain that, whenever the sum of the values set up in the chain is 6 or a multiple thereof, an appropriate 9 relay will be energized. Thus, for the example chosen, the sum of the digits set up upon sensing of the card columns containing the tens of minutes values will be as represented in Fig. 21, section 2, with a tens carry of 2 from section 1. The sum of these digits is 21 sixths or 3 sixths and a carry of 3. The circuits involved are believed sufficiently familiar at this time to obviate specific tracing thereof and they will result in the energization of the 3 relay P1 to cause punching of a 3 in column 31 of card 10 in the next cycle.

In this next cycle there is no special hole in card 128 so that the adding chain reverts back to its initial decimal condition, and further operations proceed as indicated in Fig. 21 to obtain the third digit 4 and fourth digit 5 of the sum. After the fourth digit 5 is obtained, the E and H relays become deenergized since card 128 contains no more perforations and after the 5 hole is punched, the skip bar releases the card for advance to its last column position from which it is ejected.

As each of the columns 48 to 51 of card 128 is sensed, a circuit is completed (Fig. 20B), through contacts C3, B brush 141, a hole in row 1 of field B, connection 262 (Fig. 15A) to replay P12 which in turn energizes relay P11 to shift its contacts P11a, so that advance of the cards is under control of digit punching during the adding part of the operations and automatic spacing is terminated when the first such hole is encountered.

If for column 49 of card 128 the connection 312 were made to the ½ relay E (Fig. 15J) instead of the ⅙ relay, then relay N2 would be energized and adding would be in accordance with the denominator 2. Thus, for a series of digits as 9, 8, 7, 6, 4, 3, whose sum is 37, the sum would cause punching of a 1 and a carry of 18. The hole in row 1 of field C of card 128 may, of course, occur in any of the columns or in several thereof, and the connection 312 may be made to either the ⅙ or ½ relay E to cause selective adding to the base 6 or 2 for desired columns.

Where it is desired to subtract one or more of the values of card 10 (Fig. 19), the program card 128 is provided with a perforation in row 4 of field D for column 48 and perforations in row 4 of field E for columns 48 to 51. Assuming that the value 5.51 sensed by the No. 6 brushes 62 is the one to be subtracted, a connection 315 (Fig. 20B) is made from brush 130 that senses the hole in field D to the socket of the +1 relay E of the No. 6 set of E relays (Fig. 15H). This will cause the addition of the elusive one in the units position.

From brush 130 sensing the 4 row in field E (Fig. 20B) a connection 316 is made to the left hand terminal of the minus socket of cable 186 (Fig. 15C) so that a circuit is completed from this cable to the 5 wire 187-minus, contacts D1a, D2a, D3a to the 6 wire 188-minus (Fig. 15H), the 6 wire 190 of the No. 6 set of E relays to the — relays E. As a result, when contacts C5 close after the E relays are set, the circuit through the contacts of the No. 6 set will be in accordance with the tens complement of the digit set up for the units order. Thus, for the example chosen, the 1 relay E is energized and also the +1 and — relays, so that the circuit is traceable from contacts C5, b contacts of +1 relay E (shifted), b contacts of 1 relay E (shifted), b contacts of 2 relay E, d contacts of 4 relay E, b contacts of 6 relay E, c contacts of 8 relay E, c contacts of ⅙ relay E, c contacts of ½ relay E, b contacts of — relay E (shifted) to 8 wire 223—6.

A parallel circuit is traceable from contacts C5, d contacts of 1 relay E (shifted), d contacts of +1 relay E (shifted), right hand wire 255, e contacts of — relay E (shifted), to 1 wire 223—6. Thus, the setting is read out as 8 plus 1 or 9, which is tens complement of 1. In subsequent orders the +1 relay is not energized so that for decimal values the 9's complement will be read out.

When the tens of minutes values are set up in the E relays, the 5's complement is to be read out. As already explained, the ⅙ relay E is energized at such time so that there is a setting in the No. 6 set of E relays of the relays 4, 1, ⅙ and —. No circuit is completed since the 5's complement of the digit set up is 0. Assuming the digit to be 2, the circuit would be from contacts C5, c contacts of +1 relay E, d contacts of 2 relay E (shifted), d contacts of — relay E (shifted) to the 2 wire 223—6. A parallel circuit extends from contacts C5, d contacts of 1 relay E, d contacts of +1 relay E, right hand wire 255, c contacts of — relay E (shifted) to the 1 wire 223—6. Thus, the 2 and 1 wires representing 3 (the 5's complement of 2) are active to add a 3.

It is to be noted that with the ⅙ relay E energized, a circuit through its b contacts prevents a circuit to the 4 wire 223—6. Briefly, with the ⅙ relay E deenergized, a setting of 2 will complete a connection to the 4, 2 and 1 wires 223—6 representing the 9's complement of 2, whereas with the ⅙ relay energized the 4 wire is disconnected leaving only the 2 and 1 to represent the 5's complement. Similarly, for the other digits the contacts of the ⅙ relay E readjusts the circuits so that the 5's complement is read out instead of the 9's.

*Obtaining the sum of two products*

The manner in which two pairs of factors may be obtained and their sum punched back into the record card 10 can be indicated by reference to Figs. 22 and 23. In the former the record card is perforated with amounts 86, 72, 94 and 35 to be read by brushes 62 No. 1 to 4, and after this card is placed in the hopper it is advanced automatically as explained to the position where the units digits of the four factors are conveniently sensed by their respective brushes. The program card 128 is perforated as shown in Fig. 22 so that column 48 thereof is also sensed at this time.

Perforations in the 1 to 4 rows of field A are made in the now familiar manner to direct entries into the Nos. 1 and 4 sets of E relays and the Nos. 1 and 4 sets of H relays as represented in section 1 of Fig. 23, and these entries are held through the 1 and 4 wires 206 and wire 218 (Fig. 15B) to contacts of the C1, C4 and C7 relays picked up by circuits through holes in the 1 and 4 rows of field C and the 3 row of field D. The D and J rotating relays direct the entries through their contacts as for the first problem explained.

During the second half of the entering step or cycle, the F relays interconnect the E and H relays as indicated in Fig. 23 so that the M relays become energized in accordance with the partial products 12 and 20 and, when the circuit is completed through the adding chain, the units digit 2 is punched during the next step, a 3 is carried and the cards advance one column.

In the second cycle the first setup E and H relays are still held and the D and J rotators shifted under control of the hole in row 3 of field B, so that the tens digits are now entered into the Nos. 3 and 5 sets of E and H relays as indicated in section 2 of Fig. 23, and held through the wires 206, 218 and the C2, C5 and C7 relays picked up by the holes in row 2 of field C and rows 1 and 3 of field D. Thus, during the multiplying part of the cycle the four factors are held in the E and H relays so that upon selection of the M relays the latter will be energized according to the partial products 16, 42, 45, 12 and the carry of 3 resulting in punching of the units digit 8 and a carry of 11.

During the third cycle, no further factor digits are sensed but perforations in rows 2 and 3 of field B and row 3 of field D continue to hold the E and H relay settings, so that in the multiplying part of the third cycle the M relays are set according to the partial products 56 and 27 and the carry of 11 resulting in the punching of a 4 and carry of 9. During cycle 1, relays F3 are energized, during cycle 2 relays F2 are energized, and during cycle 3 relays F3 and F2 are energized to effect the interconnectings indicated between the E and H relays.

When the cards now step ahead, the absence of perforations in column 51 of card 128 (except in the punch control row 1 of field B) will cause release of the E and H relays so that in this cycle no entries are made and no multiplying takes place. The carry 9 is entered in the M relays resulting in punching the last digit 9 and another step to bring the cards into position from which the skip bar (suitably configured) will advance card 10 to its last column position for ejection into the discharge hopper.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a cyclically operable multiplying machine, an entry receiving device settable to represent a multiplier, an entry receiving device settable to represent a multiplicand, an adding mechanism, entering means therefor, recording means, carry devices, control means for effecting a succession of cycles of operation, one cycle for each denominational order of the product, beginning with the units order, means effective during each of said succession of cycles and controlled jointly by the entry receiving and carry devices for causing the entering means to enter into the adding mechanism multidenominational amounts of like positional notation the units digit of whose sum represents the product digit of that cycle and whose higher digits represent appropriate single or multiple order carry digits, further means effective during each cycle and controlled by the adding mechanism to cause said recording means to record said product digit, and further means controlled by the adding mechanism to enter the carry digits into said carry devices.

2. In a cyclically operable multiplying machine, an entry receiving device settable to represent a multiplier, an entry receiving device settable to represent a multiplicand, an adding mechanism, entering means therefor, recording means, carry devices, control means for effecting a succession of repeated operations of said adding mechanism, one operation for each denominational order of the product, beginning with the units order, means effective during each of said succession of operations and controlled jointly by the entry receiving and carry devices for causing the entering means to enter into the adding mechanism multidenominational amounts of like positional notation the units digit of whose sum represents the product digit of that operation and whose higher digits represent appropriate single or multiple order carry digits, further means effective during each operation and controlled by the adding mechanism to cause said recording means to record said product digit, and further means controlled by the adding mechanism to enter the carry digits into said carry devices.

3. In a multiplying machine, an entry receiving device settable to represent a multiplier, an entry receiving device settable to represent a multiplicand, an adding mechanism, entering means therefor, multiplying means including said entry receiving devices for forming the products of each digit times all of the digits, control means operating jointly with said entry receiving devices for selecting the products required for the units positional notation of the final product and controlling said entering means to enter the same in said adding mechanism, said control means acting thereafter to in turn select the products required for the tens and higher positional notations of the final product and controlling the entering means to enter the same in said adding mechanism, recording means controlled by said adding mechanism to record the units digit of the sum standing therein after each entry, and means for resetting the adding mechanism after each operation of the recording means.

4. In a multiplying machine, a multiplier receiving device, a multiplicand receiving device, an adding mechanism, means for concurrently entering the units digits of the two factors into their respective receiving devices and thereafter concurrently entering the tens digits of the two factors into the respective receiving devices, multiplying means jointly controlled by said devices upon entry of the units digits therein for forming and entering their product into said adding mechanism, said multiplying means being jointly controlled by said devices upon entry of the tens digits therein for forming and entering the cross products of the units and tens digits into said adding mechanism and, means for clearing the adding mechanism between the successive product entries.

5. In a multiplying machine, a multiplier receiving device, a multiplicand receiving device, entering means for each, an adding device in which a plurality of amounts may be concurrently entered, multiplying means for forming the products of a plurality of pairs of digits, means controlled by said receiving devices for causing said multiplying means to form the product of the units digits of the factors and enter it into the adding device, further means controlled by said receiving devices for causing said multiplying means to form the cross products of the units and ten digits of the factors and enter them concurrently into the adding device, and means for clearing the adding device between the successive product entries.

6. In a multiplying machine, a multiplier receiving device, a multiplicand receiving device, entering means for each, multiplying means for forming the product of any pair of digits, an adding device, means controlled by said multiplier and multiplicand receiving devices for causing the multiplying means to form the separate products of each multiplier digit times each multiplicand digit, enter the same into said adding device and retain the same therein for a predetermined period, control means for causing the separate products to be formed and entered in their order of positional notation, and means for clearing the adding device between the successive product entries.

7. The invention set forth in claim 6, in which the means for entering the separate products into the adding device is arranged to effect concurrent entry of separate products of like positional notation.

8. In a multiplying machine, a multiplier receiving device, a multiplicand receiving device, means for entering the units digits of a pair of factors into their respective receiving devices and thereafter entering the tens digits of the factors, and then entering the hundreds digits of the factors, recording mechanism, computing mechanism, control means including said entry receiving devices effective upon entry of the units digits of the factors and prior to the entry of the tens digits of the factors for obtaining the units digit of the product and controlling said recording mechanism in accordance therewith, said control means being effective upon entry of the tens digits of the factors and prior to the entry of the hundreds digits of the factors for obtaining the tens digit of the product and controlling said recording mechanism in accordance therewith.

9. The invention set forth in claim 8, in which the computing mechanism includes means for cross multiplying the initial factors to obtain subproducts having the same positional notation as the last entered factor digits and adding said subproducts.

10. In a multiplying machine, means for sensing a record for multiplier representing designations and multiplicand representing designations, means for recording product representing designations, means for causing the sensing means to sense the factor designations in denominational order, computing means controlled by said sensing means upon sensing each denominational order and prior to the sensing of the next denominational order, for obtaining the sum of the cross products of the designations already sensed which correspond to the positional notation of the last digits sensed, and means controlled thereby for causing the recording means to effect a designation representing the units digit of said sum.

11. The invention set forth in claim 10 in which control means is provided to cause operation of the recording means in response to the units digit of each sum, while the next denominational order of the factors is being sensed.

12. In a multiplying machine, a multiplier receiving device, a multiplicand receiving device, means for concurrently entering the units digits of a pair of factors in said devices and thereafter in succession entering the pairs of higher ordered digits of the factors, a single set of relays, at least one for each of the first seven powers of the binary progression, a set of switches for each relay, circuit connections between the sets of switches arranged in accordance with the table of addition of binary values, tens carry relays included in said connections, recording control means included in said connections, multiplying devices controlled by said multiplier and multiplicand receiving devices after each pair of factors is entered for energizing the relays of said single set to represent the cross products whose positional notation corresponds to the denomination of the pair of digits entered, the switches of said relays causing completion of a circuit connection through the recording control means in accordance with the units digit of the sum of said cross products and also completion of circuits to the tens carry relays in accordance with higher orders of said sum, and means for deenergizing the set of relays prior to entery of the next higher pair of factor digits, said carry control relays causing energization of the relays of said set to add tens carries with the next higher sum.

13. In a multiplying machine, a multiplier receiving device, a multiplicand receiving device, a single set of relays, at least one for each of the first seven powers of 2, converting means controlled by said receiving devices for first energizing a number of relays of said set, the sum of whose related values equals the product of the units digits of the factors, and then energizing a number of relays of said set, the sum of whose related values equals the sum of the cross products of the units and tens digits of the factors, means controlled by the relays upon said first energization, for causing energization of a relay or relays concurrently with said second energization, whose value or the sum of whose values equals the amount to be carried, means for deenergizing the relays between successive energizations, contacts adjusted by the relays, circuit connections between the relay contacts arranged in accordance with the table of addition, and means controlled through said circuit connections for recording the units and tens digits of the product of the factors, in succession.

14. In a machine of the class described, a single set of relays, at least one for each of the first seven powers of 2, switches adjusted by the relays, circuit connections between the switches arranged in accordance with the table of addition of binary values, a set of digit representing magnets included in said connections, a set of carry relays each representing a power of 2 included in said connections, means for energizing a plurality of said single set of relays to represent a two-place amount whereby the related switches will complete a circuit connection to the magnet representing the units digit of the sum represented by the energized relays and will also complete circuit connections to the carry relays in accordance with carry requirements, control means for deenergizing said single set of relays and thereafter causing the carry relays to effect a reenergization of one or more of the single set of relays to represent the carried amount whereby the related switches will complete a circuit connection to the magnet representing the tens digit of the sum initially represented by the single set of relays.

15. In a machine of the class described, a single set of relays and switches controlled thereby, said relays having multidenominational amount values, circuit connections between the switches arranged in accordance with the table of addition of the amount values of the relays, a set of digit representing magnets included in said connections, a set of carry relays each having an amount value, included in said connections, means for energizing a plurality of said single set of relays whereby the related switches will complete a circuit connection to the magnet representing the units digit of the sum represented by the energized relays and will also complete circuit connections to the carry relays in accordance with single or multiple order carry requirements, control means for deenergizing said single set of relays and thereafter causing the carry relays to effect a reenergization of one or more of the single set of relays to represent the carried amount whereby the related switches will complete a circuit connection to the magnet representing the tens digit of the sum initially represented by the single set of relays.

16. The invention set forth in claim 15, in which the circuit connections to the carry relays are adjustable to effect energization of the carry relays, in accordance with carry requirements of any of a number of denominators, and means for adjusting said carry connections in accordance with a selected denominator.

17. The invention set forth in claim 15, in which the circuit connections to the carry relays are adjustable to effect energization of the carry relays in accordance with carry requirements of any of the denominational bases 10, 6 or 2, and means for adjusting said carry connections in accordance with a selected one of such bases.

18. In a multiplying machine, entry receiving means, means for sensing a record for designations representing multiplier and multiplicand amounts, said sensing means concurrently sensing like denominational designations in the two factors in ascending succession and entering the same in said entry receiving means, multiplying and adding mechanism, recording means, means controlled by said entry receiving means effective upon the entry of each denominational order of the factors and prior to the entry of the next denominational order of the factors, for controlling said multiplying and adding mechanism to obtain the product digit having the denominational notation of the entered factor designations, means for clearing the adding mechanism after obtaining each successive product digit and means for causing the recording means to record the product digits in succession, each prior to clearing of the adding mechanism.

19. In a multiplying machine, entry receiving means, means for sensing a record for designations representing multiplier and multiplicand amounts, said sensing means concurrently sensing like denominational designations in the two factors in ascending succession and entering the same in said entry receiving means, multiplying and adding mechanism, recording means, means controlled by said entry receiving means effective upon the entry of each denominational order of the factors and prior to the entry of the next denominational order of the factors, for controlling said multiplying and adding mechanism to obtain the product digit having the denominational notation of the entered factor designations, means for causing the recording means to record each product digit obtained prior to the entry of the factor digits of the next higher denominational notation, and means for clearing said adding mechanism following the recording of each product digit.

20. In a machine of the class described, entry receiving means, means for sensing a record for designations representing a multiplier, a multiplicand and a third amount, said sensing means concurrently sensing like denominational designations in all three amounts in ascending succession and entering the same in said entry receiving means, multiplying and adding mechanism, means controlled by said entry receiving means, effective upon the entry of each denominational order of the three amounts and prior to the entry of the next denominational order of the three amounts, for controlling said multiplying and adding mechanism to obtain the difference between the product digit having the denominational notation of the entered factor designations and the digit of the third amount having the same denominational notation, a set of operable elements one for each of the digits, means controlled by said multiplying and adding mechanism for operating the element representing the said difference, means for rendering said last named means effective for each denominational notation in order, and means for clearing the adding mechanism prior to each successive entry therein.

21. In a machine of the class described, entry receiving means, means for sensing a record for designations representing a multiplier, a multiplicand and a third amount, said sensing means concurrently sensing like denominational designations in all three amounts in ascending succession and entering the same in said entry receiving means, multiplying and adding mechanism, means controlled by said entry receiving means, effective upon the entry of each denominational order of the three amounts and prior to the entry of the next denominational order of the three amounts, for controlling said multiplying and adding mechanism to obtain the difference between the product digit having the denominational notation of the entered factor designations and the digit of the third amount having the same denominational notation, means for clearing the adding mechanism after each difference has been obtained for the successive denominational notations, indicating means, and means controlled by said multiplying and adding mechanism when any successively obtained difference is other than 0 for operating said indicating means.

22. In a machine of the class described, entry receiving means, means for sensing a record for designations representing a multiplier, a multiplicand and a third amount, said sensing means concurrently sensing like denominational designations in all three amounts in ascending succession and entering the same in said entry receiving means, multiplying and adding mechanism, means controlled by said entry receiving means, effective upon the entry of each denominational order of the three amounts and prior to the entry of the next denominational order of the three amounts, for controlling said multiplying and adding mechanism to obtain the difference between the product digit having the denominational notation of the entered factor designations and the digit of the third amount having the same denominational notation, means for clearing the adding mechanism after each difference has been obtained for the successive denominational notations, recording means, and means controlled by said multiplying and adding mechanism for causing said recording means to record the successively obtained differences, each prior to obtaining the next one.

23. A multiplying machine with partial product receiving and setting-up means, factor entry controlled amount manifesting means, partial product creating means controlled from the amount manifesting means to separately obtain the product of each digit of one factor times each of the digits of the other factor, control means for directing the partial products related to the units positional notation into said partial product receiving and setting-up means for addition thereof and then the partial products related to the tens positional notation, means for clearing said partial product receiving and setting-up means prior to entry of the partial products related to the tens positional notation and control means for controlling the character of the partial product which is entered so as to effect additive entries or subtractive entries.

24. In a multiplying machine with partial product accumulating means, factor entry controlled amount manifesting means, with means controlled thereby for selecting and entering only the partial products having a units positional notation into said accumulating means to obtain the units digit of the product, means for recording said units digit of the product and clearing said accumulator, and means for thereafter effecting an operation of said selecting and entering means to select and enter only the partial products having a tens positional notation into said accumulating means to obtain the tens digit of the product with control means to effect recording of the said tens digit.

25. In a multiplying machine with partial product accumulating means, means settable to manifet two pairs of factors, means controlled thereby for concurrently selecting and entering the partial products of one pair of factors, and the partial products of the second pair of factors having a units positional notation, into said accumulating means to obtain the units digit of the sum of the products of the two pairs of factors, and control means for thereafter causing said selecting and entering means to select and enter in order the partial products of the two pairs of factors having a tens positional notation to obtain in turn the tens digits of the sum of the products of the two pairs of factors, said tens notational entries being effective to replace the prior entries in the accumulating mechanism.

26. In a multiplying machine with partial product accumulating means, means settable to represent two pairs of factors, means controlled thereby for selecting and entering the partial products of both pairs of factors having a units positional notation, concurrently, into said accumulating means to obtain the units digit of the sum of the products of the two pairs of factors, and means controlled by the accumulating means for recording said units digit.

27. A record controlled multiplying machine, including product set-up devices, record handling devices for handling records one by one automatically in succession, means for reading the factors from a record, entry receiving means for such factors, multiplying devices for multiplying such factors and for setting up the denominational digits of the product in succession in said product set-up devices, said multiplying devices including means for forming complete partial products of each multiplier digit times each multiplicand digit and separately adding together all partial products of like denominational value a product recording device which includes devices for recording the product column by column, means for causing the product set-up devices to control the recording device to record each product digit as it is set up and before the next product digit is set up and means for automatically correlating the action of card reading and multiplying with the recording means so that recording of product digits of lower orders are effected while reading and multiplying to obtain product digits of higher order are being effected.

28. In a machine of the class described, entry receiving means, means for sensing a record for designations representing a plurality of amounts, said sensing means concurrently sensing like denominational designations in the plurality of amounts in ascending succession and entering the same in said entry receiving means, adding mechanism, recording means, means controlled by said entry receiving means, separately effective for the entry of each denominational order of the amounts and prior to the entry of the next denominational order, for controlling said adding mechanism to effect entry therein of complete partial products of all digits entered to obtain the total digit having the denominational notation of the last entered amount designations, and means for causing the recording means to record, separately for each denominational notation, the total digit related to such denominational notation, before the digit for the next higher notation is obtained.

29. In a machine of the class described, entry receiving means, means for sensing record material for designations representing at least two amounts expressed in terms of hours and minutes, said sensing means concurrently sensing like denominational designations in the amounts in ascending succession and entering the same in said entry receiving means, adding mechanism, recording means, means controlled by said entry receiving means effective upon entry of the units of minutes designations of said amounts for controlling said adding mechanism to obtain the total digit having a units of minutes notation, said means being controlled by said entering means effective upon entry of the tens of minutes designations of said amounts for adjusting and controlling said adding mechanism to obtain the total digit having a tens of minutes notation, and said means being further controlled by said entry of means effective upon sensing the units of hour designations of said amounts for controlling the adding mechanism to obtain the total digit having a units of hours notation, and means coordinated with the entry receiving means and adding mechanism for causing the recording means to record the total digits in succession as they are obtained, each prior to entry of designations of higher notation.

30. In a machine of the class described, entry receiving means, means for sensing record material for designations representing at least two amounts of non-uniform notation, said sensing means concurrently sensing like denominational designations in the amounts in ascending succession and entering the same in said entry receiving means, adding mechanism adjustable to effect addition in any of several notations, recording means, means controlled by said sensing means upon sensing the successive denominations for adjusting the adding mechanism for operation in the appropriate notation, further means controlled by said entering means upon the entry of each denominational order of the amounts and prior to the entry of the next denominational order for controlling said adding mechanism to obtain the total digit having the denominational notation of the entered amount designations, and means coordinated with the entry receiving means and adding mechanism for causing the recording means to record the total digits in succession as they are obtained, each prior to entry of designations of higher notation.

31. In a machine of the class described, entry receiving means, means for sensing record material for designations representing at least two amounts of non-uniform notation, said sensing means concurrently sensing like denominational designations in the amounts in ascending succession and entering the same in said entry receiving means, adding mechanism adjustable to effect addition or subtraction in any of several notations, recording means, means controlled by said sensing means upon sensing the successive denominations for adjusting the adding mechanism for addition or subtraction in the appropriate notation, further means controlled by said entry receiving means upon the entry of each denominational order of the amounts and prior to the entry of the next denominational order for controlling said adding mechanism to obtain the algebraic total digit having the denominational notation of the entered amount designations, and means coordinated with the entry receiving means and adding mechanism for causing the recording means to record the total digits in succession as they are obtained, each prior to entry of designations of higher notation.

32. In a machine of the class described, entry receiving means, means for sensing a record for designations representing a positive amount and a negative amount, said sensing means concurrently sensing like denominational designations in the amounts in ascending succession and entering the same in said entry receiving means, adding mechanism, a subtraction control device, recording mechanism, means controlled by said entry receiving means and by said subtraction control device effective upon the entry of the lowest denominational orders of the amounts for controlling the adding mechanism to add the digit of the positive amount, the 9's complement of the negative amount and an elusive one to obtain the digit representing the difference between the digits sensed, said means being effective upon the entry of subsequent denominational orders of the amounts for controlling the adding mechanism to add the digit of the positive amount and the 9's complement of the negative amount to obtain the differences, and means coordinated with the entry receiving means and adding mechanism for causing the recording means to record the result digits in succession as they are obtained, each prior to entry of designations of higher denomination.

HANS P. LUHN.

REFERENCES CITED

The following references are of record in the file of this patent:

UNITED STATES PATENTS

| Number | Name | Date |
|---|---|---|
| 2,045,436 | Bryce | June 23, 1936 |
| 2,262,235 | Hofgaard | Nov. 11, 1941 |
| 2,364,540 | Luhn | Dec. 5, 1944 |
| 2,394,924 | Luhn | Feb. 12, 1946 |

FOREIGN PATENTS

| Number | Country | Date |
|---|---|---|
| 528,059 | Great Britain | Oct. 22, 1940 |